(12) United States Patent
Weiner et al.

(10) Patent No.: US 9,886,688 B2
(45) Date of Patent: Feb. 6, 2018

(54) SYSTEM AND METHOD FOR SECURE TRANSACTION PROCESS VIA MOBILE DEVICE

(75) Inventors: Avish Jacob Weiner, Tel Aviv (IL); Ran Ne'man, Ramat Gan (IL); Shmuel Ben-Shemen, Hod Hasharon (IL)

(73) Assignee: Ping Identity Corporation, Denver, CO (US)

( * ) Notice: Subject to any disclaimer, the term of this patent is extended or adjusted under 35 U.S.C. 154(b) by 0 days.

(21) Appl. No.: 14/240,395

(22) PCT Filed: Aug. 26, 2012

(86) PCT No.: PCT/IL2012/050328
§ 371 (c)(1),
(2), (4) Date: Feb. 23, 2014

(87) PCT Pub. No.: WO2013/030832
PCT Pub. Date: Mar. 7, 2013

(65) Prior Publication Data
US 2014/0214688 A1    Jul. 31, 2014

Related U.S. Application Data

(60) Provisional application No. 61/529,258, filed on Aug. 31, 2011, provisional application No. 61/566,660, filed on Dec. 4, 2011.

(51) Int. Cl.
*G06Q 20/32* (2012.01)
*G07F 7/10* (2006.01)
(Continued)

(52) U.S. Cl.
CPC ......... *G06Q 20/3227* (2013.01); *G06F 21/35* (2013.01); *G06Q 20/3278* (2013.01); *G06Q 20/3829* (2013.01); *G07F 7/1016* (2013.01)

(58) Field of Classification Search
CPC ................................. G06Q 20/00; H04M 1/00
(Continued)

(56) References Cited

U.S. PATENT DOCUMENTS 5,420,606 A   5/1995   Begum et al.
5,559,961 A   9/1996   Blonder
(Continued)

FOREIGN PATENT DOCUMENTS

CN    1533088 A    9/2004
CN    101583968 A   11/2009
(Continued)

OTHER PUBLICATIONS

Miller, "Payment Method Bypasses the Wallet", The New York Times Reprint, May 23, 2011.
(Continued)

*Primary Examiner* — James D Nigh
*Assistant Examiner* — Margaret Neubig

(57) ABSTRACT

A secure element with a user security domain thereon, the user security domain constituted of: a security domain control circuitry; an encoder/decoder functionality responsive to the security domain control circuitry; and a secured keys storage in communication with the security domain control circuitry, the encoder/decoder functionality arranged to: encode data responsive to at least one first key stored on the secured keys storage, and output an encoded data; and decode received data responsive to at least one second key stored on the secured keys storage, and output a decoded data.

19 Claims, 24 Drawing Sheets

(51) Int. Cl.
   *G06F 21/35* (2013.01)
   *G06Q 20/38* (2012.01)

(58) Field of Classification Search
   USPC .......................... 705/50–79, 44, 17; 455/550
   See application file for complete search history.

(56) References Cited

U.S. PATENT DOCUMENTS

| | | |
|---|---|---|
| 5,875,394 A | 2/1999 | Daly et al. |
| 5,892,900 A | 4/1999 | Ginter et al. |
| 5,903,721 A | 5/1999 | Sixtus |
| 5,991,407 A | 11/1999 | Murto |
| 6,082,620 A | 7/2000 | Bone, Jr. |
| 6,338,140 B1 | 1/2002 | Owens et al. |
| 6,510,502 B1 | 1/2003 | Shimizu |
| 6,584,309 B1 | 6/2003 | Whigham |
| 6,687,346 B1 | 2/2004 | Swartz et al. |
| 6,705,517 B1 | 3/2004 | Zajkowski et al. |
| 7,028,906 B2 | 4/2006 | Challa et al. |
| 7,137,006 B1 | 11/2006 | Grandcolas et al. |
| 7,347,361 B2 | 3/2008 | Lovett |
| 7,356,510 B2 | 4/2008 | Durand et al. |
| 7,392,226 B1 | 6/2008 | Sasaki et al. |
| 7,509,119 B2 | 3/2009 | Eonnet |
| 7,706,784 B2 | 4/2010 | Weiner et al. |
| 7,962,762 B2 * | 6/2011 | Kirsch ................ H04L 63/0853 713/193 |
| 8,108,318 B2 * | 1/2012 | Mardikar ........... G06Q 20/1085 340/5.2 |
| 8,185,956 B1 | 5/2012 | Bogorad et al. |
| 8,244,211 B2 * | 8/2012 | Clark ...................... G06F 21/32 455/410 |
| 8,306,879 B2 | 11/2012 | Nonaka |
| 8,346,672 B1 | 1/2013 | Weiner et al. |
| 8,453,940 B2 | 6/2013 | Diamond |
| 8,479,022 B2 * | 7/2013 | Dahan ................... G06F 9/4425 713/189 |
| 8,494,961 B1 | 7/2013 | Lucas et al. |
| 8,510,820 B2 | 8/2013 | Oberheide et al. |
| 8,578,454 B2 | 11/2013 | Grim |
| 8,736,424 B2 | 5/2014 | Shoarinejad et al. |
| 8,763,077 B2 | 6/2014 | Oberheide et al. |
| 8,805,434 B2 * | 8/2014 | Vasudevan .............. B60R 25/24 340/3.32 |
| 8,887,257 B2 | 11/2014 | Haggerty et al. |
| 9,098,850 B2 | 8/2015 | Weiner et al. |
| 9,196,111 B1 | 11/2015 | Newman et al. |
| 2001/0014870 A1 | 8/2001 | Saito et al. |
| 2002/0023027 A1 | 2/2002 | Simonds |
| 2002/0028671 A1 | 3/2002 | I'Anson et al. |
| 2002/0042722 A1 | 4/2002 | Tsuji et al. |
| 2002/0091569 A1 | 7/2002 | Kitaura et al. |
| 2002/0198777 A1 | 12/2002 | Yuasa |
| 2003/0047613 A1 | 3/2003 | Funamoto et al. |
| 2003/0149663 A1 | 8/2003 | Vonholm et al. |
| 2003/0163384 A1 | 8/2003 | Hendra |
| 2003/0163567 A1 | 8/2003 | McMorris et al. |
| 2003/0193441 A1 | 10/2003 | Zimmerman et al. |
| 2003/0225618 A1 | 12/2003 | Hessburg et al. |
| 2004/0117254 A1 | 6/2004 | Nemirofsky et al. |
| 2004/0117262 A1 | 6/2004 | Berger et al. |
| 2004/0121781 A1 | 6/2004 | Sammarco |
| 2004/0186768 A1 | 9/2004 | Wakim et al. |
| 2004/0243519 A1 | 12/2004 | Perttila et al. |
| 2005/0071673 A1 | 3/2005 | Saito |
| 2005/0091539 A1 | 4/2005 | Wang et al. |
| 2005/0120213 A1 | 6/2005 | Winget et al. |
| 2005/0165684 A1 | 7/2005 | Jensen et al. |
| 2005/0166060 A1 | 7/2005 | Goldthwait et al. |
| 2005/0242921 A1 | 11/2005 | Zimmerman et al. |
| 2005/0255889 A1 | 11/2005 | Haseba et al. |
| 2006/0044115 A1 | 3/2006 | Doi et al. |
| 2006/0089912 A1 | 4/2006 | Spagna et al. |
| 2006/0165060 A1 | 7/2006 | Dua |
| 2006/0174322 A1 | 8/2006 | Turner et al. |
| 2006/0174332 A1 | 8/2006 | Bauban et al. |
| 2006/0230145 A1 | 10/2006 | Zarakhovsky et al. |
| 2006/0235796 A1 | 10/2006 | Johnson et al. |
| 2006/0237528 A1 | 10/2006 | Bishop et al. |
| 2006/0271643 A1 | 11/2006 | Stallman |
| 2007/0055749 A1 | 3/2007 | Chien |
| 2007/0088950 A1 | 4/2007 | Wheeler et al. |
| 2007/0107044 A1 | 5/2007 | Yuen et al. |
| 2007/0156436 A1 | 7/2007 | Fisher et al. |
| 2007/0192245 A1 | 8/2007 | Fisher et al. |
| 2007/0194123 A1 | 8/2007 | Frantz et al. |
| 2007/0202894 A1 | 8/2007 | Dhebri et al. |
| 2007/0214155 A1 | 9/2007 | Chang et al. |
| 2007/0255653 A1 | 11/2007 | Tumminaro et al. |
| 2008/0084272 A1 | 4/2008 | Modiano |
| 2008/0147546 A1 | 6/2008 | Weichselbaumer et al. |
| 2008/0208759 A1 | 8/2008 | Royyuru |
| 2008/0210754 A1 | 9/2008 | Lovett |
| 2008/0222031 A1 | 9/2008 | Shattner et al. |
| 2008/0227471 A1 | 9/2008 | Dankar et al. |
| 2008/0307515 A1 | 12/2008 | Drokov et al. |
| 2009/0044025 A1 | 2/2009 | She |
| 2009/0062939 A1 | 3/2009 | Park |
| 2009/0119190 A1 | 5/2009 | Realini |
| 2009/0138366 A1 | 5/2009 | Bemmel et al. |
| 2009/0165121 A1 | 6/2009 | Kumar |
| 2009/0233579 A1 * | 9/2009 | Castell ................ G06Q 20/105 455/411 |
| 2009/0235178 A1 | 9/2009 | Cipriani et al. |
| 2009/0287565 A1 | 11/2009 | Bishop et al. |
| 2009/0288012 A1 | 11/2009 | Hertel et al. |
| 2009/0305725 A1 | 12/2009 | Shin et al. |
| 2010/0031349 A1 | 2/2010 | Bingham |
| 2010/0049615 A1 | 2/2010 | Rose et al. |
| 2010/0057843 A1 | 3/2010 | Landsman et al. |
| 2010/0144314 A1 | 6/2010 | Sherkin et al. |
| 2010/0146263 A1 | 6/2010 | Das et al. |
| 2010/0161410 A1 | 6/2010 | Tulloch |
| 2010/0262830 A1 | 10/2010 | Kusakawa et al. |
| 2010/0268618 A1 | 10/2010 | McQuilken |
| 2010/0318801 A1 | 12/2010 | Roberge et al. |
| 2011/0022484 A1 | 1/2011 | Smith |
| 2011/0070901 A1 | 3/2011 | Alward |
| 2011/0078081 A1 * | 3/2011 | Pirzadeh ................ G06Q 20/20 705/44 |
| 2011/0131419 A1 | 6/2011 | Dowds et al. |
| 2011/0137804 A1 | 6/2011 | Peterson |
| 2011/0219230 A1 | 9/2011 | Oberheide et al. |
| 2011/0251955 A1 | 10/2011 | Lam |
| 2012/0005026 A1 | 1/2012 | Khan et al. |
| 2012/0130714 A1 | 5/2012 | Zeljkovic et al. |
| 2012/0144461 A1 | 6/2012 | Rathbun |
| 2012/0185932 A1 * | 7/2012 | Stougaard ................ H04Q 9/00 726/16 |
| 2012/0198228 A1 | 8/2012 | Oberheide et al. |
| 2012/0303528 A1 | 11/2012 | Weiner et al. |
| 2012/0331536 A1 | 12/2012 | Chabbewal et al. |
| 2013/0023240 A1 | 1/2013 | Weiner et al. |
| 2013/0046976 A1 | 2/2013 | Rosati et al. |
| 2013/0204690 A1 | 8/2013 | Liebmann |
| 2013/0212387 A1 | 8/2013 | Oberheide et al. |
| 2013/0267200 A1 | 10/2013 | Weiner et al. |
| 2014/0040149 A1 | 2/2014 | Fiske |
| 2014/0067509 A1 | 3/2014 | Weiner |
| 2014/0114846 A1 | 4/2014 | Weiner |
| 2014/0282961 A1 | 9/2014 | Dorfman et al. |
| 2014/0376385 A1 | 12/2014 | Boss et al. |
| 2015/0073992 A1 | 3/2015 | Weiner et al. |
| 2015/0142589 A1 | 5/2015 | Jin et al. |
| 2015/0304850 A1 | 10/2015 | Weiner et al. |

FOREIGN PATENT DOCUMENTS

| | | |
|---|---|---|
| CN | 101916487 A | 12/2010 |
| CN | 102057385 A | 5/2011 |
| EP | 1424861 A1 | 6/2004 |
| EP | 1460573 A2 | 9/2004 |
| EP | 2611097 | 7/2013 |

(56) References Cited

FOREIGN PATENT DOCUMENTS

| | | |
|---|---|---|
| FR | 2832829 | 5/2003 |
| GB | 2460304 A | 12/2009 |
| JP | 2001-084311 | 3/2001 |
| JP | 2005-173982 | 6/2005 |
| JP | 2005-215849 | 8/2005 |
| JP | 2005-276025 | 10/2005 |
| JP | 2005-533316 | 11/2005 |
| JP | 2006-014159 | 1/2006 |
| JP | 2006-221351 | 8/2006 |
| JP | 2006-338638 | 12/2006 |
| JP | 2006-350450 | 12/2006 |
| JP | 2007-188150 | 7/2007 |
| JP | 2007-280363 | 10/2007 |
| JP | 2008-210368 | 9/2008 |
| JP | 2009-058637 | 3/2009 |
| JP | 2009-193155 | 8/2009 |
| JP | 2010-009161 | 1/2010 |
| JP | 2010-231777 | 10/2010 |
| JP | 2010-250374 | 11/2010 |
| JP | 2011-053767 | 3/2011 |
| WO | 9834421 A2 | 8/1998 |
| WO | 0173580 A1 | 10/2001 |
| WO | 0208981 A1 | 1/2002 |
| WO | 0219199 A1 | 3/2002 |
| WO | 0242926 A1 | 5/2002 |
| WO | 02060209 A1 | 8/2002 |
| WO | 02102099 A2 | 12/2002 |
| WO | 03027937 A2 | 4/2003 |
| WO | 03046847 A1 | 6/2003 |
| WO | WO 2006/090392 | 8/2006 |
| WO | 2006102848 A1 | 10/2006 |
| WO | 2007021658 A2 | 2/2007 |
| WO | 2007048976 A2 | 5/2007 |
| WO | 2007106906 A2 | 9/2007 |
| WO | 2007117073 A1 | 10/2007 |
| WO | 2008027620 A1 | 3/2008 |
| WO | 2009032687 A2 | 3/2009 |
| WO | 2009113057 A1 | 9/2009 |
| WO | 2009156880 A1 | 12/2009 |
| WO | 2010087535 A1 | 8/2010 |
| WO | 2010111023 A1 | 9/2010 |
| WO | 2010120222 A1 | 10/2010 |
| WO | WO 2010/140876 | 12/2010 |
| WO | 2011083471 A1 | 7/2011 |
| WO | WO 2012/156977 | 11/2012 |
| WO | WO 2012/168940 | 12/2012 |
| WO | WO 2013/030832 | 3/2013 |
| WO | WO 2013/153552 | 10/2013 |

OTHER PUBLICATIONS

Latze et al., "A Proof of Concept Implementation of a Secure E-Commerce Authentication Scheme", Jul. 2009, Information Security South Africa, Johannesburg, South Africa, retrieved from Internet on Jun. 25, 2012 from http://www.latze.ch/latze-ruppen-ultesnitsche.pdf.
Mcheck Brochure, Retrieved from Internet on Jun. 25, 2012 from http://main.mchek.com/pdf/mchek-brochure.pdf.
Gao, "P2P-Paid: A Peer-to-Peer Wireless Payment System", Proceedings of the 2005 Second IEEE International Workshop on Mobile Commerce and Services (WMCS'05), 2005, 0-7695-2391-9/05, Institute of Electrical and Electronics Engineers.
Vamosi et al, "Multi-Channel Authentication Via Mobile Banking", Javelin Strategy & Research, Sep. 2009, Pleasonton, CA.
Carr, "Mobile Payment Systems and Services: An Introduction", 2007, Retrieved from Internet on Jun. 25, 2012 from http://www.mpf.org.in/pdf/Mobile%20Payment%20Systems%20and%20Services.pdf.
"Mobile Payment", Wikipedia, the free encyclopedia, Accessed on Jan. 20, 2010.
Fun et al., "Privacy in New Mobile Payment Protocol", World Academy of Science, Engineering and Technology, 2008, issue 47, pp. 443-447.
Screen Shot of web site of Mobiqa Airlines, Retrieved from the Internet on Dec. 9, 2009 from http://www.mobiqa.com/airlines/?gclid=CLqyxOefyZ4CFWlr4wodbx7wrg.
"IPCS & barcode enabling mobile payment", Retrieved from the Internet on Jun. 25, 2012 from http://www.ipcslive.com/pdf/IPCSbar.pdf.
Newton's Telecom Dictionary, Jul. 2010, 'Mixed Mode'—'Nana', CMP Books, Gilroy, CA.
Weiss, "Performing Relay Attacks on ISO 14443 Contactless Smart Cards using NFC Mobile Equipment", Master's Thesis in Computer Science, University of Munich, Germany, May 17, 2010.
Mulliner, "Vulnerability Analysis and Attacks on NFC-enabled Mobile Phones", 2009 International Conference on Availability, Reliability and Security, pp. 695-700, 978-0-7695-3564-7/09, Institute of Electrical and Electronic Engineers.
Mulliner, "Attacking NFC Mobile Phones", 25th Chaos Communication Congress, Dec. 2008, Berlin, Germany.
"Is NFC too Slow?", Insight-Driven Retailing Blog, Oracle, Retrieved from the Internet on May 15, 2011.
Heine, "GSM Networks: Protocols, Terminology, and Implementation", 1999, pp. 116 and 328, Artech House, Inc., Norwood, MA.
International Search Report for PCT/IL2012/050328 mailed by European Patent Office dated Dec. 21, 2012.
Written Opinion of the International Searching Authority for PCT/IL2012/050328 mailed by European Patent Office dated Dec. 21, 2012.
Supplementary European Search Report for European Application No. 11731739.6, dated Aug. 7, 2013, 7 pages.
Office Action for U.S. Appl. No. 13/520,185, dated Jul. 9, 2015.
Final Office Action for U.S. Appl. No. 13/520,185, dated Jan. 6, 2016.
International Search Report and Written Opinion for International Application No. PCT/IL2011/00015, dated May 23, 2011, 7 pages.
International Search Report and Written Opinion for International Application No. PCT/IL2012/050178, dated Sep. 17, 2012, 8 pages.
International Search Report and Written Opinion for International Application No. PCT/IL2012/050199, dated Sep. 26, 2012.
International Search Report and Written Opinion for International Application No. PCT/IL2013/050318, dated Jul. 31, 2013.
International Search Report and Written Opinion for International Application No. PCT/IL2009/000263, dated Jul. 6, 2009.
Office Action for U.S. Appl. No. 13/731,028, dated Nov. 5, 2015.
Office Action for U.S. Appl. No. 13/625,148, dated Apr. 10, 2014.
Office Action for U.S. Appl. No. 13/625,148, dated Jun. 14, 2013.
Office Action for U.S. Appl. No. 13/625,148, dated Jan. 10, 2014.
Office Action for U.S. Appl. No. 14/755,707, dated Oct. 21, 2015.
Office Action for U.S. Appl. No. 14/703,189, dated Aug. 13, 2015.
First Office Action for Chinese Application No. 201280035348.3, dated Jan. 29, 2016.
Final Office Action for U.S. Appl. No. 14/703,189, dated Mar. 7, 2016.
Office Action for U.S. Appl. No. 13/520,185, dated Jul. 29, 2016.
Office Action for U.S. Appl. No. 14/118,232, dated Apr. 21, 2016.
Office Action for Japanese Application No. 2014-510948, dated Jun. 28, 2016.
Office Action for Japanese Application No. 2014-514222, dated May 24, 2016.
Office Action for U.S. Appl. No. 14/124,719, dated Jun. 16, 2016.
Office Action for Japanese Application No. 2014-527810, dated Apr. 26, 2016.
Final Office Action for U.S. Appl. No. 13/731,028, dated Jun. 8, 2016.
Final Office Action for U.S. Appl. No. 14/755,707, dated May 12, 2016.
Office Action for U.S. Appl. No. 13/520,185, dated Feb. 10, 2017.
Office Action for U.S. Appl. No. 14/118,232, dated Nov. 14, 2016.
Final Office Action for U.S. Appl. No. 14/124,719, dated Jan. 30, 2017.
Office Action for U.S. Appl. No. 13/731,028, dated Nov. 9, 2016.
Final Office Action for U.S. Appl. No. 14/511,751, dated Dec. 19, 2016.
Office Action for U.S. Appl. No. 14/755,707, dated Nov. 17, 2016.
Office Action for U.S. Appl. No. 14/703,189, dated Sep. 23, 2016.

(56) References Cited

OTHER PUBLICATIONS

Dan Balaban, "Pioneering NFC Provider Service Provider Adds Bar Codes to New NFC Trial," available on May 8, 2010, retrieved <http://www.nfctimes.com/news/pioneering-nfc-service-provider-adds-bar-codes-new-nfc-trial>.

Office Action for Japanese Application No. 2014-527810, dated Mar. 14, 2017.

\* cited by examiner

SYSTEM AND METHOD FOR SECURE TRANSACTION PROCESS VIA MOBILE DEVICE

CROSS-REFERENCE TO RELATED APPLICATIONS

This application claims priority under 35 U.S.C. § 371 to, and is a U.S. National Phase Application of, International Patent Application No. PCT/IL2012/050328, filed Aug. 26, 2012, which claims benefit of U.S. Provisional Patent Application Ser. No. 61/529,258 filed Aug. 31, 2011 entitled "METHOD AND APPARATUS FOR SECURE TRANSACTIONS WITH A MOBILE DEVICE"; and U.S. Provisional Patent Application Ser. No. 61/566,660 filed Dec. 4, 2011 entitled "SYSTEM AND METHOD FOR SECURE TRANSACTION PROCESS VIA MOBILE DEVICE", the entire contents of each of which are incorporated herein by reference.

TECHNICAL FIELD

The present disclosure relates generally to the field of transaction systems and in particular to a system and method for performing a secure transaction utilizing a mobile device and a transaction server.

BACKGROUND ART

Payments by credit or debit cards represent a large portion of consumer spending. Historically, credit or debit cards were encoded with a magnetic stripe, which allows a transaction responsive to a transaction device arranged to read information encoded on the magnetic stripe, in a secured manner. The device reading the magnetic stripe is typically in communication with the credit card issuer via a transaction network, the credit card issuer ultimately approving the transaction. Credit or debit cards are unfortunately susceptible to theft which may be unrealized by the user for a significant period of time.

Advances in technology have led to the development of contactless smart cards, such as those defined under ISO/IEC 7810 and ISO/IEC 14443, also known as Near Field Communication (NFC). Similar technology is available meeting other standards or protocols generally under the term radio frequency identification (RFID), with the range of RFID typically restricted to be of the same order as that of NFC. The term contactless element (CE) as used throughout this document refers to any short range communication device operating under any of NFC, RFID or other short range communication standard with range on the same order as that of NFC, and typically require that the CE be juxtaposed with a reader. The use of optically readable codes are specifically included herein with the definition of a CE. Such CE smart cards may be used for transactions, however since they may be read by any reader within about 4 cm, they do not provide for increased security. As such, CE smart cards are typically only used for low value transactions, wherein a small value is pre-loaded on the CE smart card, and the small value is depreciated with each transaction until a limit is reached.

Mobile devices (MDs) are increasingly being used for financial transactions due to their ubiquity, available screen and input devices. An MD as used herein includes any electronic MD used for personal functionalities such as multimedia playing, data communication over a network or voice communication. One embodiment of an MD is a mobile station, also known as a mobile communication device, mobile phone, mobile telephone, hand phone, wireless phone, cell phone, cellular phone, cellular telephone, mobile handset or cell telephone.

With the development of IEEE 802.11, and the broad establishment of the resultant wireless networks, various MDs have been developed which communicate over available wireless networks in addition to cellular telephone capabilities. Furthermore, various MDs have been developed with the ability to access the Internet both over a wireless network and/or over a cellular network.

The ubiquitous MD, having an associated means for user identification and charging expenses, presents an opportunity to utilize the MD as an electronic wallet. There are several known methods for providing a service or a product, and in particular, payment for products or services other than phone usage or airtime, by using a mobile station.

CEs in cooperation with an MD have been developed into two main groups: devices which are in communication with a controller of the MD, such as to the MD's CPU; and devices which are not in communication with the MD's CPU. In the case of CEs in communication with the MD's CPU one can find various devices, such as NFC devices on SIM cards, also known as "SIM Contactless Element" (SCE), external cards such as SD cards with NFC devices, SIM add-on Contactless Elements (SCCE), and NFC devices found within the MD's hardware. The above group of devices denoted herein as "embedded CE" (ECE) devices can be used in the same manner as CE devices which are not connected to the MD's CPU for applications where the CE reader communicates with the CE device directly and the communication doesn't rely on any action of the MD's CPU. It is to be noted that in the event that the CE comprises an optically readable code displayed on a display of the MD, the MD is inherently an ECE device.

The group of CEs which are not connected to an MD CPU may include NFC or RFID tags, stickers, key fobs, optically readable codes which may be affixed to the MD, and other form factors. Such a CE, when secured in relation to the MD may thus be utilized to provide an identification number read by a reader within proximity of the CE.

Concerns for security have evolved so that a CE enabled MD, i.e. an MD wherein the CE is in communication with a controller of the MD, is now preferably provided with a secure element (SE), which is defined herein as a tamper proof element arranged to embed applications with the required level of security and features. In further detail, an SE is an element wherein access to data or functions stored in the SE is controlled by security levels such that only authorized parties may access the data or functions. Thus, contents of the SE can not be copied, written to, or read from, without a predetermined security key, access to which is controlled. The term security key is particularly addressed in this application to keys as known in cryptography, and is not meant to be a physical, or mechanical key. Typically security is provided in cooperation with one or more keys which are controlled by the SE issuer. The SE may be supplied as part of the CE, as part of the MD, or as an additional element which is removable form the MD. There is no limitation to the number of SEs on an MD, and in particular a plurality of SEs may coexist on a single MD. One of the SE's may be implemented on a single subscriber identity module (SIM) without limitation.

Advantageously, the SE is arranged to provide secured storage, and as a result personal information can be stored therein. Disadvantageously, the SE is typically limited in size, i.e. in memory space, and thus is incapable of storing a complete range of personal information.

As transaction systems have become more sophisticated and in more widespread use, the incidence of fraudulent transactions have also increased. User devices such as portable computers have been successfully hacked into such that access to secure web sites, such as banking and shopping sites, have become problematic, since the password and/or any other entered information may be fraudulently obtained by a surreptitious hacker. Similarly, access to secure web sites from a shared computer, such as an Internet café computer, may compromise both the user name and password of the unsuspecting user.

As an MD becomes increasingly utilized for various transactions, and as security features are properly disposed thereon, it would be convenient to add further capabilities thereto, which may involve information that requires occasional updating. The current status of SE production, wherein control is maintained by the SE issuer, makes this a challenging proposition.

What is needed, and is not provided by the prior art, is a system and method for providing secure transactions in cooperation with an MD, thus providing increased security to a user.

SUMMARY OF INVENTION

In view of the discussion provided above and other considerations, the present disclosure provides methods and apparatus to overcome some or all of the disadvantages of prior and present methods of performing a secure transaction. Other new and useful advantages of the present methods and apparatus will also be described herein and can be appreciated by those skilled in the art.

Advantageously, a secured element is provided arranged to output a plurality of identifiers with different levels of security. Additionally, preferably the secured element further provides additional security features such as encryption and decryption to allow for storage of information in an encrypted manner on a memory associated with the mobile device application processor.

In one independent embodiment, a secure element with a user security domain thereon is provided, the user security domain comprising: a security domain control circuitry; an encoder/decoder functionality responsive to the security domain control circuitry; and a secured keys storage in communication with the security domain control circuitry, the encoder/decoder functionality arranged to: encode data responsive to at least one first key stored on the secured keys storage, and output an encoded data; and decode received data responsive to at least one second key stored on the secured keys storage, and output a decoded data.

In one embodiment, the secure element further comprises a memory in communication with the security domain control circuitry, the encoder/decoder functionality arranged to store the output encoded data on the memory responsive to the security domain control circuitry. In one further embodiment, the encoder/decoder functionality is arranged to retrieve the output encoded data from the memory responsive to the security domain control circuitry as the received data. In another embodiment, the user security domain further comprises a firewall functionality responsive to the security domain control circuitry, the firewall functionality arranged to encapsulate data.

In one embodiment, the user security domain further comprises a firewall functionality responsive to the security domain control circuitry, the firewall functionality arranged to encapsulate data received from a near field communication device and transmit the encapsulated data to a mobile device processor. In another embodiment, the user security domain further comprises a verification functionality responsive to the security domain control circuitry, the verification functionality arranged to verify at least one verification passcode, and output a verification signal whose state is responsive to the verification.

In one further embodiment, the secure element further comprises a memory in communication with the verification functionality, the memory arranged for storage of a PIN verification value, wherein in the event that the verification passcode is a PIN, the verification functionality is arranged to verify the PIN responsive to the PIN verification value. In another further embodiment, the verification functionality is in communication with the secured keys storage, and the verification passcode is verified in cooperation with at least one third key stored on the secured keys storage.

In one embodiment, the user security domain further comprises a digital signature functionality responsive to the security domain control circuitry and in communication with the secured keys storage, the digital signature functionality arranged to: receive data; and return the received data digitally signed responsive to at least one fourth key stored on the secured keys storage. In another embodiment, the user security domain further comprises: a secured first identifier storage functionality; and a secured second identifier, the second identifier arranged in cooperation with a first pseudo-random number generator functionality to output an encoded second identifier.

In one further embodiment, the secured second identifier is arranged to output separate encoded second identifiers to each of a mobile device processor and a near field communication controller. In another further embodiment, the secured second identifier is in communication with the secured keys storage, the second identifier encoded in cooperation with the first pseudo-random number generator functionality responsive to at least one fourth key stored on the secured keys storage.

In one further embodiment, the identifier is arranged in cooperation with a second pseudo-random number generator functionality to output an encoded third identifier. In one yet further embodiment, the secured third identifier is arranged to output separate encoded third identifiers to each of a mobile device processor and a near field communication controller. In another yet further embodiment, the secured third identifier is in communication with the secured keys storage, the third identifier encoded in cooperation with the second pseudo-random number generator functionality responsive to at least one fifth key stored on the secured keys storage.

In another independent embodiment, a mobile device is provided, the mobile device comprising: a mobile device processor; a data entry device; a secure element with a user security domain thereon, the secure element in communication with the mobile device processor; and a security control, the security control arranged in a first mode to provide information from the data entry device to the mobile device processor and in a second mode to provide information from the data entry device to the user security domain.

In one embodiment, the security control is switchable arranged so that in the first mode information from the data entry device is directed to the mobile device processor and in the second mode to information from the data entry device is directed to secure element. In another embodiment, the security control comprises a secured encryption key, and the security control is arranged in the first mode to pass the information from the data entry device to the mobile device processor in an unencrypted form, and in the second mode the security control is arranged to pass the information from the data entry device to the mobile device processor in an encrypted form, the mobile device processor arranged to transmit the encrypted information to the user security domain.

In one embodiment, the mobile device further comprises a peripheral device, the security control arranged in the first mode to provide information from the peripheral to the mobile device processor and in a second mode to provide information from the peripheral to the secure element. In another embodiment, the mobile device further comprises a peripheral device in communication with the mobile device processor, the security control arranged in the second mode to: encrypt information from the peripheral; and provide the encrypted information from the peripheral to the mobile device processor.

In one embodiment, the mobile device further comprises an indicator arranged to output an indication when the security control is in the second mode. In another embodiment, the mobile device further comprises a secure keypad in communication with the secure element, the secure keypad not in communication with the mobile device processor.

In one embodiment, the user security domain of the secure element comprises: a security domain control circuitry; an encoder/decoder functionality responsive to the security domain control circuitry; and a secured keys storage in communication with the security domain control circuitry. In another embodiment, the user security domain of the secure element comprises: a security domain control circuitry; and a verification functionality responsive to the security domain control circuitry, the verification functionality arranged to verify a verification passcode received in the second mode from the data entry device, and output a verification signal to the security domain control circuitry whose state is responsive to the verification.

In one independent embodiment, a mobile device is provided, the mobile device comprising: a mobile device processor; a secure element in communication with the mobile device processor; a security control in communication with the mobile device processor and the secure element; data entry device in communication with the security control; he security control arranged in a first mode to provide information from the data entry device to the mobile device processor and in a second mode to provide information to the secure element, he secure element arranged to encrypt the provided information and provide the encrypted information to the mobile device processor.

In one embodiment, the mobile device further comprises a peripheral device, the peripheral device in communication with the mobile device processor and the security control, wherein information from the peripheral device is transmitted in parallel to the mobile device processor and the security control. In one further embodiment, the security control is further arranged to encrypt the information from the peripheral device and provide the encrypted information from the peripheral device to the mobile device processor. In one yet further embodiment, the mobile device processor is arranged to transmit the provided encrypted information from the peripheral device to a remote server in communication with the mobile device.

Additional features and advantages of the invention will become apparent from the following drawings and description.

BRIEF DESCRIPTION OF DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DESCRIPTION OF EMBODIMENTS

Figure 1A:
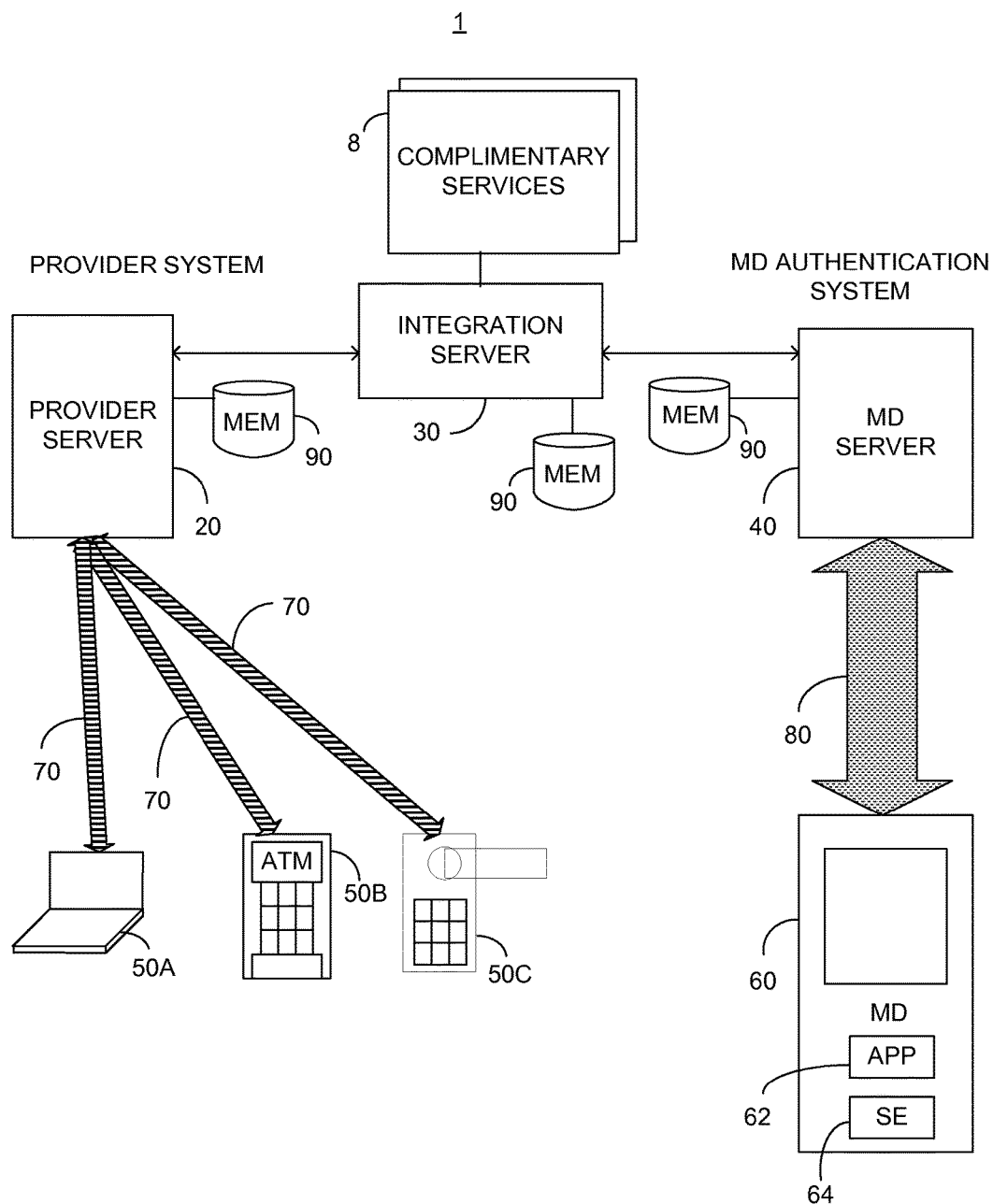
FIG. 1A illustrates a high level block diagram of an embodiment of transaction system providing advantageous partitioning in cooperation with an integration server thereby allowing out of band authentication for use with a provider system.

Before explaining at least one embodiment in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting. In particular, the term connected as used herein is not meant to be limited to a direct connection and includes communication of any sort, and allows for intermediary devices or components without limitation.

In the following description, the term mobile device (MD) includes any electronic mobile device used for personal functionalities such as multimedia playing, data communication over a network or voice communication, including but not limited to a mobile station (MS). For clarity, the term MS refers to any mobile communication device, mobile phone, mobile telephone, hand phone, wireless phone, cell phone, cellular phone, cellular telephone, cell telephone, or other electronic device used for mobile voice or data communication over a network of base stations. Although in the following description, communication is described in certain embodiments using an example of cellular communication, particularly, global system for mobile communication (GSM), it will be understood that the scope of the invention is not limited in this respect, and that the communication method used may be based on any suitable communication protocol, including without limitation, Universal Mobile Telecommunications System (UMTS), IEEE 802.11, IEEE 802.16x and CDMA. The terms "decrypted" and "decoded" are used interchangeably and have the same meaning throughout this document. Similarly, the terms "encrypted" and "encoded" are used interchangeably and have the same meaning throughout this document.

FIG. 1A illustrates a high level block diagram of an embodiment of transaction system 1 providing advantageous partitioning of prior art authentication methods, including without limitation payment means authentication methods and/or user authentication methods, thereby providing increased flexibility. Transaction system 1 comprises: a provider server 20 in communication with devices which may be any, or all, of devices such as 50A, 50B and 50C, collectively devices 50, the communication provided via provider band 70; an integration server (IS) 30; complimentary services 8 in communication with IS 30; an MD server 40; and an MD 60 which may have an associated SE 64 and may be running on-board an application 62 on a memory associated with MD 60, application 62 running on a processor of MD 60. A further application may be stored on a memory associated with SE 64 and run on a controller of the SE 64. Communication between MD server 40 and MD 60 is provided via customer band 80, which is typically separate and distinct from provider band 70. Each of provider sever 20, IS 30 and MD server 40 has associated therewith a memory 90 for storing data and operating instructions as required, and each further exhibit a processor for performing the method described herein and providing services. Memory 90 may be internal or external of the associated device without limitation.

Provider server 20 implements a provider system known to the prior art, arranged to provide services to a user via a device 50, such a computer 50A, an ATM 50B; and a gate 50C. MD server 40 implements an MD authentication system known to the prior art for providing financial services, such as login and purchases, via MD 60 in cooperation with application 62 and preferably with SE 64. Provider server 20 further provides advanced features as will be described further below in cooperation with IS 30.

Authentication between provider server 20 and the various devices 50 according to the prior art is proprietary, and effort must be continuously maintained to prevent fraud. The arrangement of provider server 20 and the various devices 50 via provider band 70 is known as a provider system. Provider server 20 is in bi-directional communication with each user device 50 via provider band 70, illustrated as a horizontally hatched bi-directional arrow, which may be implemented via the Internet. Further, the horizontally hatched bi-directional arrow represents a bi-directional communication session.

Authentication between MD server 40 and MD 60 according to the prior art is proprietary, and effort must be continuously maintained to prevent fraud. MD 60 is typically constrained to a limited number of MD servers 40 which according to the prior art each have their respective applications stored on MD 60, and thus is unable to freely select an MD server 40 without a propriety and cumbersome installation process involving security precautions. The arrangement of MD server 40 and MD 60 via customer band 80 is known as an MD authentication system. Application 62 is commonly known as a "mobile wallet". Customer band 80 is illustrated as a dot filled bi-directional arrow, and may be implemented via a data connection between MD 60 and MD server 40, such a wireless LAN or an IEEE 802.11 compatible connection. Further, the dot filled bi-directional arrow represents a bi-directional communication session. MD server 40, as described herein further provides advanced features as will be described further below in cooperation with IS 30.

IS 30 advantageously, and innovatively, provides linkage between the provider system and the MD authentication system, as will be described further hereinto below. In particular, IS 30 is in bidirectional communication with each of provider server 20 and MD server 40 to provide enhanced services while maintaining prior art partitioning.

Such partitioning, in cooperation with IS 30, advantageously provides integration with prior art authentication protocols and enhances the experience of an MD 60 based user, while increasing the provider's service ubiquity, strengthening security and contributing to cost saving. Transaction system 1 is an open system as it may support one or multiple authentication systems 40, thus provider system 20 is not dependent on a predefined and pre-integrated set of authentication vendors. Further, transaction system 1 may support multiple provider systems and multiple users MD's 60 with at least one MD server 40. MD server 40 preferably provides a single sign on to all provider's systems 20 and thus transaction system 1 may exhibit one MD server 40 for multiple provider's system 20.

In operation, IS 30 provides integration between provider server 20 and MD server 40; in particular, and as described below, IS 30 enables MD server 40 to provide authentication for provider server 20 to provide a service to device 50.

In some further detail, provider server 20 is in bi-directional communication with user device 50 via provider band 70, which may be implemented via the Internet; and may be embodied in one of many systems such as an online banking system where the device 50 may be embodied by user PC 50A or an ATM 50B, embodied in a vending machine system and/or access control system such as gate 50C. Provider server 20, according to the prior art, comprises internal authentication methods, typically based on presentation of credentials by a user at device 50, such as a magnetic credit card acceptance apparatus. Furthermore, a user identification or password may be required to be entered at a data entry device of device 50. However, as indicated above, the requirement to provide credentials, particularly including the use of a user ID and password exposes the user to fraud attacks such as key logger software surreptitiously loaded onto device 50. As will be described further below, the operation of IS 30 enables secure provision of services from provider server 20 to device 30 without the need for the provision of highly confidential credentials at device 50.

Instead, a significantly lower level of identification is utilized, one which if compromised causes significantly less damage than the compromise of a highly confidential credential. For example, only harassment damage may occur if compromised, however no direct financial damage can be caused. Such identification will be referred to as an unsecured identification, since compromise of the unsecured identification causes minimal damage since, as will be described further, the unsecured identification leads transaction system 1 to a secure user authentication. In one embodiment provider server 20 may be in communication with a plurality of ISs 30 without limitation. In certain embodiments, the provision of the unsecured ID to provider server 20 via device 50 is done via one or more of: entry of data on a keypad, voice identification, or by reading short range radio based information such as RFID, NFC, Bluetooth, I.R, or the reading of a Barcode, without limitation.

MD server 40 provides an authentication service, including at least request for authentication from a user of MD 60 and the authentication of any received response. Authentication by MD server 40 and/or IS 30 is accomplished in cooperation with the user's MD 60 and may include one or more authentication factors and out of band authentication. MD 60 preferably include SE 64 having security software installed thereon which contributes to the increased security level achieved by transaction system 10 as be described further below.

IS 30 enable transaction system 1 to act as an open system which allows a user to be authenticated by more than one MD server 40 without limitation. Each MD server 40 may be associated with a unique application 62, or a plurality of MD servers 40 may share a single application 62 without limitation. Transaction system 1 provides a supplemental user authentication service to provider server 20 in cooperation with one or more MD server 40. Complementary services 8, in communication with IS 30, supply enhanced services for IS 30 such as coupons or advertisement services. In one embodiment IS 30 is embedded in MD server 40, and in another embodiment both provider server 20 and IS 30 are embedded in MD server 40. Transaction system 1 is preferably arranged to perform enhanced transaction security irrespective of the protocol used by provider server 20 in cooperation with device 50 to capture a user's unsecured identification. Integration server 30 may be programmed to select one of a plurality of MD servers 40 responsive to one of multiple parameters including user pre-configuration, pre-transaction time indication originating from a user application 62 and provider server 20 preferences.

An authentication request originated by provider server 20 to IS 30 may include the desired authentication type and transaction information to assist the authentication process. Such transaction information advantageously may comprise location information regarding device 50 which is preferably confirmed as consonant with location information for MD 60 physical location by MD server 40. Authentication type may comprise any or all of: user authenticity indication, which may include something user has, something user knows and where user is located; authentication risk score; payment authentication; user details; and MD server 40 details, without limitation. In one embodiment, the authentication process includes multiple intermediate steps which include the interaction between IS 30 and MD server 40, such as presenting at least one image on a display of MD 60 which preferably works in conjunction with more than one image on a display of device 50, as described further below in FIG. 1F. In another embodiment provider server 20 may request the user to enter a password associated with provider server 20 on MD 60 as part of the authentication process.

In one embodiment, capturing user unsecured identification may be done by automatic protocols provided from user MD 60 via NFC or other short range communication, and not by a user keypad entry. In such cases, further information may be transmitted from device 50 to user MD 60 during the stage of capturing an unsecured identification. Advantageously, such information may comprise an address for provider server 20, such an address stored on device 50. Such information may assist to detect frauds such as man-in-the-middle attack when verified against expected information values.

As indicated above, each of provider server 20, IS 30 and MD server 40 exhibits a processor and, as indicated above, are in communication with a memory 90 which may be internal, or external without exceeding the scope. Memory 90 exhibits a non-transitory computer readable medium upon which instructions for operation of the respective provider server 20, IS 30 and MD server 40, as described below are stored. Memory 90 may be further utilized to provide storage of data as required. There is no requirement that the various memories 90 be physically disparate, and the various memories 90 may be implemented on a single cloud server without exceeding the scope.

Figure 1B:
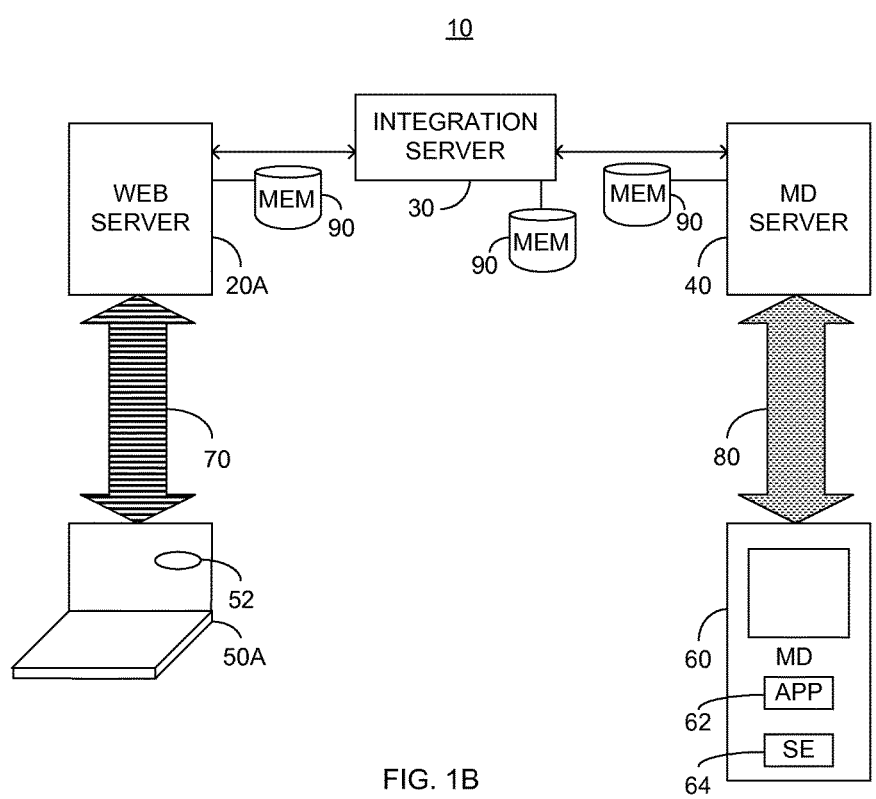
FIG. 1B illustrates a high level block diagram of an embodiment of transaction system providing advantageous partitioning thereby allowing for web out of band login (OOBL) for use with a provider such as financial service provider.

FIG. 1B illustrates a high level block diagram of an embodiment of transaction system 10 providing advantageous partitioning thereby allowing for web out of band login (OOBL) for use with a service provider such as financial service provider. System is a particular instance of transaction system 1 described in relation to FIG. 1A, thus allowing for a deeper understanding of the operation thereof in relation to a particular embodiment where provider server 20 is implemented in web server 20A. In particular, transaction system 10 comprises: a web server 20A; an IS 30; and an MD server 40, each of which having a memory 90 in communication therewith. Web server 20A and MD server 40 are preferably associated with a unitary service provider. For clarity, a user device 50A, illustrated without limitation as a portable computer, and a user MD 60 are further shown, user MD 60 having loaded thereon an application 62 and further preferably comprising an SE 64. Service provider web server 20 is in bi-directional communication with user device 50A via a provider band 70, illustrated as a horizontally hatched bi-directional arrow, which may be implemented via the Internet. Further, the horizontally hatched bi-directional arrow represents a bi-directional communication session. Service provide MD server 40 is in bi-directional communication with user MD 60 via a customer band 80, illustrated as a dot filled bi-directional arrow, which may be implemented via an MD data connection, such a wireless LAN or an IEEE 802.11 compatible connection. Further, the dot filled bi-directional arrow represents a bi-directional communication session. Advantageously, security information is compartmentalized to prevent fraud.

Each of web server 20A, IS 30 and MD server 40 exhibits a processor and, as indicated above, are in communication with a memory 90 which may be internal, or external without exceeding the scope. Memory 90 exhibits a non-transitory computer readable medium upon which instructions for operation of the respective web server 20A, IS 30 and MD server 40, as described below are stored. Memory 90 may be further utilized to provide storage of data as required. There is no requirement that the various memories 90 be physically disparate, and the various memories 90 may be implemented on a single cloud server without exceeding the scope.

Figure 1C:
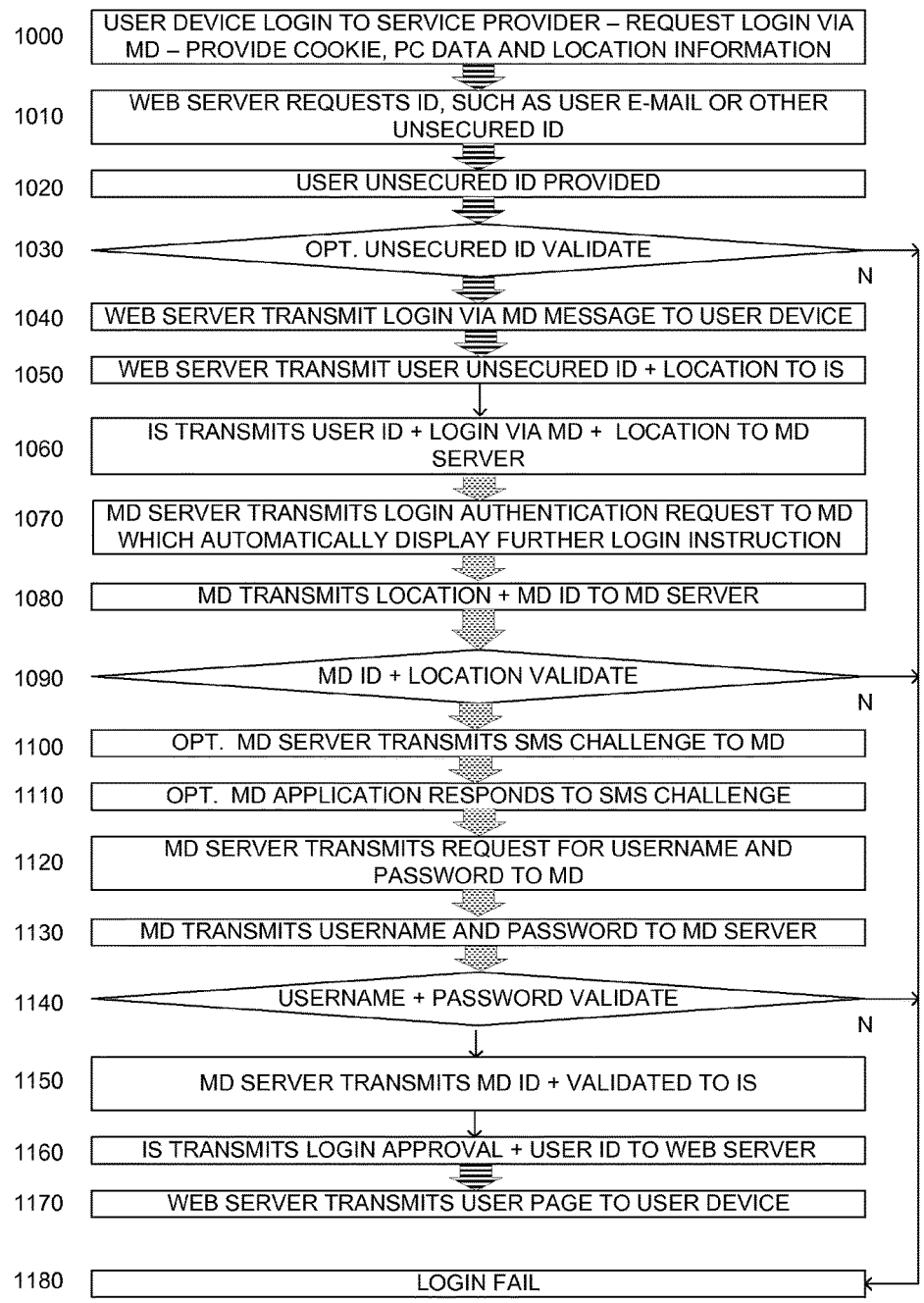
FIG. 1C illustrates a high level flow chart of an exemplary embodiment of the operation of the transaction system of FIG. 1B to provide secure login facilities to a user device without passing a private username or a password over the provider band.

FIG. 1C illustrates a high level flow chart of an exemplary embodiment of the operation of transaction system 10 of FIG. 1B to provide secure login facilities to user device 50A without passing a private username or a password over provider band 70. Such an embodiment is particularly useful when user device 50A is not solely the property of the user, such as a personal computer (PC) at an Internet café, however this is not meant to be limiting in any way. For clarity, the flow between stages are marked in a manner consonant with the band information of FIG. 1A, and thus flows within provider band 70 are shown as a horizontally hatched arrow, flows within customer band 80 are shown as a dot filled arrow and flows between IS 30 and either web server 20 or MD server 40 are shown as solid lines. Particular stages are performed responsive to instructions stored on the respective memory 90, as described above. It is to be noted that this flow, as well as the flows in FIG. 1D-1G, may apply to further exemplary embodiments such as transaction authentication for transactions performed after initial login, with the appropriate adaptations.

In stage 1000, user device 50A accesses a particular page or site of a web server 20A via provided band 70, and requests login via user MD 60. Optionally, an initial login page provided by web server 20A to user device 50A exhibits a quick OOBL logo 52, which notifies the user that upon selection login is to be completed through user MD 60. OOBL logo 52 is illustrated on a display portion of user device 50A for clarity. Alternately, login is constrained to be via OOBL for certain transactions. User device 50A preferably provides stored cookie information identifying user device 50A on a local memory. Optionally, the provided cookie information comprises computer identifying information, such as serial numbers or other configuration data. Web server 20A preferably determines location information of user device 50, optionally responsive to an Internet protocol address of user device 50. The particular page or site of web server 20A may be associated with a financial institution, merchant or service supplier without limitation.

In stage 1010 web server 20 requests a user ID from user device 50A, preferably a user unsecured ID which may be any ID the user chooses without limitation which is registered at least with IS 30 or with MD server 40. In an exemplary embodiment an e-mail address is utilized as a user unsecured ID, in another embodiment a phone number, such as an MSISDN, of user MD 60 is utilized as a user unsecured ID. It is to be understood, that pre-registration with IS 30 associating user unsecured ID with at least one MD server 40 which is further associated with a user MD 60 is preferably performed at a pre-registration stage, wherein a username and password, preferably different from the user unsecured ID, are defined and stored in a portion of memory 90 accessible by MD server 40 associated with the user unsecured ID.

In stage 1020, responsive to the request of stage 1010, a user supplies the user unsecured ID via user device 50A. In optional stage 1030 the user unsecured ID supplied is validated against the predefined user unsecured IDs stored in the memory accessible by web server 20A described above. In the event that the user unsecured ID is not validated, in stage 1180 a login fail message is generated, and displayed on a display device of user device 50A.

In stage 1040, a "login via MD" message is transmitted by web server 20 to user device 50A and displayed on a display device of user device 50A, thus prompting the user to continue the login on user MD 60 which will preferably automatically display further login instruction on stage 1070.

In stage 1050, the user unsecured ID of stage 1020, and the optional determined location information of stage 1000 is transmitted as an authentication request by web server 20A to IS 30.

In stage 1060, IS 30 transmits a login via MD request to MD server 40 including user unsecured ID of stage 1020, and the optional determined location information of stage 1000.

In stage 1070, MD server 40 transmits login authentication request to MD 60 which preferably triggers MD application 62 to automatically display further login instructions. Alternately, a user may initiate MD application 62 to display further login instructions.

In stage 1080, responsive to the authentication request from MD server 40 of stage 1070, MD 60 provides to MD server 40 location information and an identifier of user MD 60, which may be the MSISDN or other identifier or other group of identifiers unique to user MD 60 such as a cookie, an IMSI, an IMEI, a BT ID, without limitation, and are verifiable by MD server 40. Preferably, application 62 run on user MD 60, and stored on a local memory of user MD 60, performs the access to MD server 40 and provides the above mentioned datum. Further preferably, information transmission between user MD 60 and MD server 40 is via a secure sockets layer (SSL) link.

In stage 1090, MD server 40 compares the received user MD 60 identifier and location information with all pending login authentication requests transactions, to find a consonant pending login transaction, as described above in relation to stages 1040-1060. It is to be understood, that as described above, memory 90 of MD server 40 comprises a cross reference of user IDs, as described above in relation to stage 1010, and user MD 60 identifiers so as to determine if any user ID of a pending transaction is consonant with, i.e. cross-referenced with, a received user MD 60 identifier. Location information is further preferably compared for consonance to prevent against fraud. There is no requirement that location information consonance be exact, particularly since location information of user MD 60 may be provided by triangulation which does not provide pin-point accuracy, and location information of user device 50 may be similarly supplied by IP address which does not supply pin-point accuracy. Thus, a broad definition of location consonance is preferably utilized, such that only location disconsonance which is not physically possible is set to trigger a non-consonant outcome. Optionally, the location filter may be bypassed without exceeding the scope.

In the event that in stage 1090 a user MD 60 identifier and location information is consonant with a pending login transaction, MD server 40 proceeds and requests login information from user MD 60, as will be described further below. In particular in optional stage 1100, in order to strengthen the something you have security factor, MD server 40 performs an SMS challenge to user MD 60. In further detail, MD server 40 transmits an SMS message to user MD 60, optionally comprising an alphanumeric code. In stage 1110 the application running of user MD 60 described above responds to the SMS challenge, preferably by returning the received alphanumeric code. The above SMS challenge and response is known to those skilled in the art of mobile financial transactions and thus in the interest of brevity is not further detailed herein.

In the event of success of the SMS challenge and response of optional stages 1100-1110, or in the event that optional stage 1100-1110 are not implemented, in stage 1120 MD server 40 transmits a request to user MD 60 for a username and password, to be utilized for the pending login transaction of stage 1000.

In stage 1130, user MD 60, responsive to a user input gesture, transmits a username and password to MD server 40. The username and password are in one embodiment pre-registered with MD server 40, and thus may be validated by MD server 40 without communication with web server 20A. In an alternative embodiment, the username and password are registered with IS 30, or with web server 20A, without limitation, and validation is performed by the appropriate server. In an alternative embodiment a username is not requested, and only a password is requested from the user. In one embodiment, the username and password are transmitted from user MD 60 encoded responsive to information responsive to part of the SMS challenge of optional stage 1100. Additionally information from user MD 60 may be similarly encoded without limitation.

In stage 1140 the received username and password are validated to confirm that it is consonant with a stored username and password on MD server 40. In the event that the received username and password is validated, in stage 1140 MD server 40 transmits to user MD 60 a message, such as "login completed, continue via user device".

In stage 1150, responsive to the validation of username and password of stage 1140, MD server 40 transmits an authorization to IS 30 to allow login to web server 20A responsive to the transmitted username and password of stage 1130.

In stage 1160 IS 30 transmits an authentication message to web server 20A including an indication of the authentication method utilized to identify the user, an identifier of user MD 60 and a confirmation code for validation.

In stage 1170 web server 20A, responsive to the received authentication message of stage 1160, transmits the desired user page to user device 50A. It is to be noted that username and password information has not been transmitted in provider band 70, and has been exclusively transmitted within customer band 80, thereby improving security.

In the event that in stage 1030 unsecured ID validation fails, or in the event that in stage 1090 user MD 60 and location consonance fails, or in the event that in stage 1140 username and password validation fail, in stage 1180 the login attempt fails. Preferably, notification of login failure is transmitted to both user MD 60 and user device 50A.

In one embodiment the login authentication on user device 50A via MD 60 may start by a user actively starting or logging in by MD application 62 to MD server 40 prior to stage 1020.

Figure 1D:
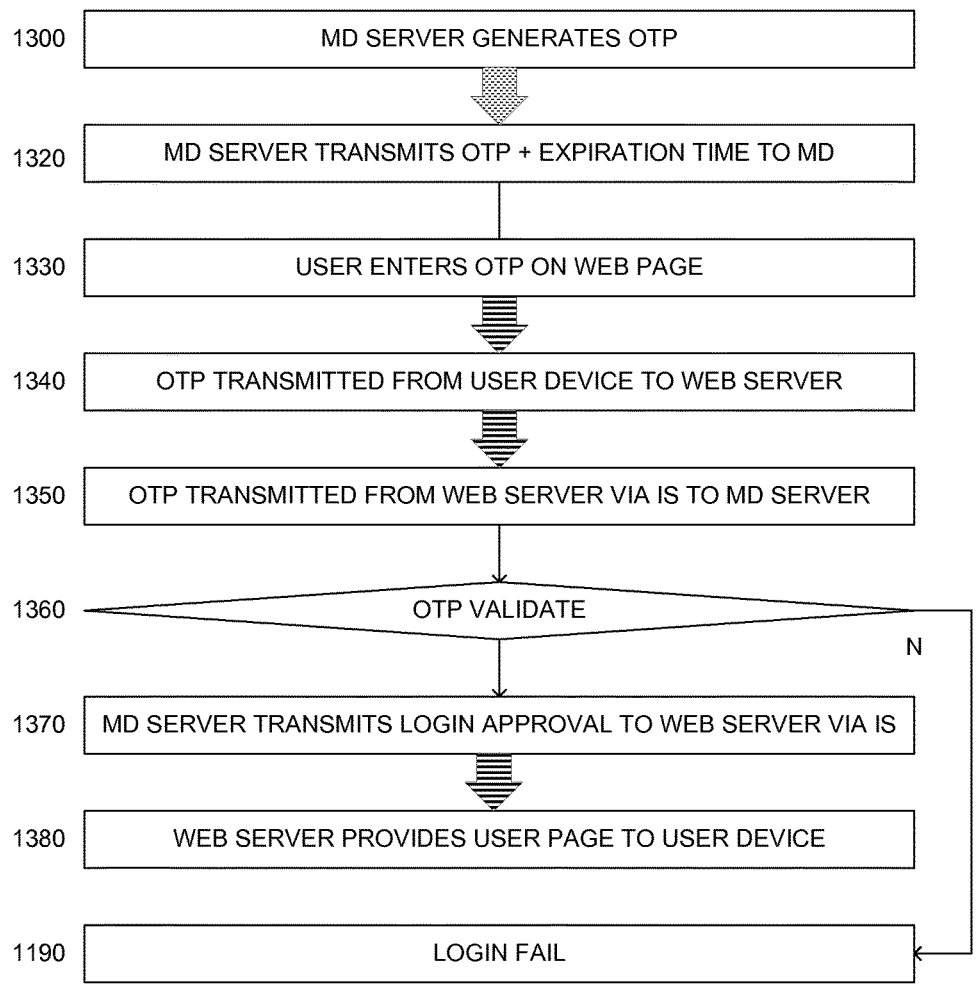
FIG. 1D illustrates an additional security enhancement utilizing a one time password (OTP) which is optionally performed prior to transmission of login approval of FIG. 1C.

FIG. 1D illustrates an additional security enhancement utilizing a one time password (OTP) which is optionally performed prior to transmission of the authorization to IS 30 of stage 1150 of FIG. 1C. In stage 1300, preferably responsive to successful completion of the validation of stage 1140, and preferably prior to the transmission of the authorization message of stage 1150, MD server 40 generates an OTP. In stage 1320, MD server 40 transmits the received OTP, preferably with the expiration time to user MD 60 over customer band 80. The received OTP is displayed on a display device of user MD 60.

In stage 1330 MD server 40 instructs web server 20A via IS 30 to provide an OTP login screen to user device 50A. The user, responsive to the received OTP of stage 1320, enters the received OTP on an input device of user device 50A. In stage 1340 the entered OTP is transmitted from user device 50A to web server 20A and in stage 1350 the OTP is transmitted from web server 20A to MD server 40 via IS 30.

In stage 1360 the OTP received from web server 20A is compared with the OTP transmitted by MD server 40 of stage 1320. In the event that the received OTP is consonant with the transmitted OTP, and is within the optional validation time period, in stage 1370 MD server 40 transmits via IS 30 a login approval to web server 20A including in the login approval message the user ID of stage 1010, as described above in relation to stages 1150-1160. In stage 1380, responsive to the message of stage 1370, web server 20A transmits the desired user page to user device 50A. It is to be noted that username and password information has not been transmitted in provider band 70, and has been exclusively transmitted within customer band 80, thereby improving security, which has been further enhanced by the use of a time limited OTP preventing computer channel theft. In one embodiment the OTP is transmitted in stage 1320 to web server 20A, displayed on user device 50A, and entered by user on MD 60 without exceeding the scope. Such an embodiment may allow increased productivity by the user.

In the event that in stage 1360 OTP validation fails, in stage 1190 the login attempt fails as described above.

Figure 1E:
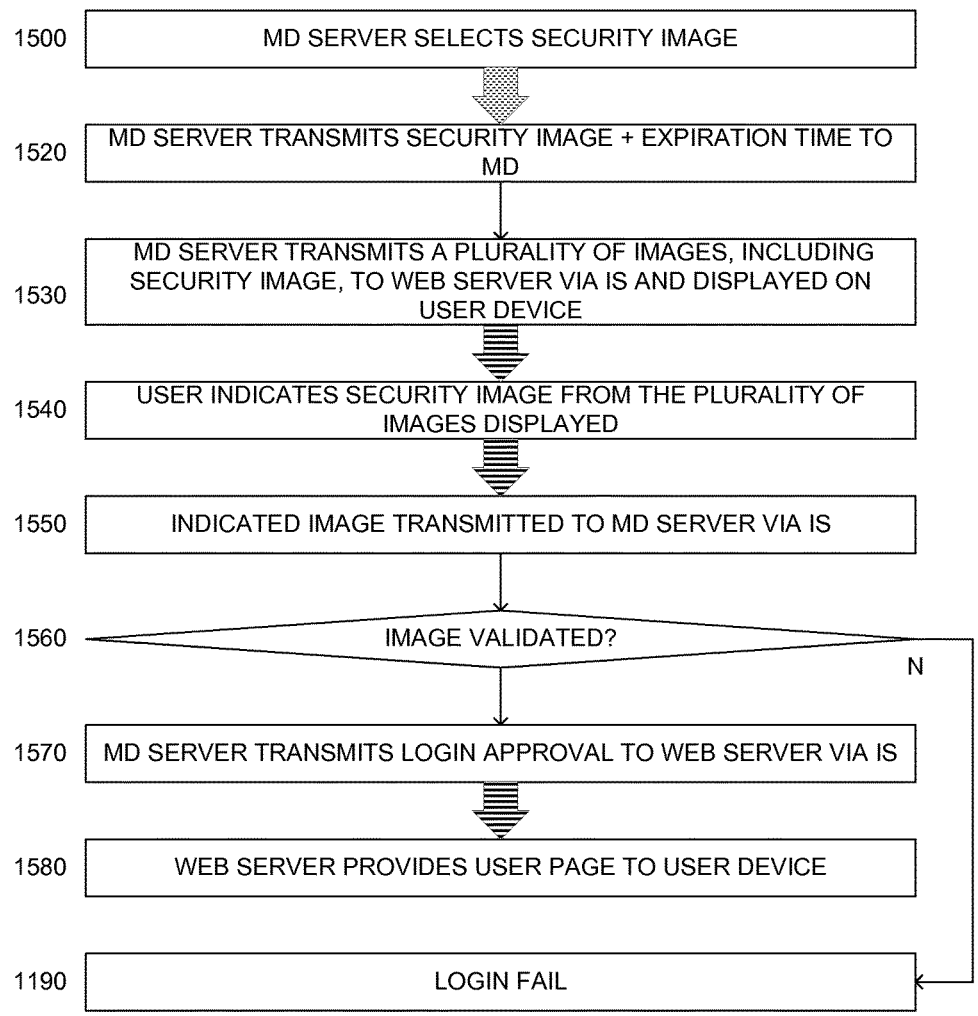
FIG. 1E illustrates an additional security enhancement utilizing image selection.

FIG. 1E illustrates an additional security enhancement utilizing image selection which is optionally performed prior to transmission of the authorization message of stage 1150 of FIG. 1C. In stage 1500, preferably responsive to the successful completion of the validation of stage 1140, and preferably prior to the transmission of the authorization message of stage 1150, MD server 40 selects an image to be used as a security element, the security image is selected from a pre-stored selection of images stored on memory 90 associated therewith. In stage 1520, MD server 40 transmits the received security image, preferably with the expiration time to user MD 60 over customer band 80. The received security image is displayed on a display device of user MD 60.

In stage 1530 MD server 40 transmits via IS 30 to web server 20A a plurality of images, including the security image of stage 1500 for display on a display device of user device 50. In stage 1540, the user selects the security image, responsive to the display on user MD 60, via an input device of user device 50A from the plurality of displayed images on user device 50A. In stage 1550, the selected image, or an encoded identifier thereof, is transmitted from user device 50A to MD server 40 via web server 20A and IS 30.

In stage 1560 MD server 40 compares the received selected image with the selected security image of stage 1500. In the event that the received selected image is consonant with the transmitted security image, and is within the optional validation time period, in stage 1570 MD server 40 transmits a login approval to web server 20 via IS 30 including in the login approval message the user ID of stage 1010, as described above in relation to stages 1150-1160. In stage 1580, responsive to the message of stage 1570, web server 20A transmits the desired user page to user device 50A. It is to be noted that username and password information has not been transmitted in provider band 70, and has been exclusively transmitted within customer band 80, thereby improving security, which has been further enhanced by the use of a time limited security image preventing computer channel theft. The use of a security image is a preferred security measure by users due to its ease of use.

In the event that in stage 1560 security image validation fails, in stage 1190 the login attempt fails as described above. In one embodiment a plurality of security images are selected in stage 1500, presented on a display of user MD 60 and have to be indicated on user device 50A by the user as will be showed in the following figure, without exceeding the scope. In another embodiment the selected image or images in stage 1500 is displayed on user device 50A and selected by the user on MD 60.

Figures 1F, 1G:
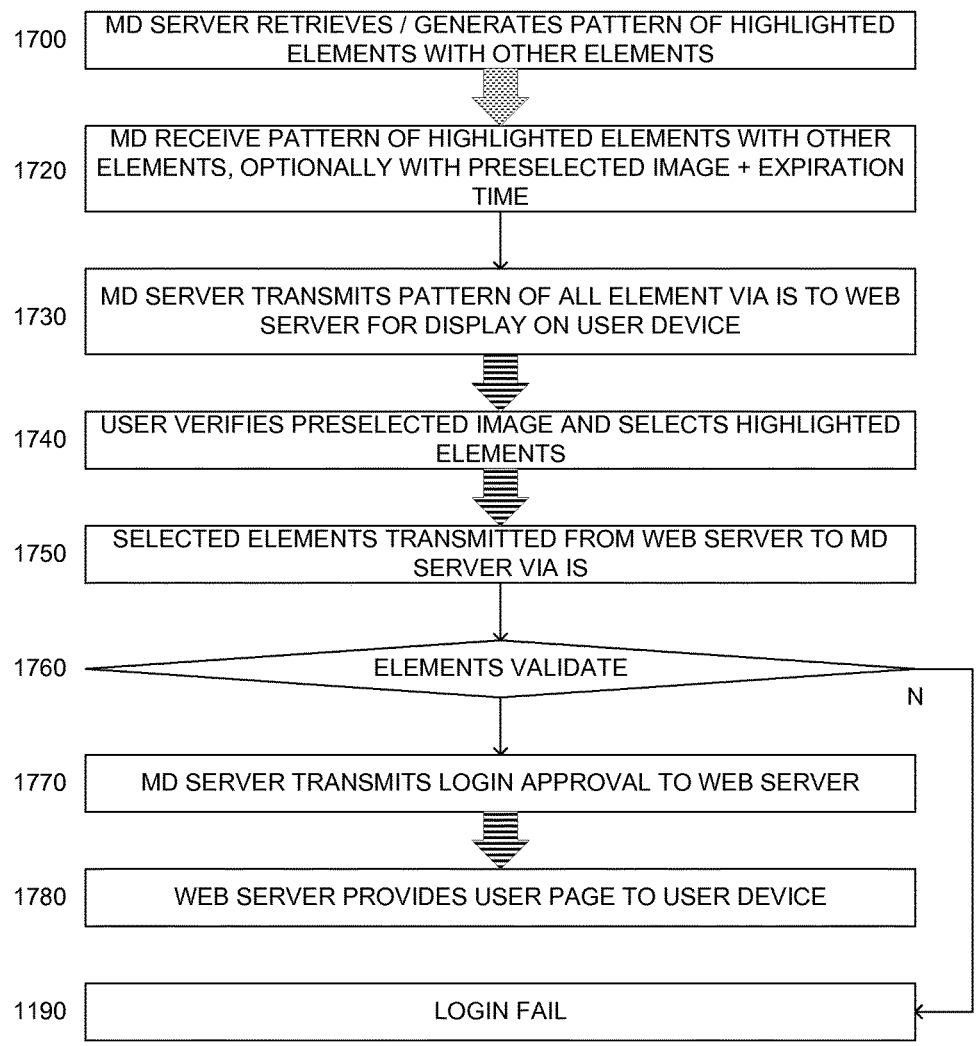
FIG. 1F illustrates an additional security enhancement utilizing pattern selection, and further optionally providing mutual identification for security system validation.
FIG. 1G illustrates an additional security enhancement utilizing plurality of images

FIG. 1F illustrates an additional security enhancement utilizing pattern selection, and further optionally providing mutual identification for security system validation, which is optionally performed prior to transmission of login authorization message of stage 1150 of FIG. 1C. FIG. 1G illustrates an example of a pattern and embedded image to further illustrate the flow of FIG. 1F.

In stage 1700, preferably responsive to the successful completion of the validation of stage 1140, and preferably prior to the transmission of the authorization message of stage 1150, MD server 40 selects a pattern to be used as a security element, the pattern selected from a pre-stored selection of patterns stored on memory 90 associated therewith, or alternatively randomly generated. Additionally, optionally, MD server 40 retrieves a pre-selected image associated with the user ID of stage 1020. The pre-selected image is selected by the user of MD 60 so as to provide confirmation to the user that the authentication system is a genuine authorized system.

In stage 1720, MD server 40 transmits the selected pattern of elements to be highlighted, embedded in other elements, with the optional pre-selected image of stage 1700, preferably with the expiration time, to user MD 60 over customer band 80. The received selected pattern of elements embedded in other elements, with the optional image is displayed on a display device of user MD 60 as shown in FIG. 1G, wherein the selected pattern of elements is highlighted. In particular, in certain embodiments a random pattern of elements is displayed in which certain of the elements, which may be embodied in numbers, are highlighted.

In stage 1730 MD server 40 transmits to web server 20 via IS 30 the selected pattern of elements embedded in other elements, of stage 1700, without any highlighting, for display on a display device of user device 50A. In one embodiment MD server 40 transmits the highlighted elements to web server 20 via IS 30 and the non highlighted elements to MD 60, without exceeding the scope. In such an embodiment selection may be performed by the user via an input of MD 60. In stage 1740, the user selects particular elements, responsive to the highlighted elements on user MD 60, via an input device of device 50A from the plurality of displayed elements on user device 50A. It is to be understood that in the event the optional pre-selected image displayed on user MD 60 in stage 1720 is not consonant with the pre-selected image recalled by the user, the user will recognize a security breach and not proceed with stage 1740.

In stage 1750, the selected elements, or an encoded identifier thereof, are transmitted from user device 50A to MD server 40 via web server 20A and IS 30.

In stage 1760 the received selected elements are compared with the transmitted selected pattern of elements to be highlighted of stage 1700. In the event that the received selected elements are consonant with the transmitted selected pattern of elements to be highlighted, and is within the optional validation time period, in stage 1770 MD server 40 transmits a login approval to web server 20A via IS 30 including in the login approval message the user ID of stage 1010, as described above in relation to stages 1150-1160. In stage 1780, responsive to the message of stage 1770, web server 20A transmits the desired user page to user device 50A. It is to be noted that username and password information has not been transmitted in provider band 70, and has been exclusively transmitted within customer band 80, thereby improving security, which has been further enhanced by the use of a time limited security multi-image preventing computer channel theft.

In the event that in stage 1760 security image validation fails, in stage 1190 the login attempt fails as described above.

Figure 1H:
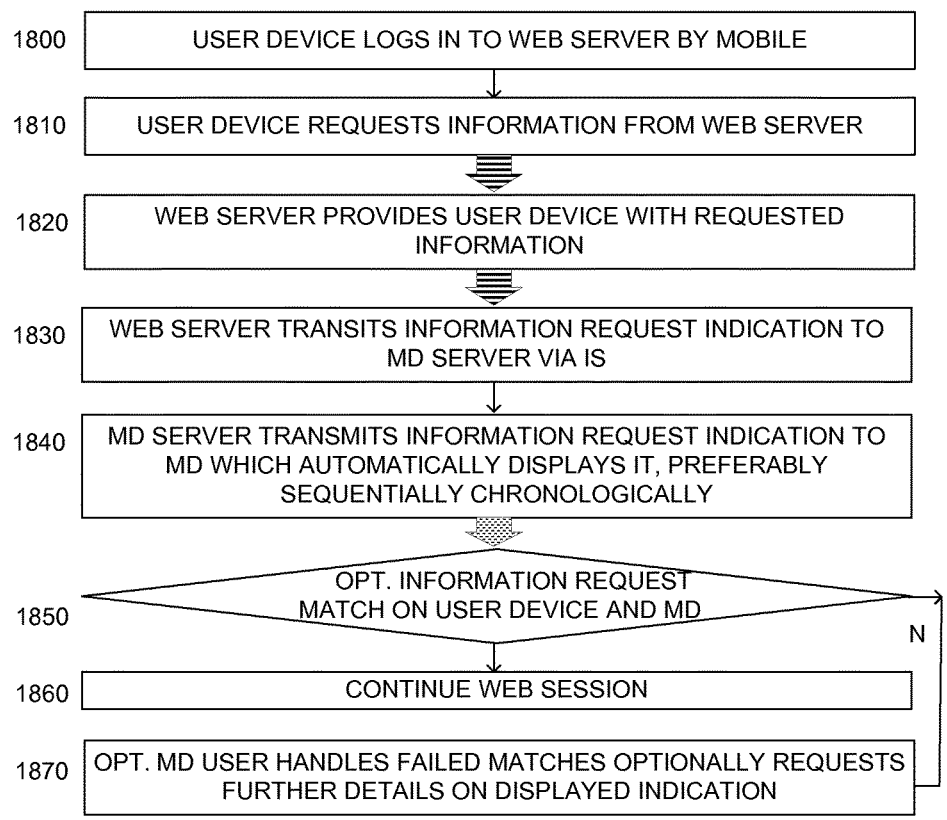
FIG. 1H illustrates an additional security enhancement utilizing a mobile device information query synchronization method.
Figure 1I:
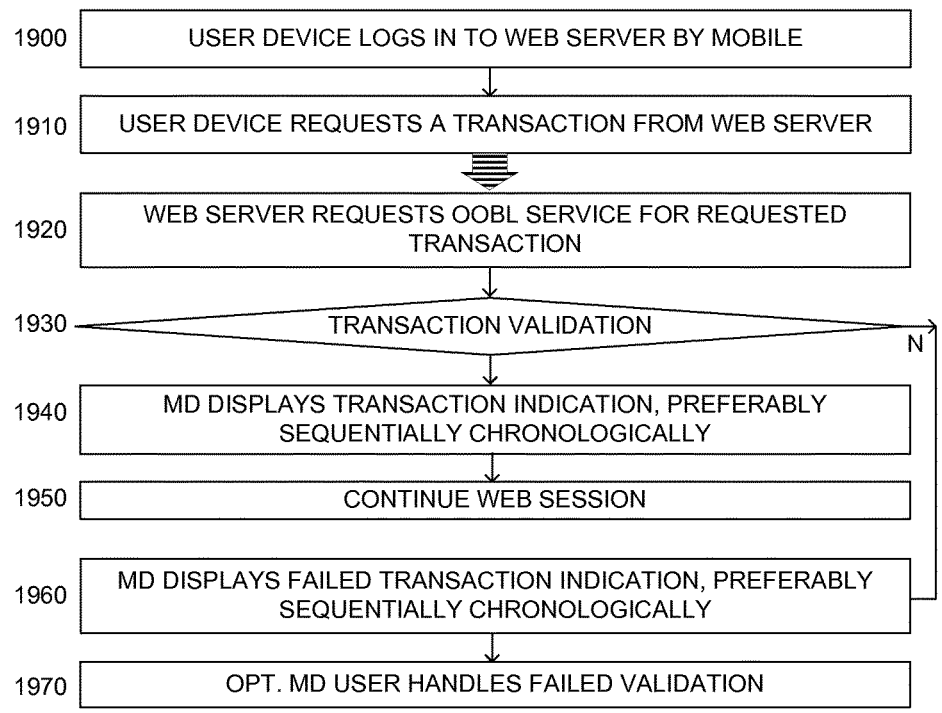
FIG. 1I illustrates an additional security enhancement utilizing mobile device transactions synchronization method.

FIGS. 1H, 1I illustrates additional security enhancements utilizing real-time, synchronized, mobile monitoring for ongoing web session verification. Using MD 60 the user can constantly monitor all the activity of a web session, or multiple sessions, thus reducing possible damages from phishing, session hijacking, cross-site scripting, man in the middle or similar frauds. MD 60 preferably displays an image or icon which represent user device 50As ongoing web sessions activity.

In step 1800 the user performs a login from user device 50A to web server 20A, preferably by OOBL as described above in relation to FIGS. 1B-FIG. 1F. In step 1810 user device 50A requests an information retrieval operation from web server 20A. Alternatively, a transaction or configuration change not requiring explicit user authentication is requested. In step 1820 web server 20A provides the information requested to user device 50A which preferably displays it to the user. In step 1830, web server 20A transmits an indication of the information request operation to MD server 40 via IS 30, preferably simultaneously to the information response to user device 50A. The indication preferably includes requested information type and may include further details. In step 1840 MD server 40 transmits the information request indication to MD 60 which displays it to the user on a display portion thereof. The indication is preferably displayed in chronological order in relation to other operations done from the beginning of the web session, preferably in a graphical symbolized manner for easy user review. In optional step 1850 the user validates that the information request operation reflected by the display on user MD 60 is the appropriate operation requested on user device 50A, and no replacement by inappropriate steps have been performed. In step 1860, if the validation process done in step 1850 succeeds, the user continues the web session on user device 50A. Preferably, the MD 60 web session monitoring stays active until the user logs off web server 20A by user device 50A or by MD 60. In step 1870, if the matching validation process done in step 1850 fails, the user may respond to the failure, optionally requesting further operation information via MD 60 or by terminating the web session due to suspicion of fraud. In another embodiment the user verifies that there are no indications of operations displayed on monitoring MD 60 which are not actually performed by the user of user device of 50A, since these indications can be signs of fraud attack.

FIG. 1I illustrates a similar flow to FIG. 1H with the difference in type of operation. In FIG. 1I the operation requires an explicit user authentication. These operations are also presented in the operations chronological display so the user preferably has a comprehensive, but easily reviewed view of all the operations done within a web session. In a case of an unfamiliar operation indication, or mismatch between expected indication and actual MD 60 indication, the user can optionally request for further information via user MD 60, terminate the session or notify the web server 20A of a session irregularity.

Figure 2A:
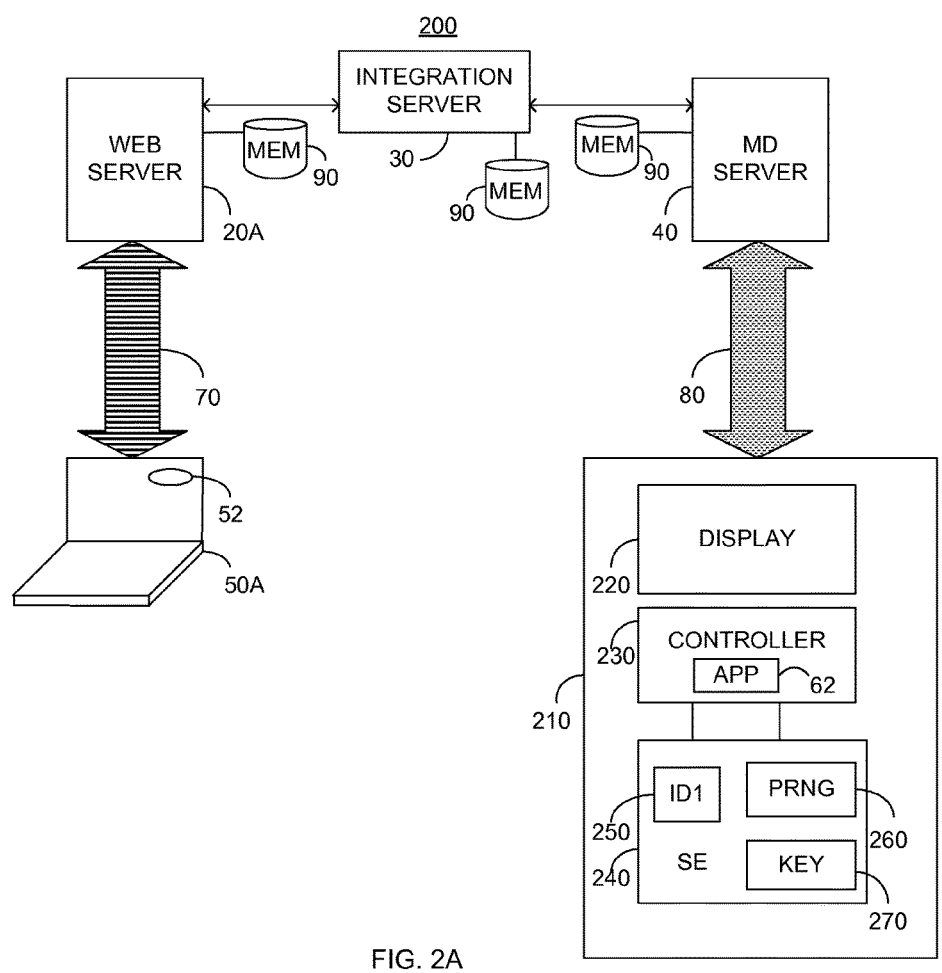
FIG. 2A illustrates a high level block diagram of an embodiment of a transaction system providing advantageous partitioning thereby allowing for web OOBL, wherein a user MD is provided with pseudo-random number generation capability within an SE.

FIG. 2A illustrates a high level block diagram of an embodiment of transaction system 200 providing advantageous partitioning thereby allowing for web OOBL, wherein a user MD 210 is provided with pseudo-random number generation capability within an SE 240. In particular, transaction system 200 comprises: a web server 20A; an IS 30; and an MD server 40, each of which having a memory 90 in communication therewith. Web server 20A and MD server 40 each preferably support services of the prior art associated with a unitary service provider in addition to services described herein responsive to IS 30. User device 50A, illustrated without limitation as a portable computer, and user MD 210 are further shown. User MD 210 comprises a display 220, a controller 230, and an SE 240. SE 240 comprises an ID secure storage location 250, a pseudo-random number (PRNG) generator 260 and secure keys storage location 270. The ID stored on ID storage location 250 is denoted ID1, and ID1 is readable by controller 230. PRNG generator 260 is in communication with keys storage location 270 and with controller 230. ID storage location 250 is in communication with controller 230. SE 240 provides a first level of a user security domain (USD) as will be described further below. An application 62 runs on a processor of MD 210, and is preferably stored on a local memory thereof.

As described above in relation to transaction system 10, service provider web server 20A is in bi-directional communication with user device 50A via a provider band 70, illustrated as a horizontally hatched bi-directional arrow, which may be implemented via the Internet. Service provider MD server 40 is in bi-directional communication with user MD 210 via a customer band 80, illustrated as a dot filled bi-directional arrow, which may be implemented via an MD data connection, such a wireless LAN or an IEEE 802.11 compatible connection. Advantageously, security information is compartmentalized to prevent fraud.

Each of web server 20A, IS 30 and MD server 40 exhibit a processor and, as indicated above, are in communication with a memory 90 which may be internal, or external without exceeding the scope. Memory 90 exhibits a non-transitory computer readable medium upon which instructions for operation of the respective web server 20A, IS 30 and MD server 40, as described below are stored. Memory 90 may be further utilized to provide storage of data as required. There is no requirement that the various memories 90 be physically disparate, and the various memories 90 may be implemented on a single cloud server without exceeding the scope.

PRNG generator 260 is arranged to produce a PRN responsive to a request received from controller 230, and return the produced pseudo-random number to controller 230. The produced PRN by PRN generator 260 is responsive to one or more keys stored on keys storage location 270, and is thus uniquely identifiable by a device having information regarding one or more of the keys stored on keys storage location 270. The information required for validation may be a shared key, or a key generated as part of an asymmetric key algorithm stored on memory 90 associated with MD server 40 without limitation. Additional SE 240 functionalities and capabilities will be described further below.

Figure 2B:
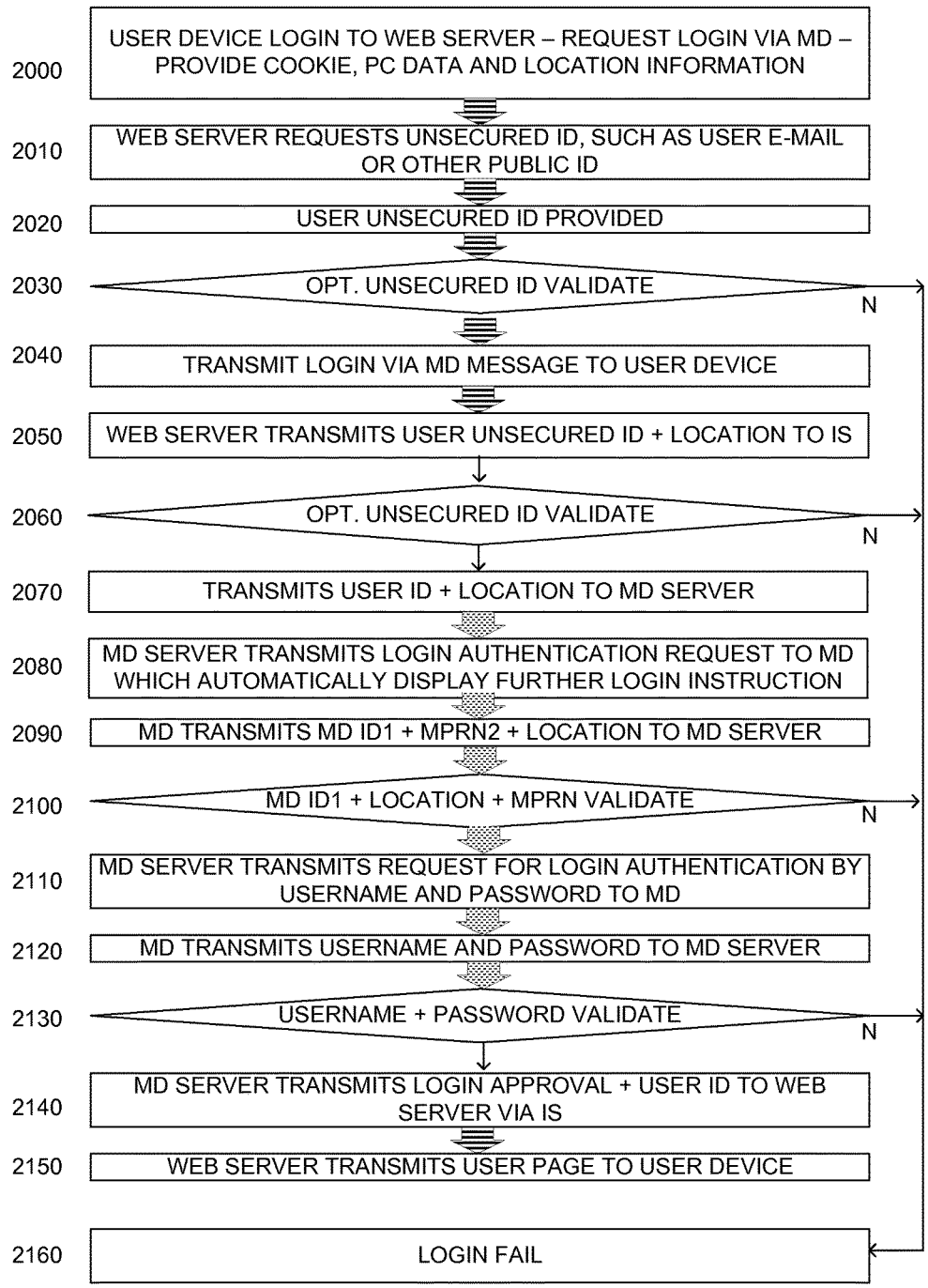
FIG. 2B illustrates a high level flow chart of an exemplary embodiment of the operation of the transaction system of FIG. 2A to provide secure login facilities to user device without passing a private username or a password over the provider band.

FIG. 2B illustrates a high level flow chart of an exemplary embodiment of the operation of transaction system 200 of FIG. 2A to provide secure login facilities to user device 50 without passing a private username or a password over provider band 70. Such an embodiment is particularly useful when user device 50A is not solely the property of the user, such as a PC at an Internet café, however this is not meant to be limiting in any way. For clarity, the flow between stages are marked in a manner consonant with the band information of FIG. 2A, and thus flows within provider band 70 are shown as a horizontally hatched arrow, flows within customer band 80 are shown as a dot filled arrow and flows between IS 30 and either web server 20A or MD server 40 are shown as solid lines. Particular stages are performed responsive to instructions stored on the respective memory 90, as described above.

In stage 2000, user device 50A accesses a particular page or site of a web server 20A via provided band 70, and request login via user MD 210. User device 50A preferably provides stored cookie information identifying user device 50A on a local memory. Optionally, the provided cookie information comprises computer identifying information, such as serial numbers or other configuration data. Web server 20A preferably determines location information of user device 50A, optionally responsive to an Internet protocol address of user device 50A. The particular page or site of web server 20A may be associated with a financial institution, merchant or service supplier without limitation.

In stage 2010 web server 20A requests a user ID, preferably a user unsecured ID as described above, from user device 50A. In an exemplary embodiment an e-mail address is utilized as a user unsecured ID, in another exemplary embodiment the user's mobile number (MSISDN) is utilized as a user unsecured ID. It is to be understood, that pre-registration with IS 30, associating user MD server 40 with the user unsecured ID is preferably performed at a pre-registration stage, wherein a username and password, preferably different from the user unsecured ID, are defined and stored in a portion of memory 90 accessible by MD server 40 associated with the user unsecured ID and MD 210.

In stage 2020, responsive to the request of stage 2010, a user supplies the user unsecured ID via user device 50A. In optional stage 2030 the user unsecured ID supplied is validated against the predefined user IDs stored in memory 90 accessible by web server 20A described above in order to avoid overloading IS 30 and MD server 40 with unregistered users authentications. In the event that the user unsecured ID is not validated, in stage 2160 a login fail message is generated, and displayed on a display device of user device 50A.

In stage 2040, a message, such as "login via MD", is transmitted by web server 20A to user device 50A and displayed on a display device of user device 50A, thus prompting the user to access MD 210 to continue the transaction. Preferably MD 210 will automatically display further login instructions to continue the transaction as described on stage 2080.

In stage 2050, the user ID of stage 2020, and the optional determined location information of stage 2000 are transmitted by web server 20A to IS 30.

In optional stage 2060, the user unsecured ID supplied is validated against the predefined user IDs stored in memory 90 accessible by IS 30 described above. In the event that the user unsecured ID is not validated, in stage 2160 a login fail message is generated, and displayed on a display device of user device 50A.

In stage 2070, IS 30 transmits a login authentication request to MD server 40.

In stage 2080, MD server 40 transmits a login authentication request to MD 210 which triggers MD application 62 which automatically display further login instructions.

In stage 2090, responsive to the authentication request from MD server 40 of stage 2080, MD 210 provides location information, PRN and an identifier of user MD 210 to MD sever 40. The provided identifier may be the MSISDN or other identifier or other group of identifiers unique to user MD 210 such as a cookie, an IMSI, an IMEI, or a BT ID, without limitation, and are verifiable by MD server 40. Preferably, application 62 which runs on user MD 210 performs the access to MD server 40 and provides the above mentioned datum. In particular, controller 230 retrieves ID1 from ID storage location 250 and further requests the generation of a PRN from PRNG 260, denoted MPRN2, the PRN requested to be generated in cooperation with a key associated with MD server 40 stored on keys storage location 270. Application 62 accesses the page or server or site of MD server 40, and as part of the process of accessing MD server 40, application 62 provides location information of MD 210, the retrieved ID1, the generated PRN and other identifying information such as peripheral identifiers. In one embodiment a unique identifier of user MD 210, such as a serial number of SE 240, is provided without limitation. Preferably, information transmission between user MD 210 and MD server 40 is via an SSL link.

Advantageously, the ability of SE 240 to provide a PRN on demand responsive to stored keys, and further provide an ID1 represents a first level USD, as will be described further below.

In stage 2100, MD server 40 compares the received user MD 210 ID1 and preferably location information with the provided information of stage 2050, cross referenced by pre-registration information described above, to verify MD 210 authenticity. Preferably, the PRN is further validated responsive to a key stored on memory 90 of MD server 40. It is to be understood, that as described above, memory 90 of MD server 40 comprises a cross reference of user IDs, as described above in relation to stage 2070 and user MD 210 identifiers ID1 so as to determine if any user ID received from user device 50A is consonant with, i.e. cross-referenced with, a received user MD 210 identifier ID1. Location information is further preferably compared for consonance to prevent against fraud. There is no requirement that location information consonance be exact, particularly since location information of user MD 210 may be provided by triangulation which does not provide pin-point accuracy, and location information of user device 50A may be similarly supplied by IP address which does not supply pin-point accuracy. Thus, a broad definition of location consonance is preferably utilized, such that only location disconsonance which is not physically possible is set to trigger a non-consonant outcome. Optionally, the location filter may be bypassed without exceeding the scope.

In the event that in stage 2100 a user MD 210 identifier ID1 and location information is consonant with the login authentication request transaction, and the received MPRN2 is validated responsive to the stored key, MD server 40 proceed and receive login information.

In stage 2110 MD server 40 transmits a request to user MD 210 for a username and password, to be utilized for the pending login transaction of stage 2000. In stage 2120, user MD 210, responsive to a user input gesture, transmits a username and password to MD server 40. The username and password preferably has been pre-registered with MD server 40, and thus may be validated by MD server 40 without communication with web server 20A or IS 30. In an alternative embodiment, the username and password are registered with IS 30, or with web server 20A, without limitation, and validation is performed by the appropriate server. In another alternative embodiment the password or PIN code is validated by SE 240 and PPRN2 is sent to MD server 40 for validation.

In stage 2130 the received username and password is validated to confirm that it is consonant with a stored username and password on MD server 40. In an alternative embodiment where the username and password are pre-registered with IS 30, or with web server 20A, without limitation, the username and password is transmitted to and validated at the appropriate server. In an embodiment where PPRN2 is sent MD server 40, MD server 40 validates PPRN2.

In stage 2140, in the event that the received username and password is validated at MD server 40, MD server 40 transmits an authentication message to web server 20A via IS 30, including the identifier of user ID of stage 2010, and a confirmation code for validation.

In stage 2150 responsive to the message of stage 2140, web server 20A transmits the desired user page to user device 50A. It is to be noted that username, password and hardware generated code PRN information has not been transmitted in provider band 70, and has been exclusively transmitted within customer band 80, thereby improving security. User device 50A and MD 60 preferably stay synchronized during the user web session until the user prompts to logoff probably on user device 50A, as described above. MD 60 preferably displays images which represent the activity displayed on user device 50A.

In the event that in stages 2030 or 2060 ID validation fails, or in the event that in stage 2100 user MD 210 identifier ID1 validation fails, or PRN validation or location consonance fails, or in the event that in stage 2130 username and password validation fails, in stage 2160 the login attempt fails. Preferably, notification of login failure is transmitted to both user MD 210 and user device 50A.

Alternative additional security methods, as described above in relation to FIGS. 1D-1I may be similarly implemented by transaction system 200 without exceeding the scope.

Figure 3A:
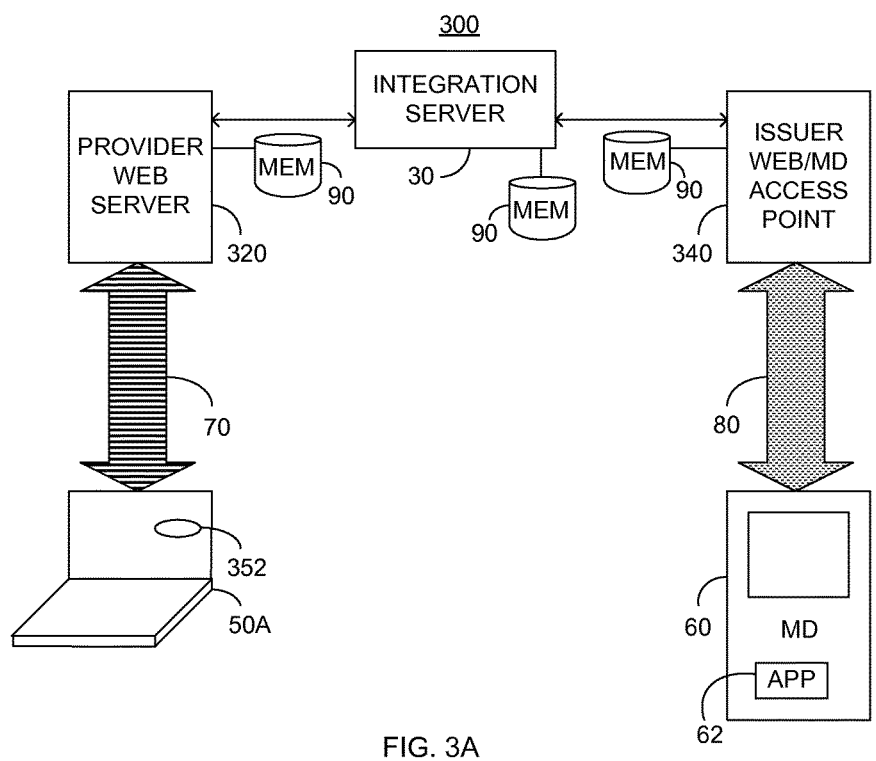
FIG. 3A illustrates a high level block diagram of an embodiment of transaction system providing advantageous partitioning for a web based transaction system thereby allowing for web out of band login (OOBL)

FIG. 3A illustrates a high level block diagram of an embodiment of transaction system 300 providing advantageous partitioning for a web based transaction system thereby allowing for web out of band login (OOBL). In particular, transaction system 300 comprises: a web server 320; an IS 30; and an issuer MD access point server 340, each of which having a memory 90 in communication therewith. Web server 320 is preferably associated with a merchant or service provider and issuer web or MD access point server 340 is associated with a credit or debit card issuer, or other financial transaction authorization means, without limitation. For clarity, a user device 50A, illustrated without limitation as a portable computer, and a user MD 60 are further shown. Any user device 50 may be utilized as described above. Web server 320 is in bi-directional communication with user device 50A via a provider band 70, illustrated as a horizontally hatched bi-directional arrow, which may be implemented via the Internet. Issuer web or MD access point server 340 is in bi-directional communication with user MD 60 via a customer band 80, illustrated as a dot filled bi-directional arrow, which may be implemented via an MD data connection, such a wireless LAN or an IEEE802.11 compatible connection. Advantageously, security information is compartmentalized to prevent fraud.

Each of web server 320, IS 30 and issuer web or MD access point server 340 exhibit a processor and, as indicated above, are in communication with a memory 90 which may be internal or external without exceeding the scope. Memory 90 exhibits a non-transitory computer readable medium upon which instructions for operation of the respective web server 320, IS 30 and issuer MD access point server 340, as described below are stored. Memory 90 may be further utilized to provide storage of data as required, such as customer records, user names and IDs as appropriate. There is no requirement that the various memories 90 be physically disparate, and the various memories 90 may be implemented on a single cloud server without exceeding the scope.

Figure 3B:
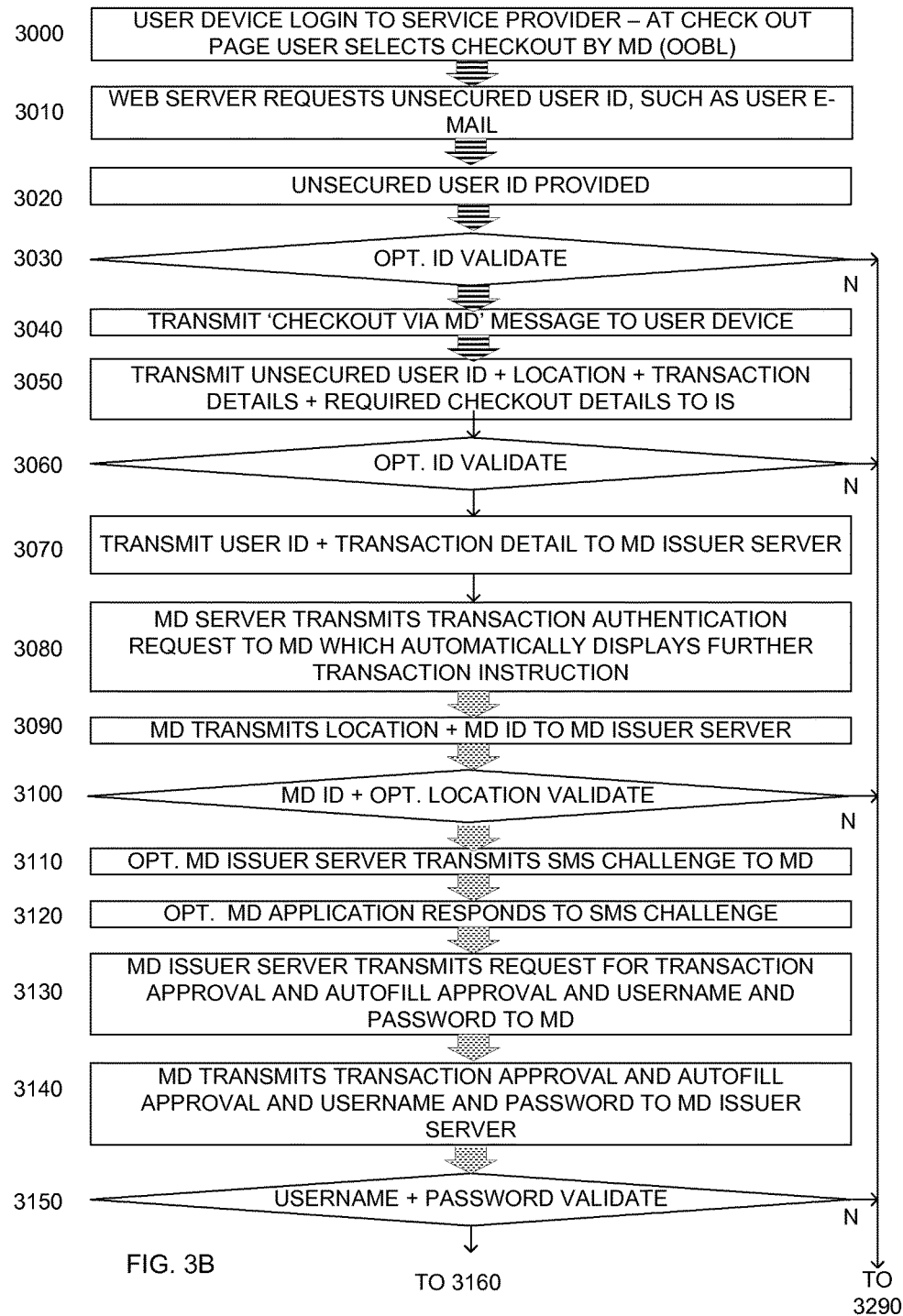
FIGS. 3B-3C illustrate a high level flow chart of an exemplary embodiment of the operation of transaction system of FIG. 3A to provide secure support to a user authentication without passing user credentials over the provider band.
Figure 3C:
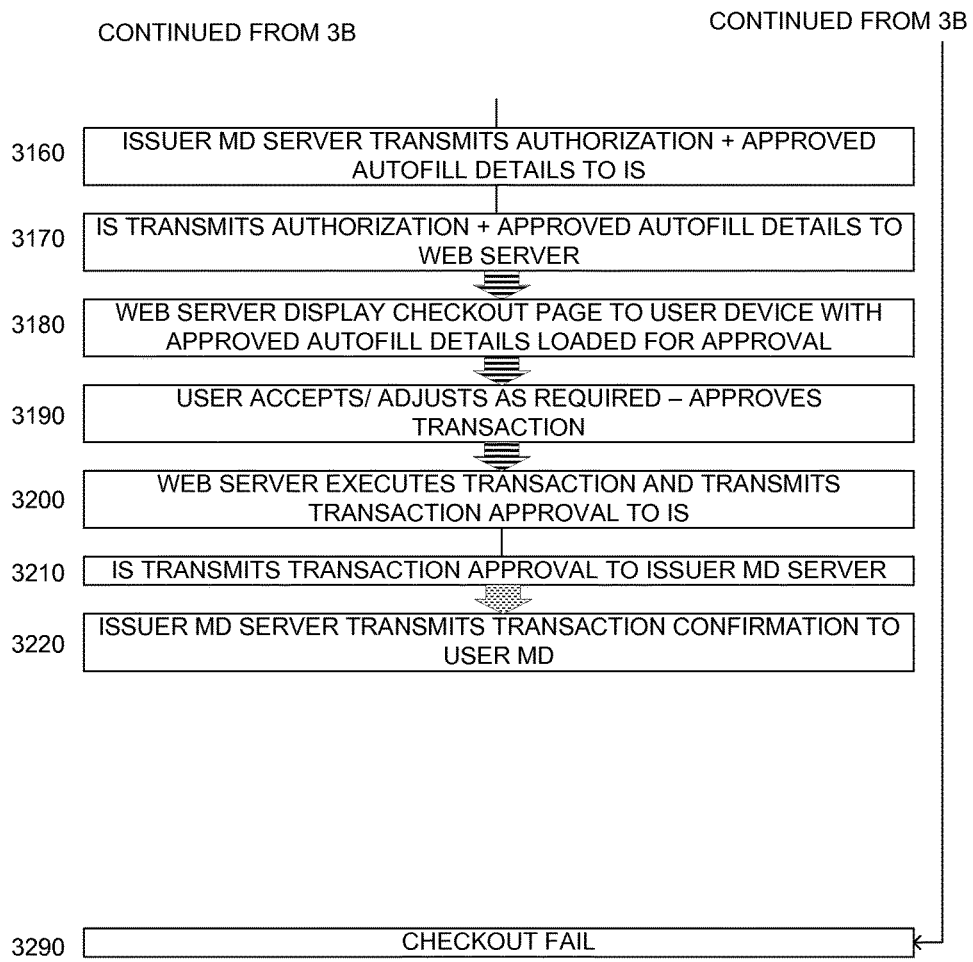

FIGS. 3B-3C illustrate a high level flow chart of an exemplary embodiment of the operation of transaction system 300 of FIG. 3A to provide secure financial support to user device 50A without passing a private username or a password over provider band 70, preferably without web server 320 exposure to user sensitive financial details and optionally without user manually filling checkout details. Such an embodiment is particularly useful when user device 50 is not solely the property of the user, such as a PC at an Internet café, however this is not meant to be limiting in any way. Similarly, a user may be concerned about the security of the web service provider or merchant. For clarity, the flow between stages are marked in a manner consonant with the band information of FIG. 3A, and thus flows within provider band 70 are shown as a horizontally hatched arrow, flows within customer band 80 are shown as a dot filled arrow and flows between IS 30 and either web server 320 or issuer MD access point server 340 are shown as solid lines. Particular stages are performed responsive to instructions stored on the respective memory 90, as described above.

In stage 3000, user device 50A accesses a particular page or site of a web server 320 via provider band 70, and selects a transaction to be performed, such as a purchase. At checkout, a number of options may be provided by web server 320, including OOBL checkout, without limitation. In the event that in stage 3000 OOBL checkout is requested, i.e. checkout via user MD 60. Alternately, checkout is constrained to be via OOBL for certain transactions.

In stage 3010 web server 320 requests a user unsecured ID from user device 50A. In an exemplary embodiment an e-mail address is utilized as a user unsecured ID. It is to be understood, that pre-registration with IS 30 associating MD access point server 340, which is further associated with user MD 60, with the user unsecured ID is preferably performed at a pre-registration stage. Username and password, preferably different from the unsecured ID, are defined and stored in a portion of memory 90 accessible by MD access point server 340.

In stage 3020, responsive to the request of stage 3010, a user supplies the unsecured ID via user device 50A. In optional stage 3030 the unsecured ID supplied is validated against the predefined unsecured IDs stored in the memory accessible by web server 320 described above. In the event that the unsecured ID is not validated, in stage 3290 a checkout fail message is generated, and displayed on a display device of user device 50A.

In stage 3040, a message indicative to "checkout via MD" is transmitted by web server 320 to user device 50A and displayed on a display device of user device 50A, thus prompting the user to continue the checkout process by the user's MD 60 which will preferably automatically display further OOBL checkout instruction as described further below in relation to stage 3080.

In stage 3050, the unsecured ID of stage 3020, and any optional transactional or determined location information is transmitted by web server 320 to IS 30. Use of location for added security has been described above in relation to transaction system 10, and in the interest of brevity will not be further detailed herein, however it is to be understood that the use of geographic consonance to confirm validity and avoid fraudulent transactions is equally applicable in transaction system 300. Transactional information preferably comprises a merchant name, a merchant ID, a price, optionally required checkout details for the user to fill, and optionally further details such as list of purchased items.

In stage 3060 the unsecured ID is validated against the predefined user unsecured IDs or other rule stored in the memory accessible by IS 30 described above. In the event that the user unsecured ID is not validated, a message is sent to web server 320 and in stage 3290 a checkout fail message is generated, and displayed on a display device of user device 50A.

In stage 3070, the unsecured ID of stage 3020, and any optional transactional or determined location information are transmitted by IS 30 to issuer MD access point server 340.

In stage 3080, issuer MD access point server 340 transmits checkout transaction authentication request to MD 60 which triggers MD application 62 to automatically display further checkout instructions.

In stage 3090, as part of process of accessing issuer MD access point server 340, user MD 60 optionally provides location information and an identifier of user MD 60, which may be the MSISDN or other identifier unique to user MD 60. Preferably, as described above, application 62 runs on user MD 60 to access issuer MD access point server 340, application 62 preferably stored on a local memory of user MD 60, and performs the access to issuer MD access point server 340 and provides the above mentioned datum. Further preferably, information transmission between user MD 60 and issuer MD access point server 340 is via a secure sockets layer (SSL) link.

In stage 3100, the received identifier of user MD 60 in stage 3090 is validated by issuer MD access point server 340 and optionally, as described above in relation to FIG. 1C, any location information received from user MD 60 is compared by issuer MD access point server 340 with optional location information received from provider web server 320 via IS 30. Any significant non-consonance, as described above, may result issuer MD access point server 340 issuing an invalidation message, thus preventing any suspected fraudulent transaction.

In optional stage 3110, issuer MD access point server 340 performs an SMS challenge to user MD 60. In further detail, issuer MD access point server 340 transmits an SMS message to user MD 60, optionally with comprising an alphanumeric code. In stage 3120 application 62 running of user MD 60 described above responds the SMS challenge, preferably by returning the received alphanumeric code. The above SMS challenge and response is known to those skilled in the art of mobile financial transactions and thus in the interest of brevity is not further detailed herein. The results of the challenge may be reported to issuer MD access point server 340 or IS 30 without limitation.

In the event of success of the SMS challenge and response of optional stages 3110-3120, or in the event that optional stage 3110-3120 are not implemented, in stage 3130 issuer MD access point server 340 retrieves the existing required checkout details of the user from issuer MD access point server 340 memory 90, such as home address to be used as shipping address and mobile phone number (MSISDN) to be used as contact information. Issuer MD access point server 340 further transmits a request to user MD 60 for a purchase transaction approval, preferably including username and password and confirmation of the details filled in by issuer MD access point server 340 for the pending checkout transaction of stage 3000 which will be sent to web server 320. Optionally, a choice of payment arrangements may be provided to user MD 60, without limitation, such as coupons or credit terms. Other financial information, such as open credit balance may be further supplied without exceeding the scope. In the event of a transaction meeting certain criteria, re-entry of a PIN, and/or a response to one or more security questions may also be performed.

In stage 3140, user MD 60, responsive to a user input gesture, transmits a username and password and transaction confirmation and preferably confirmation of issuer MD access point server 340 filled details to issuer MD access point server 340. It is to be noted that issuer MD access point server 340 has previously been provided with the username and password of user MD 60 at a registration stage, and thus issuer MD access point server 340 is able to verify the authenticity thereof without reference to web server 320. In one embodiment the user can delete, modify, or append to, the filled checkout details on MD 60, thus for example enabling entry of an alternate shipping address.

In stage 3150 the received username and password is validated to confirm that it is consonant with a stored username and password on issuer MD access point server 340. The validation may further require decryption of the received username and/or password without exceeding the scope.

In stage 3160 issuer MD access point server 340 transmits a transaction authorization to IS 30 including the unsecured ID, user confirmed checkout details and an indicator that this is a "checkout via user device" transaction. In stage 3170 IS 30 transmits the transaction authorization to web server 320 including the user unsecured ID, user confirmed checkout details and an indicator that this is a "checkout via user device" transaction.

In stage 3180, responsive to the received transaction authorization message of stage 3170, web server 320 retrieves appropriate customer related information from the related memory 90, which may comprise a customer database, and preferably further retrieves format information appropriate for the particular web server 320 page, and prepares a ready to sign form comprising all transaction details including billing information, shipping information and an indication that transaction checkout has been approved by issuer MD access point server 340 responsive to input received via user MD 60. Web server 320 further displays the checkout page, with details filled, and in stage 3190 the user of user device 50A may accept or adjust information therein. Responsive to a user approval gesture, the transaction is finalized.

In stage 3200 web server 320 executes the user confirmed purchase transaction, preferably including financial transaction settlement. Further, web server 320 transmits a transaction approval message to IS 30. In stage 3210, IS 30 transmits a transaction approval message to issuer MD access point server 340, with a transaction identifier for settlement auditing.

In stage 3220 issuer MD access point server 340 sends a confirmation of the approved transaction to user MD 60 which consequentially may set application 62 to background processing mode. In one embodiment IS 30 settles the transaction with the user's account and in another embodiment issuer MD access point server 340 settles the transaction with the user's account.

In the event that in stage 3030 ID validation fails, or in the event that in stage 3060 ID validation fail, or in the event that in stage 3100 the user unsecured ID is not consonant with the user MD identifier or the location validation fails, or in the event that in stage 3150 username and password validation fails, in stage 3290 the checkout attempt fails. Preferably, notification of checkout failure is transmitted to both user MD 60 and user device 50A.

Alternative additional security methods, as described above in relation to FIGS. 1D-1I may be similarly implemented by transaction system 300 without exceeding the scope. The use of user MD 210, with its added security benefits, in place of user MD 60, may further be utilized in transaction system 300 without exceeding the scope.

Figure 4A:
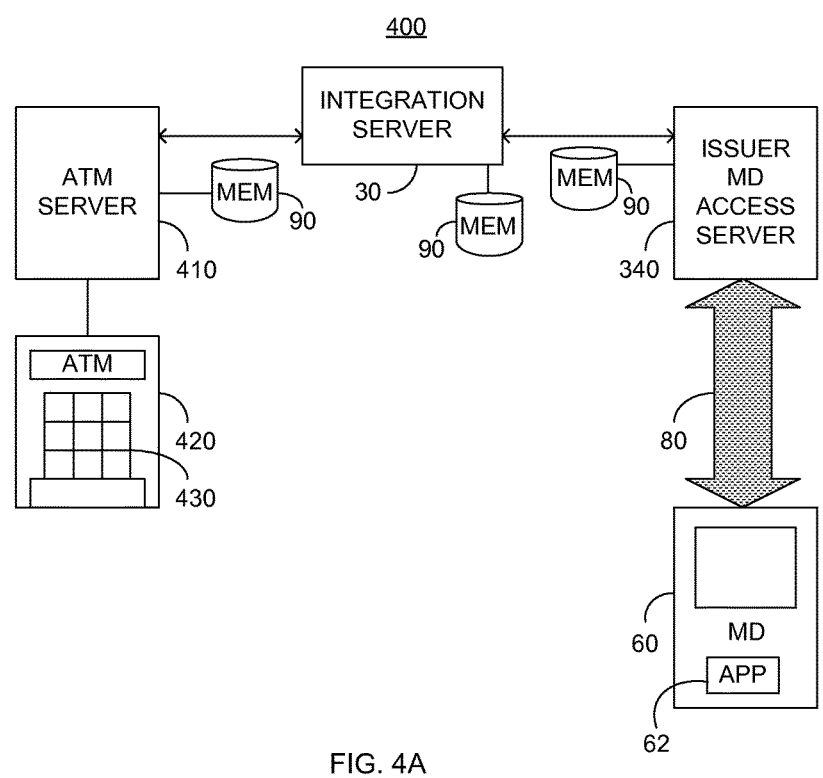
FIG. 4A illustrates a high level block diagram of an embodiment of a transaction system providing advantageous partitioning thereby allowing for out of band login (OOBL) for use with an automated teller machine (ATM)

FIG. 4A illustrates a high level block diagram of an embodiment of transaction system 400 providing advantageous partitioning thereby allowing for out of band login (OOBL) for use with an automated teller machine (ATM). In particular, transaction system 400 comprises: an ATM server 410; an ATM device 420 having a key pad 430; an IS 30; and an issuer MD access point server 340, each of ATM server 410, IS 30 and issuer MD access point server 340 which having a memory 90 in communication therewith. A user MD 60 is further shown, which may be implemented as a user MD 210 as described above without limitation. Issuer MD access point server 340 is in bi-directional communication with user MD 60 via a customer band 80, illustrated as a dot filled bi-directional arrow, which may be implemented via an MD data connection, such a wireless LAN or an IEEE 802.11 compatible connection. Advantageously, security information is compartmentalized to prevent fraud.

Each of ATM server 410, IS 30 and issuer MD access point server 340 exhibit a processor and, as indicated above, are in communication with a memory 90 which may be internal, or external without exceeding the scope. Memory 90 exhibits a non-transitory computer readable medium upon which instructions for operation of the respective ATM server 410, IS 30 and issuer MD access point server 340, as described below are stored. Memory 90 may be further utilized to provide storage of data as required. There is no requirement that the various memories 90 be physically disparate, and the various memories 90 may be implemented on a single cloud server without exceeding the scope.

Figure 4B:
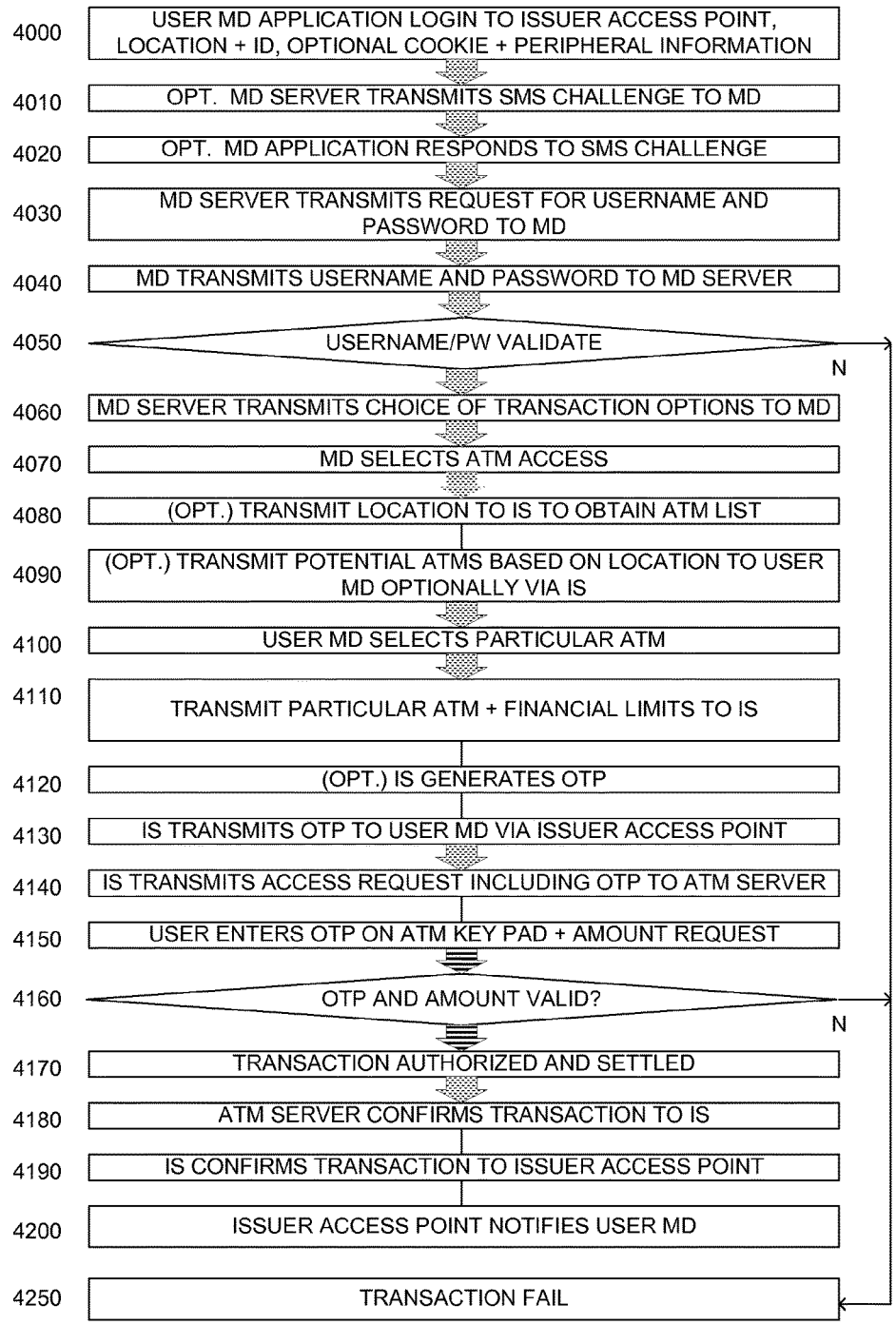
FIG. 4B illustrates a high level flow chart of an exemplary embodiment of the operation of the transaction system of FIG. 4A to provide secure access to the ATM without providing a physical card, or PIN at a keypad of the ATM.

FIG. 4B illustrates a high level flow chart of an exemplary embodiment of the operation of transaction system 400 of FIG. 4A to provide secure access to ATM 420 without providing a physical card or a PIN at key pad 430. Such an embodiment is particularly useful when a user doesn't want to carry a card and is further advantageous to avoid PIN theft when used in a non-secure location. For clarity, the flow between stages are marked in a manner consonant with the band information of FIG. 4A, and thus flows within customer band 80 are shown as a dot filled arrow and flows between IS 30 and either issuer MD access point server 340 or ATM server 410 are shown as solid lines. Particular stages are performed responsive to instructions stored on the respective memory 90, as described above. It is to be noted that in one embodiment the flow of FIG. 1C described above is applied to transaction system 400 where device 50 is embodied in ATM 420 and provider server 20 is embodied in ATM server 410 in place of web server 20A. The flow of FIG. 4B exhibits an alternative flow which includes a user active login preferably using application 62 and only then authentication execution rather than authentication being automatically initiated onto MD 60. In another embodiment FIG. 4B flow chart is applied to systems 1, 10, 200, and 300.

In stage 4000 a user utilizes user MD 60 to access issuer MD access point server 340, preferably via on-board application 62 loaded as part of a registration process, application 62 stored on a local memory of user MD 60, which performs the access to issuer MD access point server 340. As part of the login process, an identifier of user MD 60 is provided, which may be the MSISDN or other identifier unique to user MD 60, and preferably location information and other peripheral information is provided by user MD 60. In the event that user MD 60 is not provided with real time positional identifier equipment, location information is preferably obtained from the accessing network via triangulation or signal time delay calculation. Preferably, information transmission between user MD 60 and issuer MD access point server 340 is via a secure sockets layer (SSL) link.

In optional stage 4010, issuer MD access point server 340 performs an SMS challenge to user MD 60. In further detail, issuer MD access point server 340 transmits an SMS message to user MD 60, optionally with comprising an alphanumeric code. In optional stage 4020 the application running of user MD 60 described above responds the SMS challenge, preferably by returning the received alphanumeric code. The above SMS challenge and response is known to those skilled in the art of mobile financial transactions and thus in the interest of brevity is not further detailed herein.

In the event of success of the SMS challenge and response of optional stages 4010-4020, or in the event that optional stage 4010-4020 are not implemented, in stage 4030 issuer MD access point server 340 transmits a request to user MD 60 for a username and password. In stage 4040, user MD 60, responsive to a user input gesture, transmits a username and password to issuer MD access point server 340. The username and password has been pre-registered with issuer MD access point server 340, and thus in stage 4050 the received username and password is validated to confirm that it is consonant with a stored username and password on issuer MD access point server 340.

In the event that the received username and password is validated, in stage 4060 issuer MD access point server 340 transmits to user MD 60 a choice of transactions which may be selected. In one embodiment the transmission and display of the choice of transactions is displayed in cooperation with the application 62 running on board user MD 60 described above.

In stage 4070, responsive to a user gesture selecting "ATM access", user MD 60 transmits the selection to issuer MD access point server 340. In optional stage 4080, responsive to the location information of stage 4000, MD access point server 340 transmits an ATM locations transaction request to IS 30, or to ATM server 410 via IS 30, including user location and preferably username.

In optional stage 4090, responsive to the received location information, IS 30 transmits a list of relevant ATM identifiers and preferably their locations to issuer MD access point server 340, and these are forwarded, optionally in a format controlled by issuer MD access point server 340 to user MD 60. In another embodiment ATM server 410 transmits said list of relevant ATM identifiers via IS 30 and preferably their locations.

In stage 4100, responsive to optional list of relevant ATM identifiers, or responsive to scanning an identifier of the ATM, or by juxtaposing a CE reader of user MD 60 with a transmitter associated with the particular ATM, a particular ATM is selected. In particular, in the event that a choice of relevant ATMs has been transmitted to user MD 60, as described above in relation to optional stages 4080-4090, a particular ATM is identified responsive to a user gesture performed on an input device of user MD 60. An identifier of the selected ATM is transmitted to issuer MD access point server 340.

In stage 4110, an identifier of the selected ATM, plus financial limits for any authorized transaction, are transmitted by issuer MD access point server 340 to IS 30. In stage 4120, IS 30 optionally generates a one time password (OTP), and in stage 4130 the generated OTP with expiration time of stage 4120 is transmitted to user MD 60 via issuer MD access point server 340, where it is displayed on a display device of user MD 60. In one embodiment issuer MD access point server 340 generates the OTP and transmits it to IS 30 within stage 4110 and to MD 60 within stage 4130 in place of the generation by IS 30. In stage 4140, an ATM access request including user ID, the optional generated OTP with expiration time of stage 4120 and the financial limits of stage 4110 is transmitted to ATM server 410 along with an identification of the particular ATM which is authorized.

In stage 4150, a user of user MD 60 enters the displayed OTP of stage 4130 on an input device 430 of the particular ATM 420 and further enters data regarding a requested transaction, such as a cash withdrawal. In stage 4160, the particular ATM 420 transfers the received OTP and transaction data to ATM server 410, and ATM server 410 compares the OTP and transaction data with the received OTP and financial limits of stage 4140. In the event that the OTP is valid, i.e. within the validity period and is associated with the particular ATM 420, and the transaction is within the received financial limits, in stage 4170 the transaction is authorized and settled, such as by debiting the account of user MD 60 by ATM server 410, and confirmation is transmitted to ATM 420. In stage 4180 ATM server 410, responsive to confirmation of execution of the transaction by ATM 420, transmits a transaction confirmation to IS 30, i.e. an acknowledgement that the transaction has occurred.

Stages 4140-4180 have been described in an embodiment where transaction approval is performed by ATM server 410 responsive to the received OTP, time limit and financial limits, however this is not meant to be limiting in any way. In an alternative embodiment (not shown) transaction approval is performed by IS 30 responsive to transaction information and OTP information forwarded by ATM server 410.

In stage 4190, IS 30 transmits a transaction confirmation to issuer MD access point server 340, and in stage 4200, issuer MD access point server 340 settles the financial transaction, such as by debiting the account of user MD 60. Additionally, issuer MD access point server 340 transmits a confirmation message to user MD 60. In one embodiment issuer MD access point server 340 settles the financial transaction, instead of ATM server 410, such as by debiting the account of user MD 60. In another embodiment IS 30 settles the financial transaction.

In the event that in stage 4050 the received username and password is not validated, or in the event that in stage 4160 any of the OTP is invalid, is not associated with the particular ATM 420, or the transaction is within the received financial limits, in stage 4250 the transaction fails. Preferably, notification of ATM access failure is transmitted to user MD 60.

The above has been described in an embodiment wherein an OTP is generated by IS 30 and utilized by a user of user MD 60 for identification purposes at ATM 420, however this is not meant to be limiting in any way. Alternately, image verification may be utilized as described above in relation to FIG. 1D, or as described above in relation to FIGS. 1F-1G without exceeding the scope.

Figure 5A:
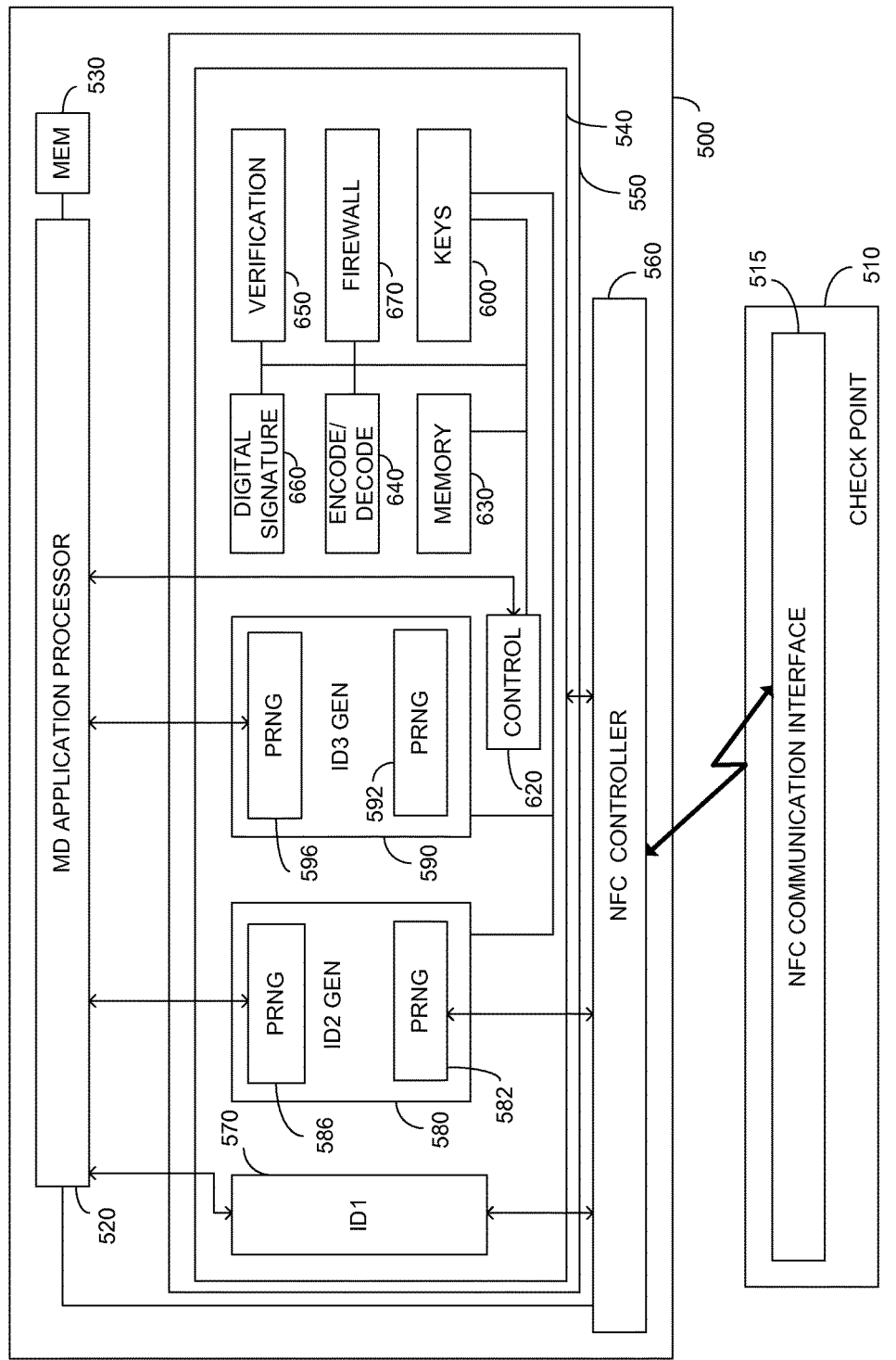
FIG. 5A illustrates a high level architecture of a user MD with a user security domain, shown in communication with a check point.

FIG. 5A illustrates a high level architecture of a user MD 500, shown in communication with a check point 510. In particular, MD 500 comprises an MD application processor 520; an MD memory 530; an NFC controller 560; and an SE 550 having thereon a USD 540. USD 540 is part of SE 550 and as such access requires secure keys, as will be described further below. In an exemplary embodiment USD 540 is one of a plurality of secure domains on SE 550. In another embodiment a plurality of SEs 550 are provided, and one of the plurality of SEs 550 comprises USD 540. Application processor 520 is in bidirectional communication with each of USD 540, NFC controller 560 and memory 530 as will be described in further detail below.

USD 540 comprises: a secured ID1 storage functionality 570; a secured ID2 PRN generator functionally 580; a secured ID3 PRN generator functionality 590; a secured keys storage 600; a USD control circuitry 620; a memory 630; an encoder/decoder functionality 640; a verification functionality 650; a digital signature functionality 660; and a firewall functionality 670. Memory 630 is illustrated as being within USD 540, however this is not meant to be limiting in any way, and in another embodiment memory 630 is on SE 550 and is communication with USD control circuitry 620, which is arranged to ensure that only encrypted data is stored on memory 630.

Secured ID2 PRN generator functionality 580 comprises an NFC associated ID2 PRN generator functionality 582 and an MD associated ID2 PRN generator functionality 586, which may be implemented as two functions of a single PRN generator functionality. Secured ID3 storage functionality 590 comprises an NFC associated ID3 PRN generator functionality 592 and an MD associated ID3 PRN generator functionality 596 which may be implemented as two functions of a single PRN generator functionality. Each of NFC associated ID2 PRN generator functionality 582, MD associated ID2 PRN generator functionality 586, NFC associated ID3 PRN generator functionality 592 and MD associated ID3 PRN generator functionality 596 is arranged to generate a pseudo-random number responsive to one or more keys securely stored on secured keys storage 600.

Each of ID1 functionality 570, ID2 functionality 580, ID3 functionality 590, secured keys storage 600, memory 630, encoder/decoder functionality 640, verification functionality 650, digital signature functionality 660 and firewall functionality 670 are in communication with, and responsive to, USD control circuitry 620. USD 540, particularly USD control circuitry 620, is in bidirectional communication with each of MD application processor 520 and NFC controller 560 as will be described further hereinto below. Advantageously, USD control circuitry 620 and other USD 540 functionalities are not generally responsive to commands from MD application processor 520 except as described herein, thus ensuring that USD 540 meets the definition of an SE application.

Check point 510 comprises an NFC communication interface 515 and is arranged to be in short wave radio communication with NFC controller 560 when juxtaposed therewith.

Encoder/decoder functionality 640 is arranged to encode data and decode data received from USD control circuitry 620 responsive to one or more keys securely stored on secured keys storage 600 and responsive to a command received from control 620. Encoder/decoder functionality 640 is further arranged to return the encrypted data to USD control circuitry 620. USD control circuitry 620 may receive data from MD application processor 520 and from NFC controller 560 and transmit the received data to encoder/decoder functionality 640 for encoding or decoding as required. Thus, in one embodiment data may be retrieved from MD application processor 520, encoded by encoder/decoder functionality 640, and returned to MD application processor 520 for transmission or for storage on MD memory 530. In another embodiment, the encrypted data may be directed to NFC controller 560 for NFC based communication, such as to check point 510 when checkpoint 510 is juxtaposed with NFC controller 560.

Encoder/decoder functionality 640 is further arranged to decode data responsive to USD control circuitry 620 responsive to one or more keys securely stored on secured keys storage 600. The decoded data may be stored by USD control circuitry 620 on memory 630, utilized to update keys stored on secured keys storage 600, transmitted to MD application processor 520, preferably for storage on MD memory 530, or for output transmission via NFC controller 560.

Verification functionality 650 is arranged to verify any of one or more verification passcodes, including one or more of a PIN, a password, user question, user gesture, picture or sound, without limitation. Verification functionality 650 optionally utilizes memory 630 for storage of verification information. Additionally, verification functionality optionally is in communication with secured keys storage 600 and may perform verification responsive to one or more keys stored thereon. In one embodiment, a PIN Verification Value (PVV) is preferably stored on memory 630. In such an embodiment, verification functionality 650 is arranged to verify a received PIN responsive to the stored PVV. In an exemplary embodiment, responsive to a received PIN input, USD control circuitry 620 transmits the received PIN input to Verification functionality 650. Verification functionality further retrieves verification information, preferably a PVV value. Verification functionality 650 is arranged to verify the authenticity of the received PIN responsive to the received verification information, and outputs a PIN verification result whose value is responsive to the verification. In the event that the PIN is verified, USD control circuitry 620 is arranged to output a PIN verified indicator to MD application processor 520 responsive to a positive value of the PIN verification signal received from verification functionality 650. USD control circuitry 620 is further arranged to output a PIN not verified indicator to MD application processor 520 responsive to a negative value of the PIN verification signal received from verification functionality 650. Optionally, USD control circuitry 620 is further arranged to ignore further PIN input requests responsive to a plurality of successive negative value PIN verification signals within a predetermined time period.

Digital signature functionality 660 is arranged to receive data and return the received data digitally signed responsive to one or more key securely stored on secured keys storage 600, responsive to USD control circuitry 620. Digital signature functionality 660 is advantageous when a digital signature is required by the user or the service provider, preferably for transactions which may not be repudiated by the user. In one embodiment digital signature functionality 660 is arranged to provide the digital signature in cooperation with a private/public key signature system, whose keys are stored on secured keys storage 600.

Firewall functionality 670 is arranged to inspect received data responsive to USD control circuitry 620, and determine further handling for each message. In one embodiment, as will be described further below, data received from NFC controller 560 is encapsulated by firewall functionality 670 and forwarded in an encapsulated format to MD application processor 520 for wireless transmission by MD application processor 520. Such an embodiment enables receipt of data by NFC controller 560 for transmission to a server such as IS 30 or MD server 40, as described above, without risk of infection. In such an embodiment, IS 30 or MD server 40 is arranged to de-encapsulate the data and verify same for authenticity, without exposing MD application processor 520 to the risk of worms, viruses or other undesirable code received via NFC controller 560. In another embodiment, firewall functionality 670 is arranged to encode received data, or a particular portion thereof, utilizing encoder/decoder functionality 640. USD control circuitry 620 then transmits the partially encrypted data to MD application processor 520. Such an embodiment is useful for reading user credentials such as tickets or coupons from checkpoint 510 by NFC controller 560 and storing them securely in MD application processor 520 memory 530. The encoded credentials may then be decoded and redeemed at a later time securely, since decoding of the stored credentials, tickets or coupons may only be performed by USD 540 responsive to the specific keys stored on secured keys storage 600 thereof. In another embodiment firewall functionality 670 may store received data in memory 630. In another embodiment firewall functionality 670 may respond to a request of ID2 or ID3 with the corresponding MPRN1 or PPRN1 as will be detailed below. In another embodiment firewall functionality 670 may not modify what-so-ever the received data, responsive to certain data parameters, and forward it to MD application processor 520 for further handling.

In operation, and as will be described further below, secured ID1 storage functionality 570 is arranged to respond to identification requests from either MD application processor 520 or from check point 510 received via NFC communication interfaces 560, with identification information, denoted herein as ID1. ID1 sent to MD application processor 520 upon request will be denoted as ID1-2; ID1 sent to check point 510 received via NFC communication interfaces 560 upon request will be denoted as ID1-1. ID1-1 or ID1-2 are each arranged to be used as a user unsecured ID and preferably comprises an address of user MD 500, such as an MSISDN, or other identifier which is translatable by a transaction server, such as IS 30 to an address. Secured ID1 storage functionality 570 is arranged to be read by MD application processor 520. Secured ID1 storage functionality 570 is optionally arranged to operate independently, or alternately secured ID1 storage functionality 570 may be arranged to be responsive to USD control circuitry 620 without limitation. Thus as indicated, either MD application processor 520 or NFC controller 560 may transmit a request ID1 to secured ID1 storage functionality 570 and receive in response an answer comprising a corresponding ID1.

NFC associated ID2 PRN generator functionality 582 is arranged to be in communication with NFC controller 560, and is responsive to a request for ID2, or a machine generated PRN, denoted MPRN1, to generate a PRN responsive to one or more keys stored on secured keys storage 600 and respond with a generated MPRN. Advantageously, the keys stored on secured keys storage 600 are preregistered with IS 30 or MD server 40, and are decipherable by server as IS 30 or MD server 40 to verify the authenticity of MPRN1. It is to be noted that MD application processor 520 is preferably unable to obtain MPRN1 from NFC associated ID2 PRN generator functionality 582. Optionally, NFC associated ID2 PRN generator functionality 582 may be disabled responsive to MD application processor 520 so as to prevent release of MPRN1 without authorization. NFC associated ID2 PRN generator functionality 582 is optionally arranged to operate independently, or alternately NFC associated ID2 PRN generator functionality 582 may be arranged to be responsive to USD control circuitry 620 without limitation.

MD associated ID2 PRN generator functionality 586 is arranged to be in communication with MD application processor 520, and is responsive to a request for a machine generated PRN, denoted MPRN2, to generate a PRN responsive to one or more keys stored on secured keys storage 600 and respond with a generated MPRN2. In one embodiment such a request requires a securely encoded request. Advantageously, the keys stored on secured keys storage 600 are preregistered with server as IS 30 or MD server 40, and are decipherable by IS 30 or MD server 40 to verify the authenticity of MPRN2. Preferably MPRN2 is distinguished from MPRN1 and may be encoded with different keys stored on secured keys storage 600 without exceeding the scope. MD associated ID2 PRN generator functionality 586 is optionally arranged to operate independently, or alternately MD associated ID2 PRN generator functionality 586 may be arranged to be responsive to USD control circuitry 620 without limitation. It is to noted that MPRN1 and MPRN2 will be together denoted ID2.

NFC associated ID3 PRN generator functionality 592 is arranged to be in communication with NFC controller 560, and is responsive to a PIN provided from MD application processor 520, or from a secured key pad as will be described further below, to generate a PRN responsive to one or more keys stored on secured keys storage 600, and to respond with a generated PIN supported PRN, denoted PPRN1. In one embodiment, the PIN is first verified by verification functionality 650, which is in one embodiment arranged to determine a PVV, and the creation and/or output of PPRN1 is responsive to an appropriate PIN verification success. In this embodiment, in the absence of such an appropriate PVV or expected PIN value, PPRN1 is not output to NFC controller 560. In another embodiment the user entered PIN is encoded by USD 540 and is part of the PPRN1, and in this embodiment verification functionality 650 is not utilized. Advantageously, and as described above, the keys stored on secured keys storage 600 are preregistered with server such as IS 30 or MD server 40, and are decipherable by IS 30 or MD server 40 to verify the authenticity of PPRN1. It is to be noted that MD application processor 520 is preferably unable to obtain PPRN1 from NFC associated ID3 PRN generator functionality 592. It is to be noted that in the absence of a PIN provided from MD application processor 520, or from secured key pad 525, or from other secured peripherals, as described below in FIG. 5B, NFC associated ID3 PRN generator functionality 592 does not generate PPRN1, and an error response may be returned to NFC controller 560. ID3 is further operative to output PPRN1 to check point 510 via NFC controller 560. NFC associated ID3 PRN generator functionality 592 is optionally arranged to operate independently, or alternately NFC associated ID3 PRN generator functionality 592 may be arranged to be responsive to USD control circuitry 620 without limitation.

MD associated ID3 PRN generator functionality 596 is arranged to be in communication with MD application processor 520, and is responsive to a request for a PIN supported PRN, denoted PPRN2, to generate a PRN responsive to one or more keys stored on secured keys storage 600, and to a PIN received from MD application processor 520, or from secured key pad 525, or from other peripherals as will be described below, and to respond with a generated PPRN2. In one embodiment such a request requires a securely encoded request. Advantageously, and as described above, the keys stored on secured keys storage 600 are preregistered with a server such as IS 30 or MD sever 40, and are decipherable by IS 30 or MD server 40 to verify the authenticity of PPRN2. Preferably PPRN2 is distinguished from PPRN1 and may be encoded with different keys stored on keys storage 600 without exceeding the scope. MD associated ID3 PRN generator functionality 596 is optionally arranged to operate independently, or alternately MD associated ID3 PRN generator functionality 596 may be arranged to be responsive to USD control circuitry 620 without limitation. In one embodiment the user entered PIN is encoded by USD 540 and is part of the PPRN2 and verification functionality 650 is not utilized. PPRN1 and PPRN2 will be together denoted as ID3.

Figure 5B:
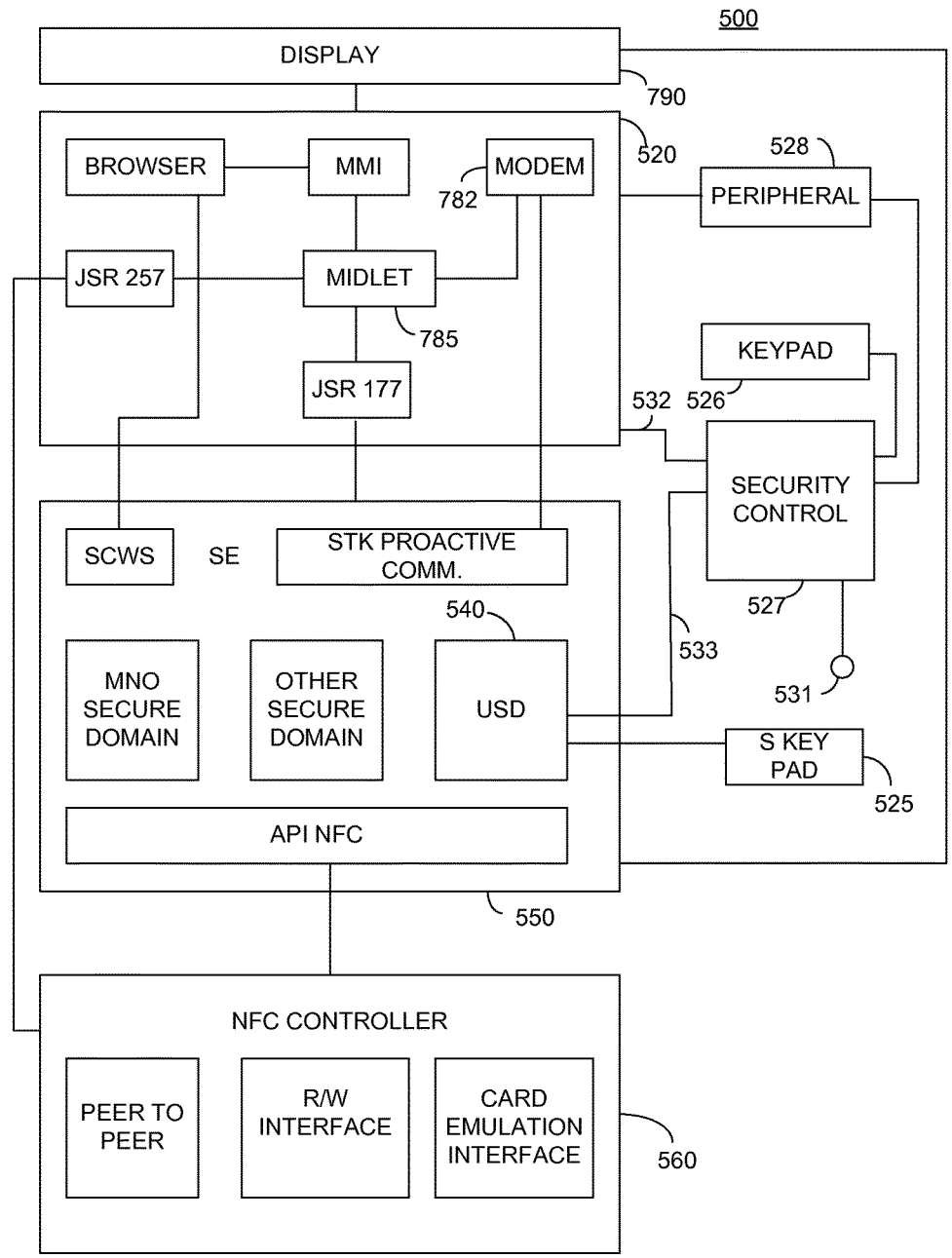
FIGS. 5B-5D illustrate high level block diagrams of various embodiments of an MD providing enhanced secured input to the SE.

FIG. 5B illustrates a high level block diagram of an embodiment of user MD 500 showing further details. In particular, user MD 500 comprises a display device 790; an MD application processor 520 in communication with display device 790; an SE 550 optionally in communication with display device 790; an NFC controller 560; a peripherals 528; a secured keypad 525; a keypad 526; a security control 527; and an indicator 531. A first output of peripherals 528 is connected to application processor 520 and a second output of peripherals 528 is connected to an input of security control 527. Keypad 526 is connected to an input of security control 527. A first output of security control 527 is connected to USD 540, a second output of security control 527 is connected to application processor 520 and a third output of security control 527 is connected to indicator 531. The output of secured keypad 525 is connected to USD 540. The term keypad is not limited to a physical keypad, and is specifically meant to include any data entry device, including without limitation a touch screen.

MD application processor 520 comprises a browser functionality; a man/machine interface (MMI); a modem 782; a midlet 785; a contactless communication application program interface (API), such as JSR 257; and a security and trust services API, such as JSR 177. The modem is illustrated as part of MD application processor 520 however this is not meant to be limiting in any way and the modem may be external of MD application processor without exceeding the scope.

SE 550 comprises: an optional secure card web server (SCWS); an optional SIM tool kit (STK) proactive communication functionality; an optional MNO secured domain application; and optionally other secured domain applications, which may represent one or more credit or debit card secured domains; USD 540 as described above; and an NFC API.

NFC controller 560 comprises a peer to peer communication interface for communication with other NFC device (not shown); a read/write interface for use in cooperation with devices such as NFC poster/tag (not shown) and a card emulation interface for use with check point 510 (not shown), which may be embodied in a point of sale.

The browser functionality is in communication with the MMI and the SCWS. Midlet 785 is in communication with each of modem 782, the MMI, JSR 177 and JSR 257. JSR 257 is in communication with NFC controller 560. STK proactive communication functionality is in communication with modem 782. The NFC API is in communication with NFC controller 560.

Peripherals 528 may be without limitation a Bluetooth receiver/transmitter, a GPS receiver, or a modem 782 external to MD application processor 520. In one embodiment, peripherals 528 provide information such as real time location information regarding MD 500. Peripherals 528 are in communication with MD application processor 520 and with security control 527.

Keypad 526 may be a physical keypad or a virtual keypad displayed on touch screen or other screen without limitation and is in communication with security control 527. In one embodiment, not shown, secured keypad 526 is in direct communication with MD application processor 520, and may be generally utilized for unsecured inputs. In one embodiment, secured keypad 525 or keypad 526 is any peripheral which its input can be used as "what you know" or "who you are" authentication factor element, such as fingerprint reader without limitation. Secured keypad 525 is in direct communication with SE 550, and particularly connected to USD 540, preferably to USD control circuitry 620 as described above in relation to FIG. 5A. Indicator may be without limitation a visual indicator such as LED arranged to indicate to the user the status of security control 527, particularly such that a secured user input is only performed when indicator 531 is indicative that keypad 526 is connected to USD 540, i.e. keypad 526 is in security mode. Indicator 531 is shown in communication with security control 527, however this is not meant to be limiting in any way and in alternative embodiment, indicator 531 is in communication with SE 550.

Peripherals 528, keypad 526 and secured keypad 525 are all peripherals which have IDs and can input other useful security information which may be part of transactions or connection authentication flows. Transmitting the input from peripherals 528 and/or keypad 526 to USD 540, without allowing modifications by MD processor 520, which may possess malicious software, enhances transaction security. As described above, SE 550 and particularly USD 540 is arranged to encrypt received information with the un-tampered inputs from said peripherals 528 and keypad 526 to a message which can be successfully decrypted only by a server such as MD server 40 or IS 30. High security is achieved preferably by obtaining results from the secured three authentication factors: "what you have", "what you know" and "where you are". FIG. 6B-FIG. 6D high level flow charts of embodiments of methods including transmitting secured information from peripherals 528 and keypad 526 to SE 550 in a secured manner.

In operation, security control 527, which may be implemented as a hardware or software switch without exceeding the scope, is arranged to alternately couple an output of keypad 526 to one of MD application processor 520 by connection 532 and SE 550 by connection 533. When keypad 526 is coupled to SE 550, denoted as security control 527 security mode, key logging software or other malicious software residing on MD application processor 520 will fail to copy or falsify any secure information known to the user, such as a PIN or security questions responses, since such information is directed to SE 550, and is not seen by MD application processor 520. Security control 527 can be set to security mode by SE 550 or by MD application processor 520 (connection not shown for clarity). Peripherals 528 is illustrated with a direct connection to MD application processor 520. When security control 527 is set to the security mode, the output of peripherals 528 is provided to SE 550 by security control 527 in parallel with the above mentioned direct connection to MD application processor 520. Alternately (not shown), the direct connection between peripherals 528 and MD application processor 520 is not provided, and security control 527 is arranged to alternately provide the information output by peripherals 528 to MD application processor 520 and SE 550, as described above in relation to keypad 526.

Connection 532 is preferably a bi-directional connection which can be implemented by physical connection line without limitation. Connection 532 transmits unsecured information from security control 527 to MD application processor 520 which may be a direct user input, or an indication of user input entered such as asterisk or any other unsecured information without limitation.

Connection 533 is a bi-directional connection which can be implemented by a physical connection line without limitation. Connection 533 transmits information from security control 527 to SE 550, and particularly to USD 540, thereby ensuring that the information is secure and is not exposed to MD application processor 520 malicious software. The transmitted information may be direct user input from keypad 526, information originated by peripheral 528 or any other secured information without limitation.

In one embodiment, secured keypad 525 is provided as a hardware input connected to SE 550. Such a secured keypad 525 enables input of a PIN or other security information directly to SE 550 without reference to security control 527.

In another embodiment, SE 550 is provided with a connection to display 790, optionally using video overlay. Such a connection can be used to securely present a current transaction or a state of SE 550 to the user without being subjected to manipulation by MD application processor 520. Indicator 531 may be further arranged to indicate to the user the authenticity of the displayed information responsive to an output of SE 550.

Midlet functionality 785 provides applications run on MD application processor 520 the ability to control communication with IS 30 so as to provide storage and access to SE 550, and particularly to USD 540. Midlet 785 may be implemented as an application or software element of any kind without limitation. Each of trusted third party server (not shown) and MNO server (not shown) may access the respective portions of SE 550 utilizing their own midlet or APIs, as known to those skilled in the art, or may share a single midlet 785 with USD 540. Midlet 785 further stores certain keys for use in off line operation as will be described further below, the keys stored on memory 530. Midlet 785 further preferably stores a cookie for use by IS 30 or MD server 40, comprising a hardware fingerprint (HFP); and an application fingerprint (AFP). Prior to communication, midlet 785 optionally may further add current location information retrieved from a GPS application on board user MD 500 (not shown), or from peripherals 528, and ID1 as described above.

Modem 782 provides bidirectional wireless communication between MD application processor 520, and/or STK proactive communication of SE 550 to servers such as IS 30, trusted third party server (not shown) or MNO servers (not shown). There is no requirement that all of IS 30, trusted third party server and an MNO server be provided.

MD 500 advantageously can utilize existing, unsecured, peripherals 528 and keypad 526, as the system peripherals security is obtained by security control 527.

Figure 5C:
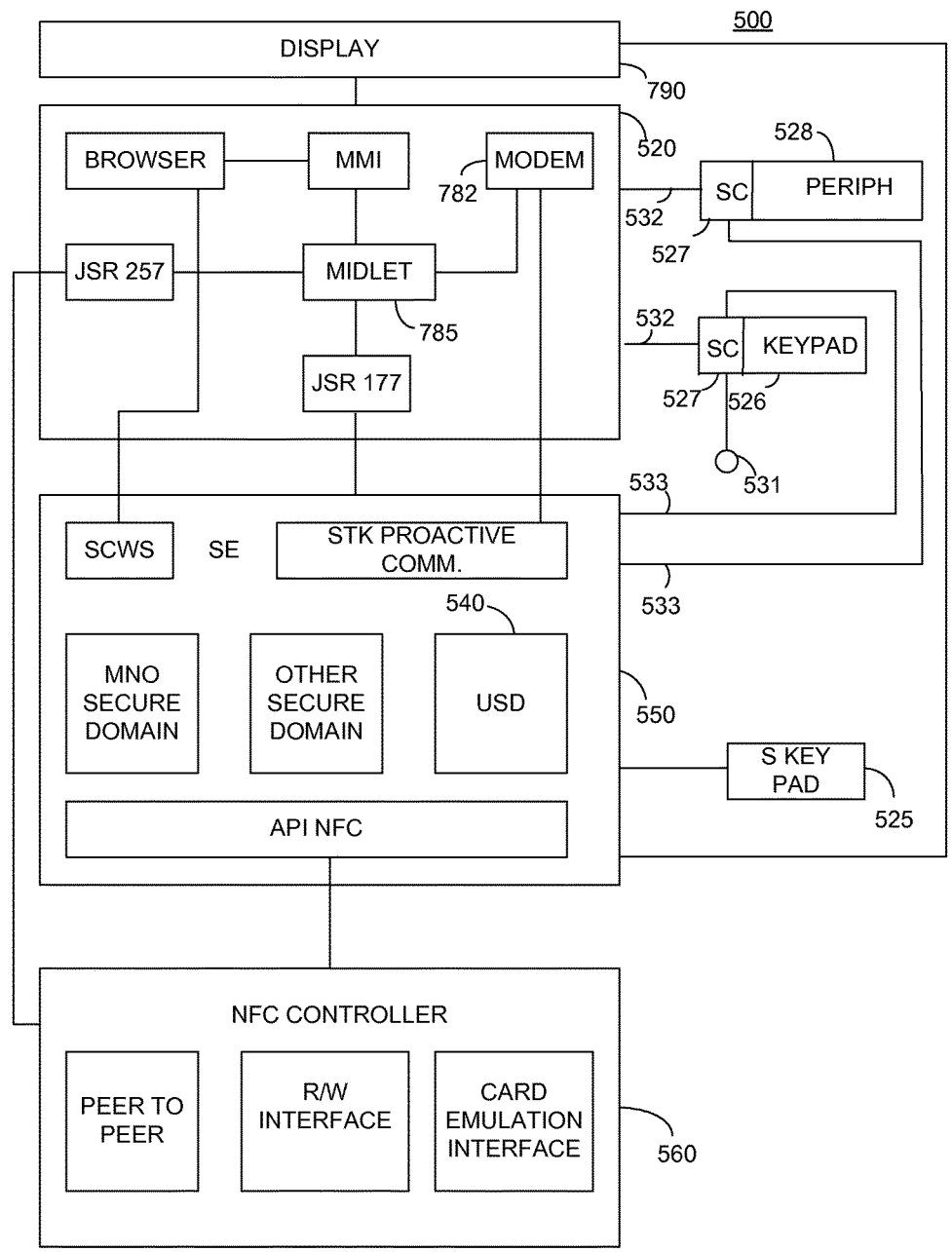

FIG. 5C illustrates a high level block diagram of an alternative embodiment of user MD 500 showing some further detail. MD 500 of FIG. 5C is in all respects similar to that of FIG. 5B except as detailed below.

In particular, security control 527 is implemented as a separate controllers composed in each of peripherals 528 and keypad 526. Thus, secure control 527 associated with keypad 526, and each peripherals 528, exhibits an output connection to each of MD application processor 520 and SE 550, as described above. Indicator 531 is connected to and activated by keypad 526 and preferably, in the case of multiple keypads 526, can be activated by any security control 527 of any one of the various keypads 526. Connections 532 connect each peripheral 528 and each keypad 526 to MD application processor 520 and preferably carry unsecured information only. Connections 533 connect each peripheral 528 and each keypad 526 to SE 550 and preferably transfers information which is secure, responsive to the setting of the respective security control 527. Thus, securing is ensured by the provision of the security control 527, which blocks MD application processor from access to input information when security control 527 is set to the active security setting. Security controls 527 can each be set into security mode individually by MD application processor 520 or in one embodiment by SE 550.

The MD 500 design of FIG. 5C is economic in number and space of MD 500 onboard components, as it may utilize existing peripherals 528 and keypad 526, and new components are not required. Some of the existing prior art peripherals 528 and keypad 526 may require upgrading to support security control 527 and the dual connectivity of connections 533 to SE 550 and connections 532 to MD application processor 520.

In an alternative embodiment, peripherals 528 provides output information to MD application processor 520 over connection 532 irrespective of the setting of security control 527. Security control 527, when active, provides the information output from peripherals 528 in parallel to SE 550.

Figure 5D:
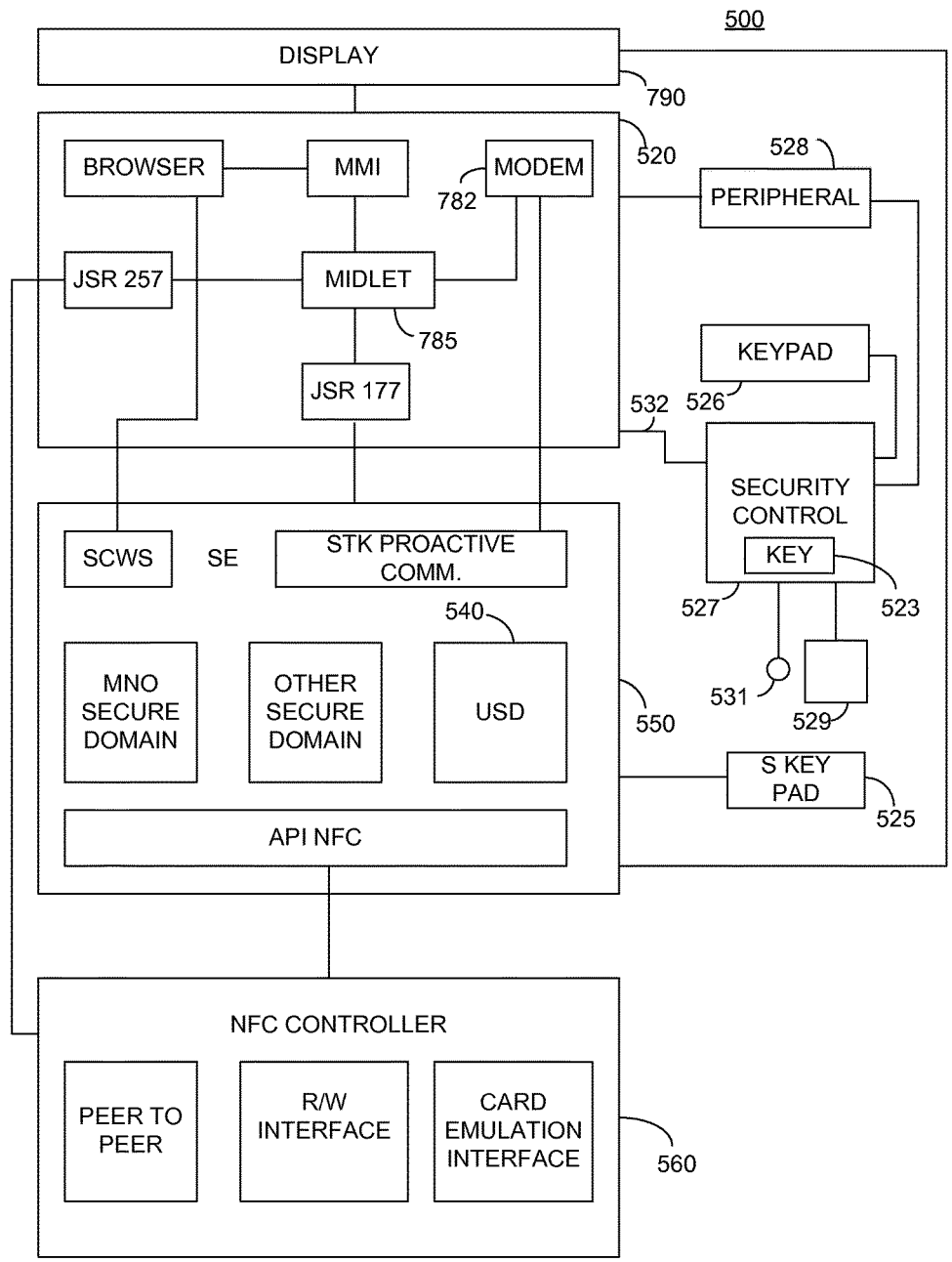

FIG. 5D illustrates a high level block diagram of an alternative embodiment of user MD 500 showing some further detail. MD 500 of FIG. 5D is in all respects similar to that of FIG. 5B except as detailed below.

In particular, security control 527 composes secured encryption keys 523 and is in communication with peripherals 528, keypad 526, MD application processor 520, indicator 531 and a secured mode activation key 529. The output of keypad 526 is encrypted responsive to secured encryption keys 523 when security control 527 is set to the security mode, and the output of keypad 526 is not encrypted when the security control 527 is not set to the security mode. Similarly, the output of peripherals 528 is encrypted responsive to secured encryption keys 523 when security control 527 is set to the security mode, and the output of peripherals 528 is not encrypted when the security control 527 is not set to the security mode. Optionally, as shown, the output of peripherals 528 is further provided in an unencrypted manner to MD application processor 520 irrespective of the setting of security control 527. Thus, when security control 527 is in the security mode, MD application processor 520 receives the output information from peripherals 528 in an unencrypted manner, and in parallel the output information from peripherals 528 is fed to security control 527, and security control 527 encrypts the provided information, and provides the encrypted information from peripherals 528 to MD application processor 520 in parallel with the unencrypted information. The output of security control 527 is connected to the input of MD application processor 520, and no connection to SE 550 is provided. Due to the encryption, MD application processor 520 is unable to decipher the received input, and transfers the received input to SE 550, specifically to USD 540 for decryption and optional verification. An alternate secured input to SE 550 is provided by secure key pad 525 as described above.

Secured encryption keys 523 are in synchronization with a sever such as MD server 40, SE 550 or with both without limitation. Preferably, security control 527 is arranged to provide time dependent secured information as to protect from replay attacks, optionally by using clock input or received tokens. Preferably, encrypted secured information from keypad 526 is transmitted to MD application processor 520 after an input phase is finished, such as when the user has completed the entry of a PIN code. MD application processor 520 sets security control 527 to the security mode at the beginning of a requested PIN, as verified by indicator 531, and sets security control 527 to the unsecured mode at the termination of the security input. Alternately, secured mode activation key 529 may be utilized to override MD application processor 520, thus allowing the user to force a secured input irrespective of the state of MD application processor 520.

Secured mode activation key 529 is further applicable to the embodiments of FIG. 5B and FIG. 5C without limitation. Secured mode activation key 529 initiates secured keypad 526 secured information transmission to USD 540 via MD application processor 520 in FIG. 5D or directly to USD 540 if implemented in cooperation with the embodiments of either FIG. 5B and FIG. 5C. Preferably secured mode activation key 529 is further arranged to terminates secured keypad 526 secured information transmission to USD 540. Pressing, or enabling, secured mode activation key 529, ensures that secured data received from keypad 526 is encrypted by security control 527 using encryption keys 523 so that only an encrypted input is received at MD application processor 520.

MD 500 can utilize prior art, unsecured, peripherals 528 and keypad 526, since system peripheral security is obtained by security control 527. Further MD 500 can utilize existing SE 550 components, particularly in the event that secure keypad 525 and direct connection to display device 790 are not implemented, as the hardware connectivity of SE 550 is in all respects similar to prior art SE 550 designs. The internal partitioning of SE 550 to achieve USD 540 may be accomplished by software design, and thus no hardware changes to SE 550 are necessarily required.

Figure 6A:
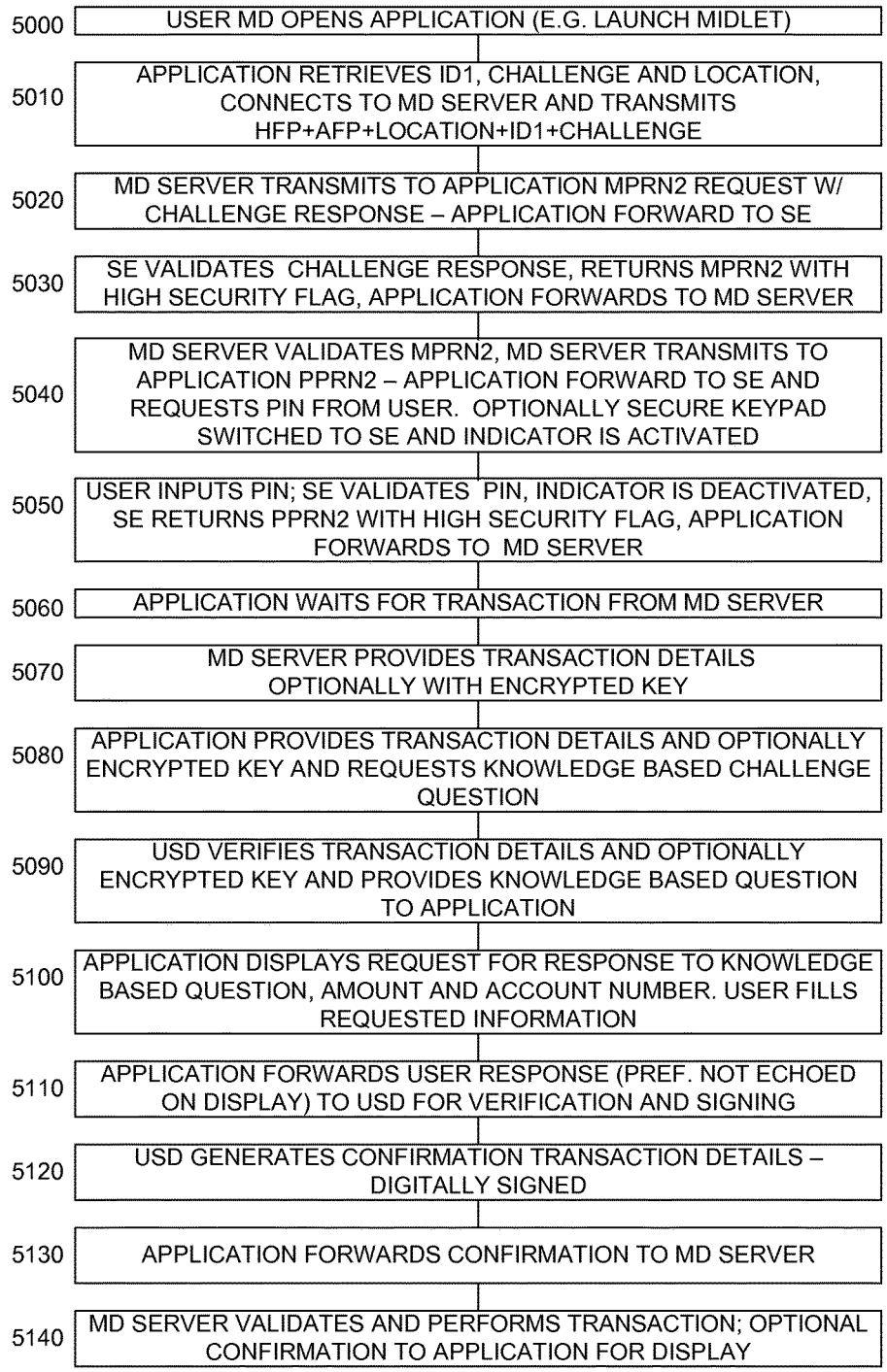
FIG. 6A illustrates a high level flow chart of an exemplary embodiment of the operation of the MD to provide a secured financial transaction in cooperation with a keypad and a security control.
Figure 6B:
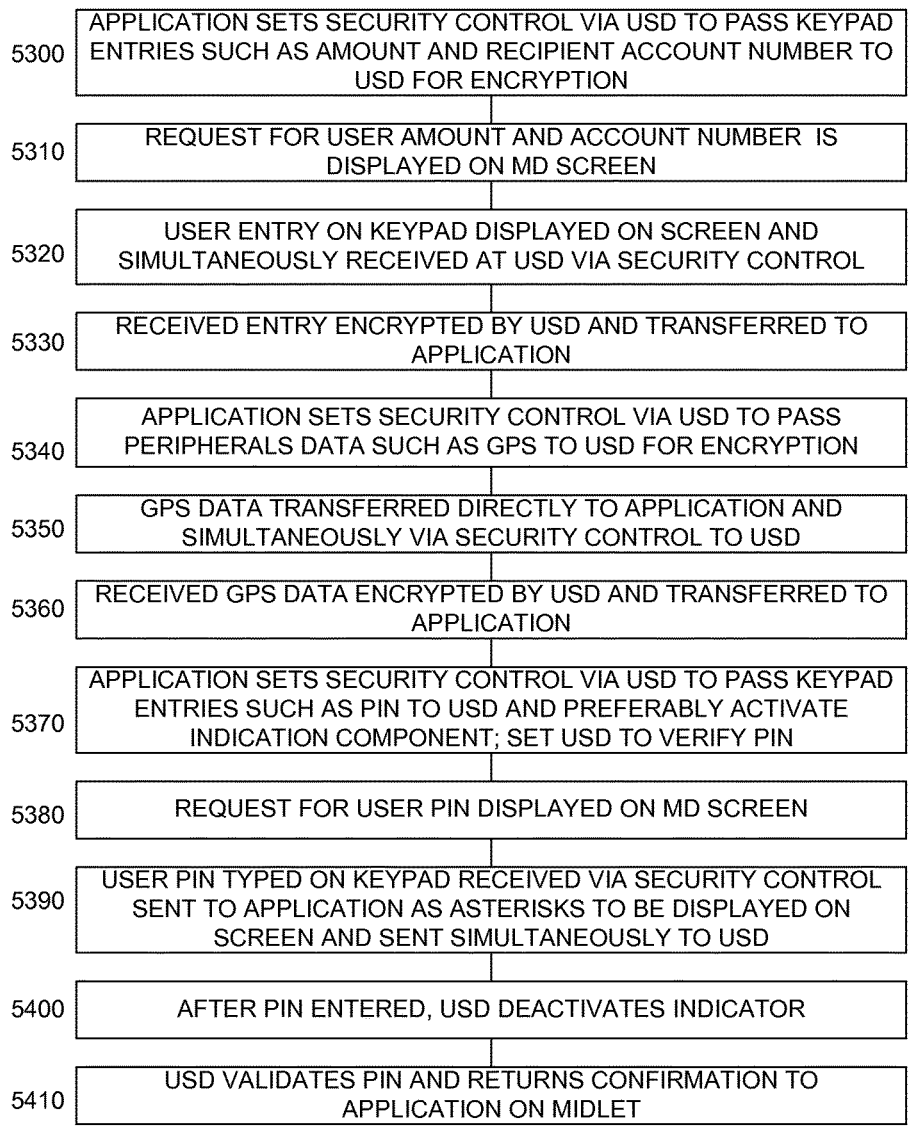
FIG. 6B illustrates a high level flow chart of the operation of the user MD to provide increased security responsive to the security control of the MD.
Figure 6C:
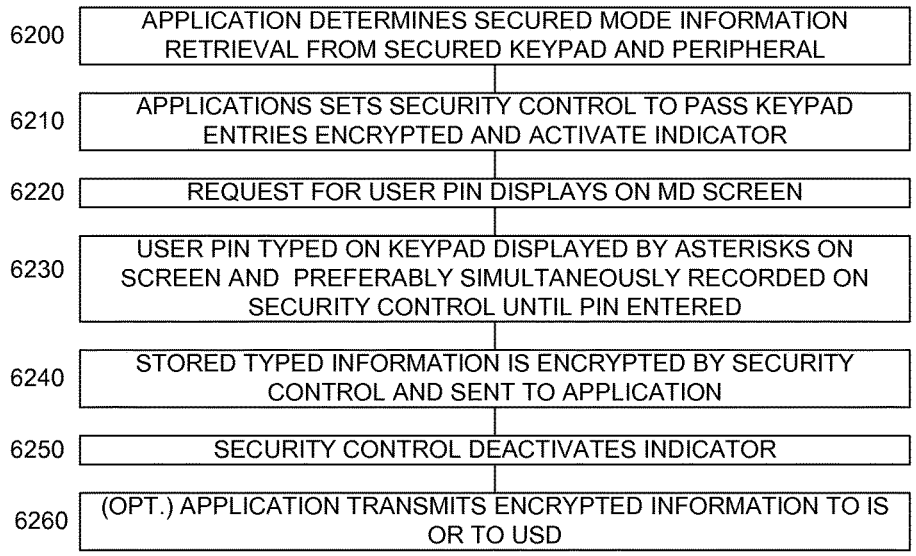
FIGS. 6C-6E illustrate high level flow charts of the operation of the user MD to provide increased security responsive to the security control of the MD in various embodiments.
Figure 6D:
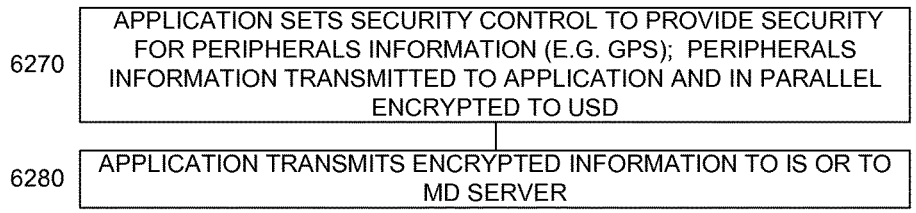

FIG. 6A illustrates a high level flow chart of an exemplary embodiment of the operation of MD 500 to provide a secured financial transaction in cooperation with secured MD peripherals such as secure keypad 525 and keypad 526 in cooperation with security control 527. In stage 5000 responsive to a user gesture on secure keypad 525 or keypad 526, which may be embodied in a touch screen coupled with display device 790 without limitation, an application such as midlet 785 stored on memory 530 is launched to run on MD application processor 520. In stage 5010 the application of stage 5000 retrieves ID1 from secured ID1 storage functionality 570, via USD 540 and preferably further retrieves current location information from a real time location information functionality such as a GPS application running on user MD 500. In one embodiment where real time location information is hardware enabled by peripheral 528, USD 540 securely retrieves the real time location information, encodes it and provide it to the application of stage 5000.

In one embodiment the application of stage 5000 requests USD 540 to provide it with challenge information. This information may later be used for USD 540 authentication of the responding server, as will be described further below. Midlet 785 further retrieves HFP and AFP information, described above, connects in one embodiment to MD server 40 via modem 782 and transmits a transaction request comprising the retrieved data, namely HFP, AFP, ID1, challenge and location information. In one embodiment where HFP information is hardware enabled by peripheral 528 and secured in cooperation with security control 527, USD 540 securely retrieves the HFP information, encodes it for MD transmission and provides it to application of stage 5000. Any other information stored in a local cookie is further supplied. In another embodiment midlet 785, described above, connects to IS 30 via modem 782, without limitation. Preferably all communication between midlet 785 and MD server 40 is encrypted, further, all communication or information exchange between USD 540 and MD server 40 is encrypted with a different key than that used by midlet 784 so as to keep the communication confidential from midlet 785.

In stage 5020, MD server 40 transmits to midlet 785 via modem 782 an MPRN2 request. In one embodiment where a challenge request was sent by SE 550, the MPRN2 request further includes the challenge response. The MPRN2 request is transmitted to SE 550 by midlet 785.

In stage 5030, SE 550, particularly USD 540, validates the received request, particularly by validating the challenge response. Optionally, control 620 is in communication with secured ID2 PRN generator functionally 580, and provides decoding and validation of the request via encoder/decoder functionality 640. A successful received request validation enables MD server 40 obtain permission for operation within SE 550 in USD 540 and in particular from USD control circuitry 620. Such permissions may be different from those of midlet 785, as MD server 40 is typically more trusted. Responsive to the validation of the request, MD associated ID2 PRN generator functionality 586 generates MPRN2. The generated MPRN2 is transmitted by SE 550 to midlet 785 and transmitted to MD server 40, preferably via modem 782.

In stage 5040, the received MPRN2 of stage 530 is validated, and responsive to the validated received MPRN2, MD server 40 transmits to midlet 785 a request for PPRN2. The received PPRN2 request is forward by midlet 785 to USD 540 and secured ID3 PRN generator functionality 590. A request for a PIN is further displayed on display device 790. Optionally, when the user cursor is on the PIN entry location, security control 527 is switched to direct any inputs received from keypad 526 towards SE 550. Preferably, indicator 531 is activated to indicate the user that inputs at keypad 526 are in a secured input mode. In one embodiment, a non keypad input component is used for user validation instead of PIN validation, such as camera for face recognition or a fingerprint reader. In further embodiment, the non keypad input component is implemented as peripheral 528.

In stage 5050 responsive to the user input of a PIN via keypad 526, or via secured keypad 525, without limitation, the entered PIN is provided to USD 540 in SE 550, and in particular to verification functionality 650 and secured ID3 PRN generator functionality 590. In an embodiment wherein security control 527 is not hardware enabled, midlet 785 provides the entered PIN to SE 550, however this disadvantageously may result in a reduced security level by enabling a key logger fraudster to get user password. Secured ID3 PRN generator functionality 590 is in one embodiment provided with a PVV so as to be arranged to verify the received PIN, and in another embodiment secured ID3 PRN generator functionality 590 is in communication with USD control circuitry 620, and USD control circuitry 620 provides PIN verification in cooperation with verification functionality 650. In the event that the PIN is validated, MD associated ID3 PRN generator functionality 596 generates PPRN2. If secured mode indicator 531 was activated in stage 5040, it is deactivated. The generated PPRN2 is transmitted by SE 550 to midlet 785 and midlet 785 transmits the received PPRN2 to MD server 40 via modem 782. In the event that security control 527 has been provided but not activated, the output of keypad 526 is redirected to MD application processor 520 in a non-secured mode.

It is to be noted that MD server 40 has strongly verified the validity of user MD 500, responsive to each of the communications of stage 5010, 5030 and 5050, wherein "something you have", "something you know" and "somewhere you are" has been provided. User MD 500 has further validated MD server 40 responsive to the received challenge response of stage 5020. In one embodiment the mutual validations are done between MD 500 and IS 30 as described above.

In stage 5060, midlet 785 is in idle mode and waits for transactions transmitted from MD server 40.

In stage 5070, MD server 40 provides transaction details to midlet 785 preferably including transaction details encrypted for USD 540 and optionally an encrypted key. Midlet 785 decryptable transaction details are further provided. In one embodiment, responsive to a user gesture, or input on keypad 526, the user selects a particular transaction to be done from a selection available from midlet 785, optionally displayed on display device 790.

In stage 5080, midlet 785 provides the preferably encrypted transaction details and optionally encrypted key to USD 540, and may request a knowledge based challenge question or any pass code without limitation, which preferably has been stored in memory 630. It is to be understood that as described above the encrypted key supplied by MD server 40 need not be the same as any encrypted key available on midlet 785.

In stage 5090, USD 540 validates the received encrypted key which acts as an extended permission indication, and the received encrypted transaction details, optionally via encoder/decoder functionality 640. If requested, USD 540 provides one or more knowledge based questions from memory 630 to midlet 785. In stage 5100 midlet 785 displays the received one or more knowledge based questions on display device 790, and further requests missing information if needed to complete the transaction. If complete transaction details are already provided by MD server 40 then transaction information is not requested from the user, only knowledge based questions which are utilized as a user signature on the received transaction are requested. In one embodiment USD 540 displays the one or more knowledge based questions on display device 790, and further displays received transaction information, or requests information regarding amount of the transaction and particular account information. A user fills the requested information, preferably by using secured keypad 526 or secured keypad 525. Optionally, when the user cursor is on the knowledge base answer entry location, security control 527 is switched to direct any inputs received from secured keypad 526 towards SE 550. Preferably, indicator 531 is activated when the user cursor is on the knowledge base answer entry location to indicate to the user the status of the secured input mode, and deactivated when the user has finished entering the knowledge base answer. Preferably, a user response to the knowledge based challenge questions are not echoed on display device 790, or are replaced by asterisks or another code.

In stage 5110, responsive to a user input via a user input device such as keypad 526, the optional user response regarding transaction details is forward to USD 540 for encryption and optionally the user response to knowledge based challenge questions is forward to USD 540 for verification.

In stage 5120, control 620 and verification functionality 650 are arranged to validate the knowledge based questions response received in stages 5100 and 5110, responsive to information stored on memory 630. Control 620 is further arranged, responsive to a successful validation, to generate a transaction confirmation including transaction details received in stage 5110 or stage 5080, preferably encrypted in cooperation with encoder/decoder functionality 640, the entire message preferably digitally signed in cooperation with digital signature functionality 660.

In stage 5130, the preferably digitally signed transaction confirmation of stage 5120 is transmitted by USD 540 to midlet 785, and midlet 785 forwards the transaction confirmation to MD server 40. In stage 5140, MD server 40 validates the received preferably digitally signed transaction confirmation of stage 5120, and in response to a successful validation, performs the financial transaction, optionally using IS 30 and other service providers as required. Optionally, a confirmation message is forwarded to midlet 785 for display on display device 790. Thus, the method of FIG. 6A provides high security for a financial transaction with mutual validation between MD server 40 and USD 540. The confirmation message may optionally be forwarded to USD 540 by midlet 785.

FIG. 6B illustrates a high level flow chart of a first method of MD 500 of FIGS. 5B-5C to increase security responsive to security control 527. In stage 5300, an application running on MD application processor 520, such as midlet 785, sets security control 527 to the security mode. In the embodiment shown, security control 527 is responsive to USD 540, however this is not meant to be limiting in any way. The setting of security control 527 to security mode switches security control 527 so as to pass data entered onto keypad 526 to USD 540 via communication channel 533 and preferably block the passage of data entered onto keypad 526 from reaching MD application processor 520 via communication channel 532. The data entered may comprise financial sums, account numbers or security information without limitation. Indicator 531 is set to provide a visual indication of the safety mode.

In stage 5310 USD 540 prompts MD application processor 520 to request an amount and an account number by displaying such a request on display device 790. Alternately MD application processor 520 displays a transaction form on display device 790. Alternately, as described above, in some embodiments USD 540, or another portion of SE 550, is provided with a direct input to display device 790 so as to enable the display of the request.

In stage 5320, any entry received at keypad 526 is passed to USD 540. In one embodiment the entry data received at keypad 526 is passed directly to USD 540, and in another embodiment the entry data is encrypted by key 523, and MD application processor 520 is arranged to pass such encrypted data to USD 540 for processing. USD 540 displays on display 790 an echo of the data entry, the amount and the account number. Alternately, MD application processor 520 displays visual feedback to the entry such as an asterisks display. The received data is encrypted by USD 540. In stage 5330, the data entered via keypad 526 is optionally verified, and the encrypted amount and account number transferred to midlet 785, or other application. It is to be noted for clarity that midlet 785 is a more detailed descriptor of application 62 described above, however this is not meant to be limiting in any way.

In stage 5340, midlet 785 sets security control 527 via USD control circuitry 620 to pass information from peripherals 528 to USD 540 for encryption. While any range of peripherals 528 are supported, the method will be particularly described in relation to real time positioning equipment, such as a GPS receiver, for ease of understanding. In stage 5350, responsive to stage 5340, GPS data from peripherals 528 is transferred directly to USD 540 and in parallel is passed to MD application processor 520, received by midlet 785. In stage 5360, the received data is encrypted by USD 540 responsive to encoder/decoder functionality 640, and the encrypted data is forwarded to midlet 785.

In stage 5370, midlet 785 further sets security control 527 to pass entries received from keypad 526, to USD 540, and not present the input to MD application processor 520. Indicator 531 is enabled to provide a visual indication. In such a mode, any PIN information is passed directly to USD 540. Alternately, as described above, entries received from keypad 526 are received by midlet 785 encrypted responsive to key 523, and such encrypted data is passed to USD 540 by midlet 785. Midlet 785 further instructs USD 540 to verity PIN information.

In stage 5380, midlet 785 outputs a request for user PIN to display 790. It is to noted that stage 5370 and 5380 can be switched in order, and preferably both are performed prior to user PIN entry of stage 5390. In stage 5390, the user PIN is received at USD 540, responsive to a user input, or gesture. Preferably, USD 540 echoes dummy characters, such as asterisks, to display 790 via midlet 785 for each entry key received.

In stage 5400, after completion of entry of secure information, such as a PIN, USD 540 sets security control 527 to non-security mode, and thus deactivates indicator 531. In stage 5410, USD 540 validates the received information, preferably in cooperation with verification functionality 650, and in the event that the received information, such as a PIN is validated, returns a confirmation to midlet 785.

FIG. 6C illustrates a high level flow chart of a second method of MD 500 of FIG. 5D to increase security responsive to security control 527, particularly described in relation to the embodiment of FIG. 5D. In stage 6200, application 62, i.e. midlet 785, determines that secured mode information retrieval from keypad and peripherals is required. This is primarily a function of the security settings of the stage in the application, and is thus set by the initial programming of midlet 785 responsive to received parameters.

In stage 6210, midlet 785 sets security control 527 to pass entries received on keypad 526 encrypted responsive to key 523. Indicator 531 is preferably activated. In stage 6220 a request for a user PIN is displayed on display 790, thereby prompting a user for input via keypad 526. In stage 6230, responsive to a user input on keypad 526, dummy key information is displayed as a visual feedback on display 790, such as an asterisk for each entry received. Security control 527 stores entered data keystrokes on a local memory. In stage 6240, completion of the entry is detected by security control 527, or alternately by midlet 785, and security control 527 is arranged to encrypt the received data responsive to secured keys 523 and transmit the encrypted data to midlet 785.

In stage 6250, indicator 531 is deactivated, preferably by security control 527. In optional stage 6260, midlet 785 transmits the encrypted PIN or other security data to IS 30 or MD server 40 or USD 540 for decryption and validation.

Thus, midlet 785 does not receive any unencrypted PIN or other security information, and surreptitious software is unable to participate in fraudulent transactions.

FIG. 6D illustrates a high level flow chart of a third method of MD 500 of FIG. 5D to increase security responsive to security control 527, particularly in relation to peripherals 528. In stage 6270, midlet 785, or application 62, sets security control 527 to provide security for data from peripherals 528. Data from peripherals 528 is received by MD application processor 520 in an unencrypted format. In parallel security control 527 encrypts the data flow received from peripherals 528 responsive to secured keys 523, and transmits the encrypted data to midlet 785. Alternately, as described above in relation to the embodiments of FIGS. 5B and 5C, USD 540 may encrypt the data from peripherals 528 when security control 527 is active, and provide the encrypted data to midlet 785 from transmission as described below. Encryption by USD 540 is preferably performed by encoder/decoder functionality 640 as described above.

In stage 6280, the encrypted data from peripherals 528 exhibits increased security and is "trusted data", since it is encoded via secured key 523. Midlet 785 may thus transmit the encrypted data from peripherals 520 to IS 30 or MD server 40 or USD 540 for location validation.

Figure 6E:
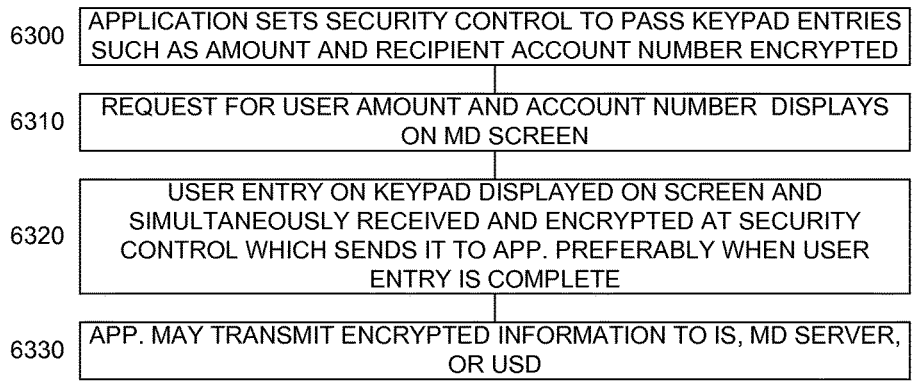

FIG. 6E illustrates a high level flow chart of a fourth method of MD 500 of FIG. 5D to increase security responsive to security control 527. In stage 6300 application 62, or midlet 785, sets security control 527 to pass keypad entries in an encrypted manner, while simultaneously to display the keypad entries on MD screen 790. Such a setting is preferred for entry of amounts and account numbers, as it allows a user to visually verify the data entry while maintaining security against fraudulent software attempts to manipulate the data, such fraudulent software known as fraudsters. Indicator 531 is enabled to provide a visual indicator of the mode to the user.

In stage 6310, midlet 785 requests secured input from a user, by displaying a request for an amount or an account number on display 790. In stage 6320, user entry received via keypad 526 is displayed on display 790 thus enabling the user to visually verify the data entry, in parallel the user entry is stored on a local memory of security control 527. Preferably, after input is complete, security control 527 encrypts the data received from keypad 526 responsive to secured keys 523, and transmits the encrypted data to midlet 785. Alternately, individual keystrokes may be encrypted and transmitted to midlet 785 without exceeding the scope.

In stage 6330, the encrypted data from keypad 526 exhibits increased security and is "trusted data", since it is encoded via secured keys 530. Midlet 785 may thus transmit the encrypted data from peripherals 528 to IS 30, MD server 40 or USD 540 for validation.

Figure 7A:
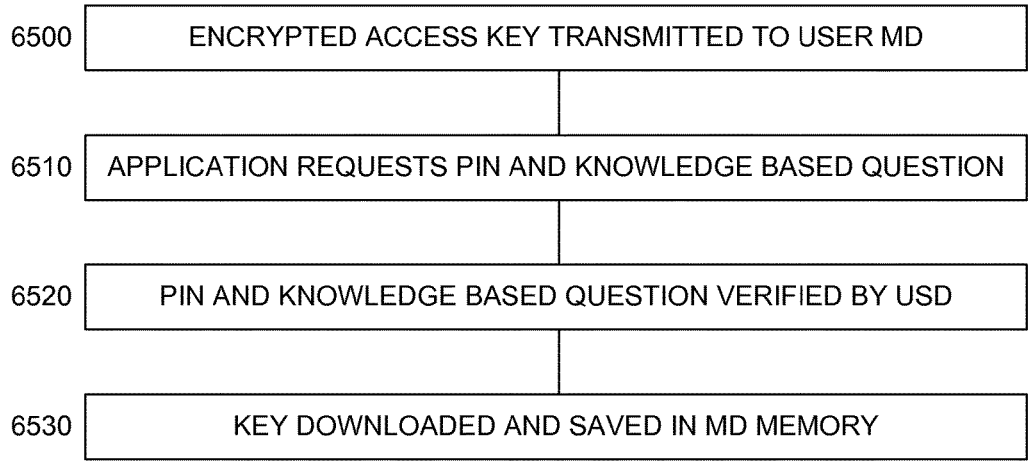
FIG. 7A illustrates a high level flow chart of the operation of an MD application in cooperation with a USD to provide secured receipt and storage for a digital key to obtain access, for example to a hotel room.

FIG. 7A illustrates a high level flow chart of the operation of midlet 785 in cooperation with USD 540 to provide secured receipt and storage for a digital key to obtain access, for example to a hotel room. In stage 6500 an encrypted access key is transmitted to user MD 500. The encrypted access key may be transmitted by e-mail, SMS or by a wireless transmission from MD server 40 or IS 30. In stage 6510, midlet 785 requests a PIN and may request a knowledge based question from the user, the knowledge based question may be retrieved from memory 630 of USD 540. As described above, preferably the response to the PIN and knowledge based question is not echoed on display device 790. In stage 6520 the received PIN and response to one or more knowledge based questions are validated by USD 540, in particular by verification functionality 650. In response to validation of the PIN and knowledge based question, in stage 6530 the key is downloaded, encoded by encoder/decoder functionality 640 and stored in an encoded format on memory 530.

In another embodiment response to validation of the PIN and knowledge based question, the key is downloaded to USD 540, encoded by encoder/decoder functionality 640, sent to MD application such as midlet 785 and stored by it in an encoded format on memory 530.

Figure 7B:
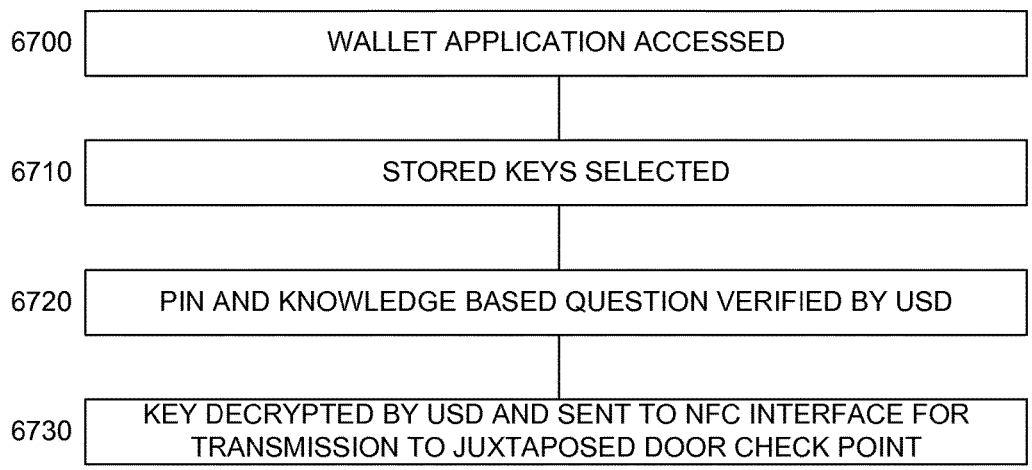
FIG. 7B illustrates a high level flow chart of the operation of the MD application in cooperation with the USD to provide secured retrieval and decoding of a digital key to obtain access, for example to a hotel room.

FIG. 7B illustrates a high level flow chart of the operation of midlet 785 in cooperation with USD 540 to provide secured retrieval and decoding of a digital key to obtain access, for example to a hotel room. In stage 6700, a wallet application of midlet 785 is accessed. In stage 6710, retrieval of stored keys is selected from a menu of available services in the wallet application of stage 6700, and in particular the desired key is selected.

In stage 6720, a PIN is requested from the user, and verified by USD 540, responsive to a request from midlet 785. Preferably, as described above, the PIN is verified in cooperation with verification functionality 650 and a knowledge based question requested from the user, may be verified by verification functionality 650. In stage 6730, responsive to the verified PIN and the verified knowledge based question, midlet 785 transmits the encrypted key to USD 540, with instructions to decode and output on NFC controller 560. The key is decoded in cooperation with encoder/decoder functionality 640, and the decoded key is output on NFC controller 560. In the event that NFC controller 560 is juxtaposed with an NFC device of the appropriate door, or other check point such as check point 510, the door mechanism will then open responsive to the received decoded key.

The above has been described in relation to a door access, however this is not meant to be limiting in any way, and a similar functionality is available for any access control device.

Figure 7C:
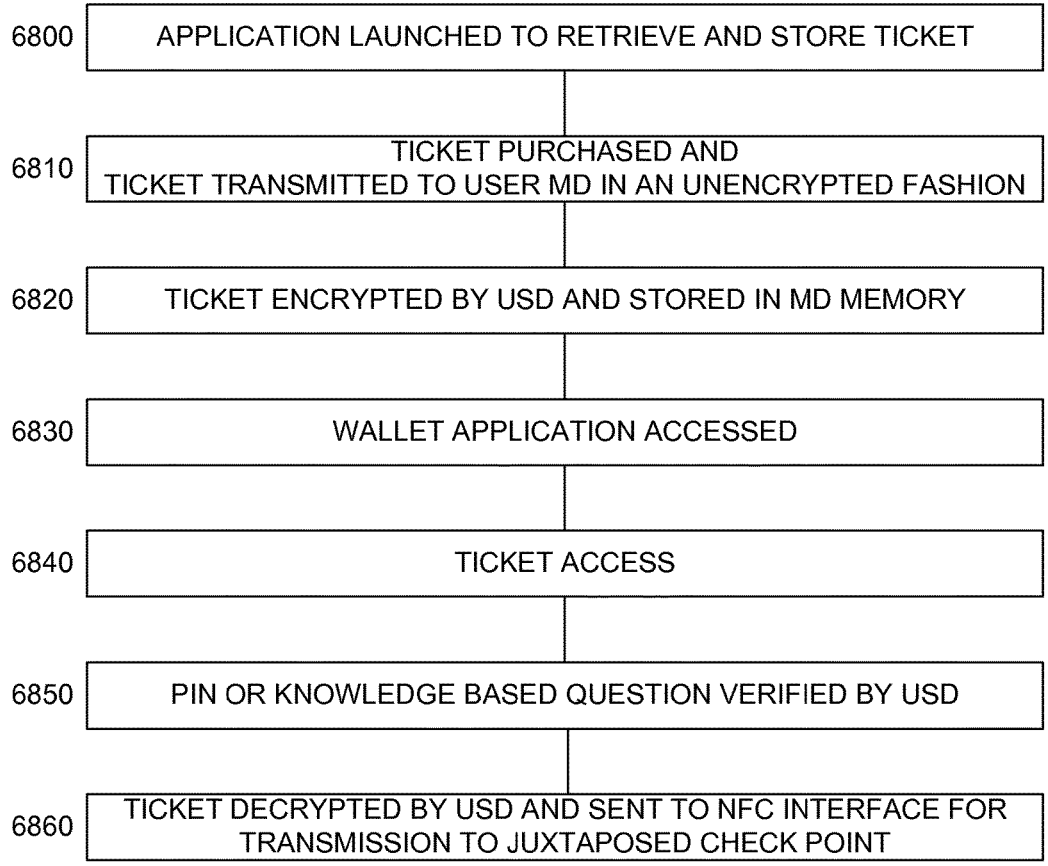
FIG. 7C illustrates a high level flow chart of the operation of the MD application in cooperation with the USD to provide secured storage of a ticket for access control, such as for a public conveyance.

FIG. 7C illustrates a high level flow chart of the operation of midlet 785 in cooperation with USD 540 to provide secured storage of a ticket for access control, such as for a public conveyance. In stage 6800 midlet 785 is launched and set to retrieve, store and present a ticket via NFC controller 560. Optionally, a PIN is provided and verified by USD 540, particularly verification functionality 650 as described above. In stage 6810 a ticket is purchased, such as from a vending machine, and the purchased ticket is received by NFC controller 560 when juxtaposed with check point 510 of the vending machine. In stage 6820, the purchased ticket is encrypted by encoder/decoder functionality 640 and passed for storage to midlet 785, which stores the encrypted ticket on memory 530. In another embodiment, the ticket is encrypted by the vending machine and received by NFC controller 560 when juxtaposed with check point 510 of the vending machine.

In stage 6830, the wallet application of midlet 785 is accessed, and in stage 6840 ticket access is selected. In stage 6850, midlet 785 requests a PIN which is an example of a knowledge based question from the user; other knowledge based questions may be added to, or substituted for the PIN request, and the response to the PIN is preferably not echoed on display device 790. The received PIN is validated by USD 540; in particular the received PIN is validated by verification functionality 650. In response to validation of the PIN the encrypted key is optionally retrieved from memory 530, decrypted in cooperation with encoder/decoder functionality key 640, and the decrypted key is output on NFC controller 560. In the event that NFC controller 560 is juxtaposed with an NFC device of the appropriate access device, such as a ticketing gate, the gate will open allowing access to the received decrypted key.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

The terms "include", "comprise" and "have" and their conjugates as used herein mean "including but not necessarily limited to". The term "connected" is not limited to a direct connection, and connection via intermediary devices is specifically included.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof, which would occur to persons skilled in the art upon reading the foregoing description.

The invention claimed is:

1. An electronic user device enabling secure user authentication, the electronic user device comprising:
   a user device processor, a user device memory, a security control, and a secure element,
   the security control storing an encryption key and security control instructions, the security control instructions when executed by the security control cause the security control to receive output of a peripheral device and operate in a secure mode to:
      produce an encrypted output of the peripheral device by encrypting the output of the peripheral device based on the encryption key; and
      transmit the encrypted output of the peripheral device to the user device processor,
   the user device memory storing user device processor instructions, the user device processor instructions when executed by the user device processor cause the user device processor to transfer the encrypted output of the peripheral device to the secure element,
   the secure element storing a decryption key corresponding to the encryption key, the secure element further storing secure element instructions, the secure element instructions when executed by the secure element cause the secure element to:
      decrypt the encrypted output of the peripheral device based on the decryption key to thereby obtain the output of the peripheral;
      validate the output of the peripheral device; and
      send to the user device processor data representing validation of the output of the peripheral device.

2. The electronic user device of claim 1, wherein the peripheral device is a fingerprint reader.

3. The electronic user device of claim 1, wherein the peripheral device includes at least one of: a keypad; a secure keypad; a virtual keypad; a camera; a near field communications (NFC) device; a modem; a fingerprint reader; or a voice recorder.

4. The electronic user device of claim 1, wherein the secure mode is a first mode, the security control instructions when executed cause the security control to transmit the output of the peripheral device in an unencrypted form to the user device processor responsive to the security control being in a second mode and not the first mode.

5. The electronic user device of claim 4, wherein the user device processor instructions when executed by the user device processor cause the user device processor to set the security control to operate in the first mode or the second mode.

6. The electronic user device of claim 4, wherein the secure element instructions when executed by the secure element cause the secure element to set the security control to operate in the first mode or the second mode.

7. The electronic user device of claim 4, further comprising an indicator that indicates that the security control is operating in the first mode in response to the security control is operating in the first mode.

8. The electronic user device of claim 1, wherein the secure element further stores validation information, the secure element instructions when executed by the secure element cause the secure element to validate the output of the peripheral device based on the validation information.

9. The electronic user device of claim 1, wherein the secure element, security control, user device processor, and user device memory are within a mobile communication device.

10. The electronic user device of claim 1, wherein the decryption key is inaccessible by the user device processor.

11. A method for enabling secure user authentication, comprising:
   at a security control and in response to when the security control is operating in a secure mode:
      receiving output of a peripheral device;
      producing an encrypted output of the peripheral device by encrypting the output of the peripheral device based on an encryption key; and
      transmitting the encrypted output of the peripheral device to a user device processor in communication with the security control;
   at a secure element:
      receiving from the user device processor the encrypted output of the peripheral device;
      obtaining the output of the peripheral device by decrypting the encrypted output of the peripheral device based on a decryption key stored at the secure element, the decryption key corresponding to the encryption key;
      validating the output of the peripheral device; and
      sending to the user device processor data representing validation of the output of the peripheral device.

12. The method of claim 11, wherein the secure mode is a first mode, the method further comprising, at the security control and responsive to the security control operating in a second mode, transmitting the output of the peripheral device to the user device processor in an unencrypted form.

13. The method of claim 12, further comprising, at the user device processor, setting the security control to operate in the first mode or the second mode.

14. The method of claim 12, further comprising, at the secure element, setting the security control to operate in the first mode or the second mode.

15. The method of claim 12, further comprising indicating, at the secure element, that the security control is operating in the first mode in response to the security control operating in the first mode.

16. The method of claim 11, wherein:
   the validating the output of the peripheral device at the secure element includes validating the output of the peripheral device based on validation information stored at a memory of the secure element.

17. The method of claim 11, wherein the decryption key is inaccessible by the user device processor.

18. A non-transitory processor-readable medium storing code representing instructions to be executed by a processor, the code comprising code to cause the processor to:
   receive, at a secure element, encrypted data from a security control via a user device processor in response to the security control receiving an output from a peripheral device and producing the encrypted data based on an encryption key;

obtain the output of the peripheral device by decrypting the encrypted data based on a decryption key stored at the secure element and corresponding to the encryption key;

validate the obtained output of the peripheral device; and send to the user device processor data representing validation of the output of the peripheral device.

19. The non-transitory processor-readable medium of claim 18, wherein the decryption key is inaccessible by the user device processor.

* * * * *

UNITED STATES PATENT AND TRADEMARK OFFICE
CERTIFICATE OF CORRECTION

PATENT NO. : 9,886,688 B2  
APPLICATION NO. : 14/240395  
DATED : February 6, 2018  
INVENTOR(S) : Avish Jacob Weiner et al.

Page 1 of 1

It is certified that error appears in the above-identified patent and that said Letters Patent is hereby corrected as shown below:

Column 44, Lines 16 and 17 (Claim 11, Lines 3 and 4):
"at a security control and in response to when the security control is operating in a secure mode;"
should be -- at a security control and in response to the security control operating in a secure mode; --

Signed and Sealed this
Twelfth Day of June, 2018

Andrei Iancu
*Director of the United States Patent and Trademark Office*